US009483791B2

(12) United States Patent
Schank et al.

(10) Patent No.: US 9,483,791 B2
(45) Date of Patent: Nov. 1, 2016

(54) NETWORK SOFTWARE AND HARDWARE MONITORING AND MARKETPLACE

(71) Applicant: Spiceworks, Inc., Austin, TX (US)

(72) Inventors: Eric David Schank, Austin, TX (US); Francis Sullivan, Austin, TX (US); Scott Richard Abel, Austin, TX (US); Brian S. Gugliemetti, Austin, TX (US); Tabrez Syed, Austin, TX (US)

( * ) Notice: Subject to any disclaimer, the term of this patent is extended or adjusted under 35 U.S.C. 154(b) by 310 days.

(21) Appl. No.: 13/776,224

(22) Filed: Feb. 25, 2013

(65) Prior Publication Data

US 2013/0332303 A1 Dec. 12, 2013

Related U.S. Application Data

(63) Continuation-in-part of application No. 12/041,480, filed on Mar. 3, 2008, now abandoned, and a continuation-in-part of application No. 13/487,091, filed on Jun. 1, 2012, now abandoned, which is a continuation of application No. 12/117,533, filed on May 8, 2008, now Pat. No. 8,214,476, and a continuation-in-part of application No. 12/041,480, filed on Mar. 3, 2008, now abandoned.

(60) Provisional application No. 61/602,575, filed on Feb. 23, 2012, provisional application No. 60/917,528, filed on May 11, 2007, provisional application No. 60/892,831, filed on Mar. 2, 2007.

(51) Int. Cl.

| | |
|---|---|
| ***G06Q 30/00*** | (2012.01) |
| ***G06Q 30/06*** | (2012.01) |
| ***H04L 12/26*** | (2006.01) |
| *H04L 12/24* | (2006.01) |

(52) U.S. Cl.

CPC ...... *G06Q 30/0641* (2013.01); *G06Q 30/0631* (2013.01); *H04L 41/0856* (2013.01); *H04L 41/20* (2013.01); *H04L 43/0817* (2013.01); *H04L 41/22* (2013.01)

(58) Field of Classification Search

CPC .................................. G06Q 30/0601–30/0645
USPC ................ 705/26.1–27.2; 709/223, 224, 226
See application file for complete search history.

(56) References Cited

U.S. PATENT DOCUMENTS 5,948,055 A 9/1999 Pulsipher et al.
6,636,239 B1 10/2003 Arquié et al.

(Continued)

OTHER PUBLICATIONS

Ferelli, M. (2000). Clustering management tools support growing applications. Computer Technology Review, 35-38. Retrieved from http://search.proquest.com/docview/220625723?accountid=14753.*

*Primary Examiner* — Resha Desai
(74) *Attorney, Agent, or Firm* — Hulsey P.C.

(57) ABSTRACT

A method, system, and network for interfacing the workflow monitoring and reporting of a host computer, a local network of information technology devices, a community of network users, and third party vendors is provided. This includes processes and systems for initiating an inventory, including software, of a plurality of information technology devices associated with a local network of information technology devices from a host computer and determining the operational status of the information technology devices associated with the local network. The operational status of the information technology devices associated with the local network is monitored and presented to a host computer. Needs relating to the local network are identified and determined and a purchasing platform for purchasing product solutions from third party vendors is provided.

14 Claims, 76 Drawing Sheets

(56) References Cited

U.S. PATENT DOCUMENTS

| | | | | |
|---|---|---|---|---|
| 6,664,978 | B1 * | 12/2003 | Kekic et al. | 715/733 |
| 6,862,619 | B1 | 3/2005 | Sugauchi et al. | |
| 7,133,907 | B2 | 11/2006 | Carlson et al. | |
| 7,143,615 | B2 | 12/2006 | Connor et al. | |
| 7,457,866 | B1 | 11/2008 | Hackworth et al. | |
| 7,478,107 | B1 | 1/2009 | Yehuda | |
| 7,620,848 | B1 | 11/2009 | Tanner | |
| 7,624,351 | B2 | 11/2009 | Ungerq et al. | |
| 7,685,261 | B1 | 3/2010 | Marinelli et al. | |
| 7,734,712 | B1 | 6/2010 | Meyer et al. | |
| 2001/0018673 | A1 | 8/2001 | Goldband et al. | |
| 2002/0046147 | A1 * | 4/2002 | Livesay et al. | 705/37 |
| 2002/0055890 | A1 * | 5/2002 | Foley | 705/27 |
| 2002/0069271 | A1 | 6/2002 | Tindal et al. | |
| 2002/0161664 | A1 | 10/2002 | Shaya et al. | |
| 2003/0083941 | A1 | 5/2003 | Moran et al. | |
| 2003/0084176 | A1 | 5/2003 | Tewari et al. | |
| 2003/0145074 | A1 | 7/2003 | Penick | |
| 2004/0006617 | A1 | 1/2004 | Hikida et al. | |
| 2004/0122729 | A1 | 6/2004 | Gillespie et al. | |
| 2005/0108348 | A1 | 5/2005 | Lee | |
| 2006/0123104 | A1 | 6/2006 | Spinelli et al. | |
| 2006/0195566 | A1 | 8/2006 | Hurley | |
| 2006/0212556 | A1 | 9/2006 | Yacoby et al. | |
| 2006/0215580 | A1 | 9/2006 | Iinuma | |
| 2006/0242261 | A1 | 10/2006 | Piot et al. | |
| 2006/0282886 | A1 | 12/2006 | Gaug | |
| 2006/0294219 | A1 | 12/2006 | Ogawa et al. | |
| 2007/0039047 | A1 | 2/2007 | Chen et al. | |
| 2007/0143710 | A1 | 6/2007 | Hayman | |
| 2007/0174732 | A1 | 7/2007 | Irby et al. | |
| 2007/0192704 | A1 | 8/2007 | Bauman et al. | |
| 2007/0220510 | A1 | 9/2007 | Bell et al. | |
| 2007/0282895 | A1 | 12/2007 | Sakamaki et al. | |
| 2008/0059308 | A1 | 3/2008 | Gerken | |
| 2008/0103915 | A1 | 5/2008 | Maruszak | |
| 2008/0183852 | A1 | 7/2008 | Pramer et al. | |

* cited by examiner

FIG. 1 (screenshot)

FIG. 2 (screenshot)

*FIG. 3 (screenshot)*

*FIG. 4 (screenshot)*

*FIG. 5 (screenshot)*

FIG. 6 *(screenshot)*

FIG. 7 (screenshot)

*FIG. 8 (screenshot)*

FIG. 9 (screenshot)

FIG. 10 (screenshot)

*FIG. 11* *(screenshot)*

*FIG. 12 (screenshot)*

*FIG. 13 (screenshot)*

FIG. 14 (screenshot)

FIG. 15 (screenshot)

*FIG. 16 (screenshot)*

FIG. 17 *(screenshot)*

FIG. 18 (screenshot)

FIG. 19 (screenshot)

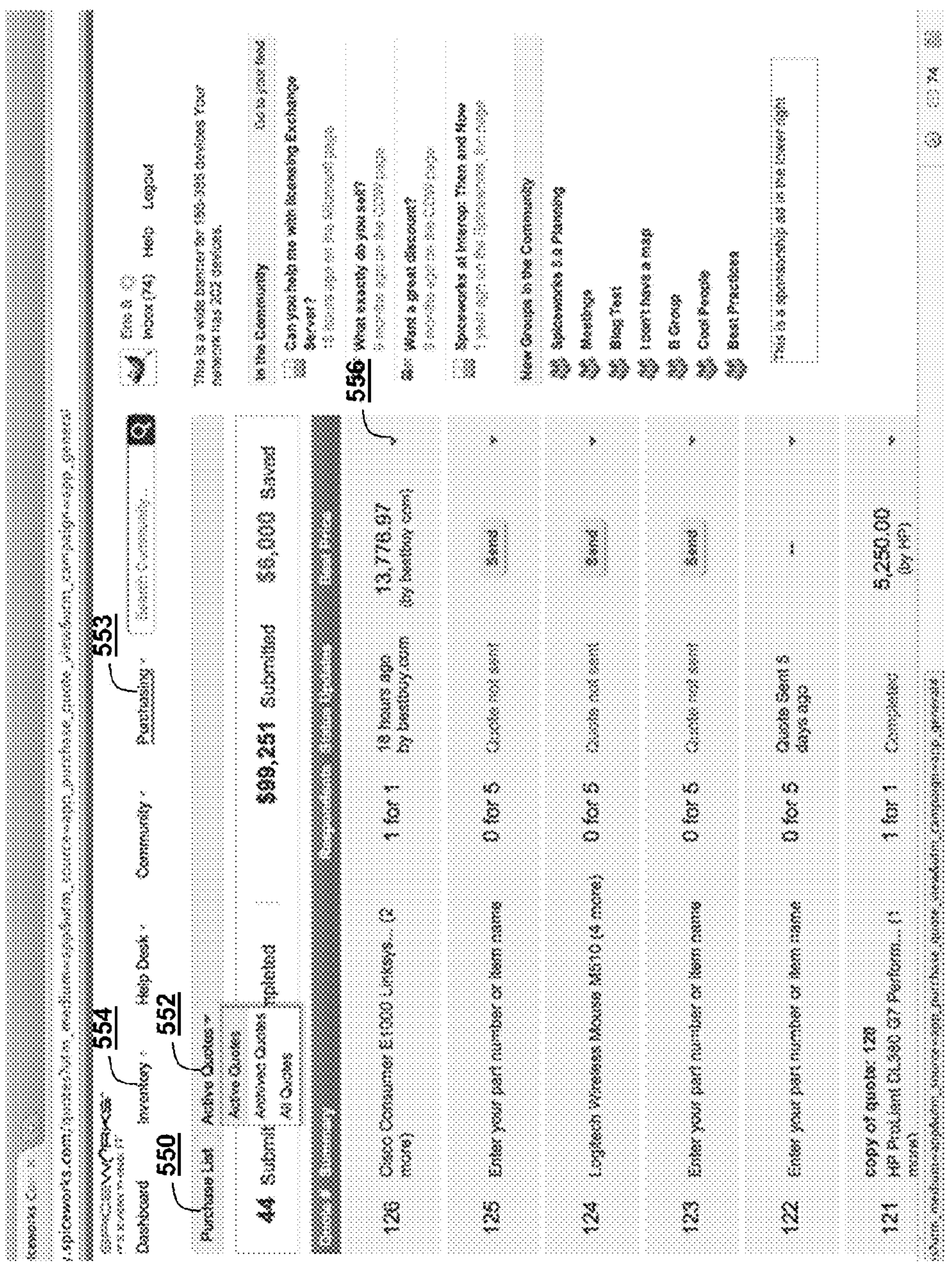
*Fig. 24 (screenshot)*

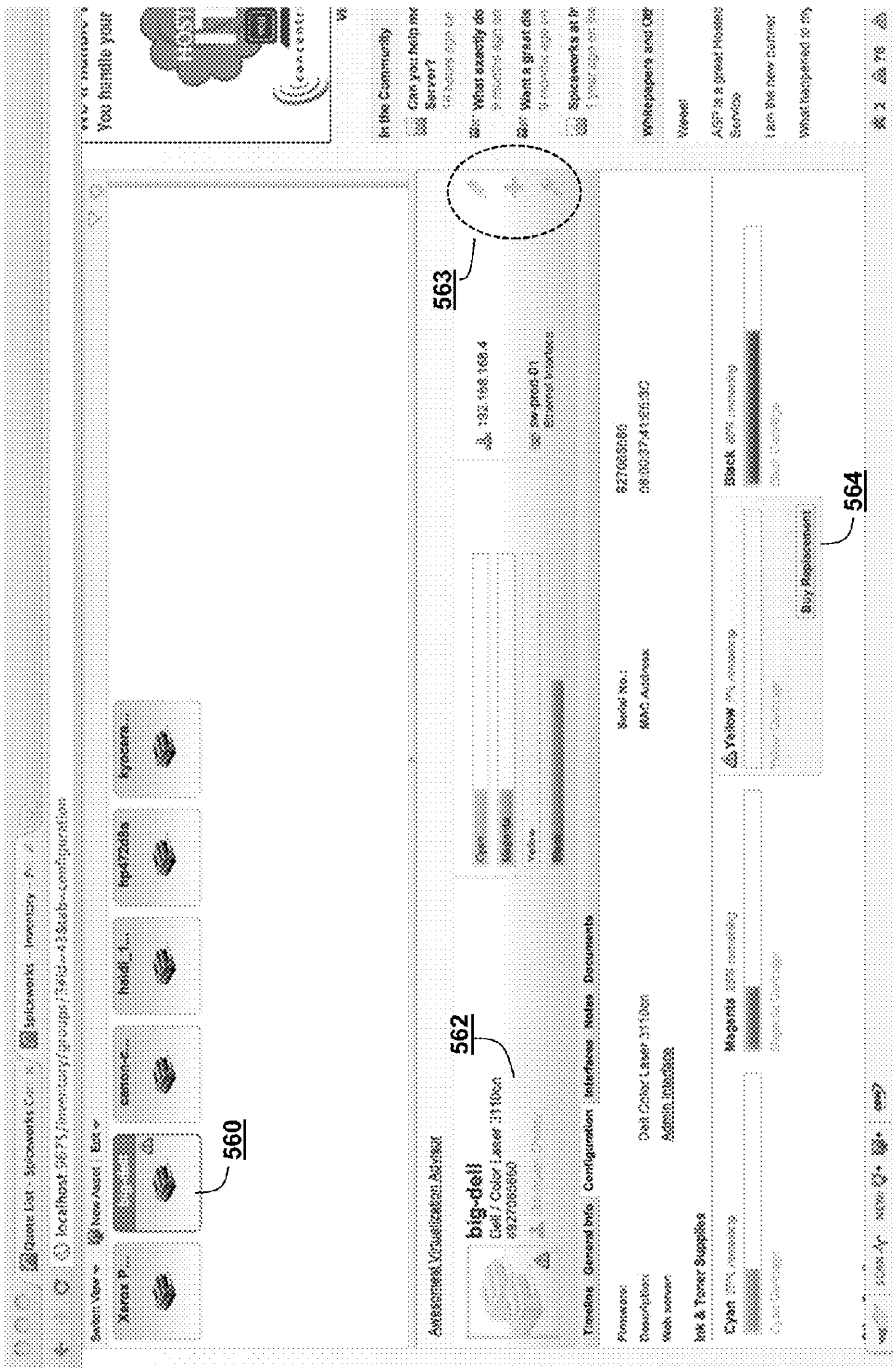
*Fig. 25* (screenshot)

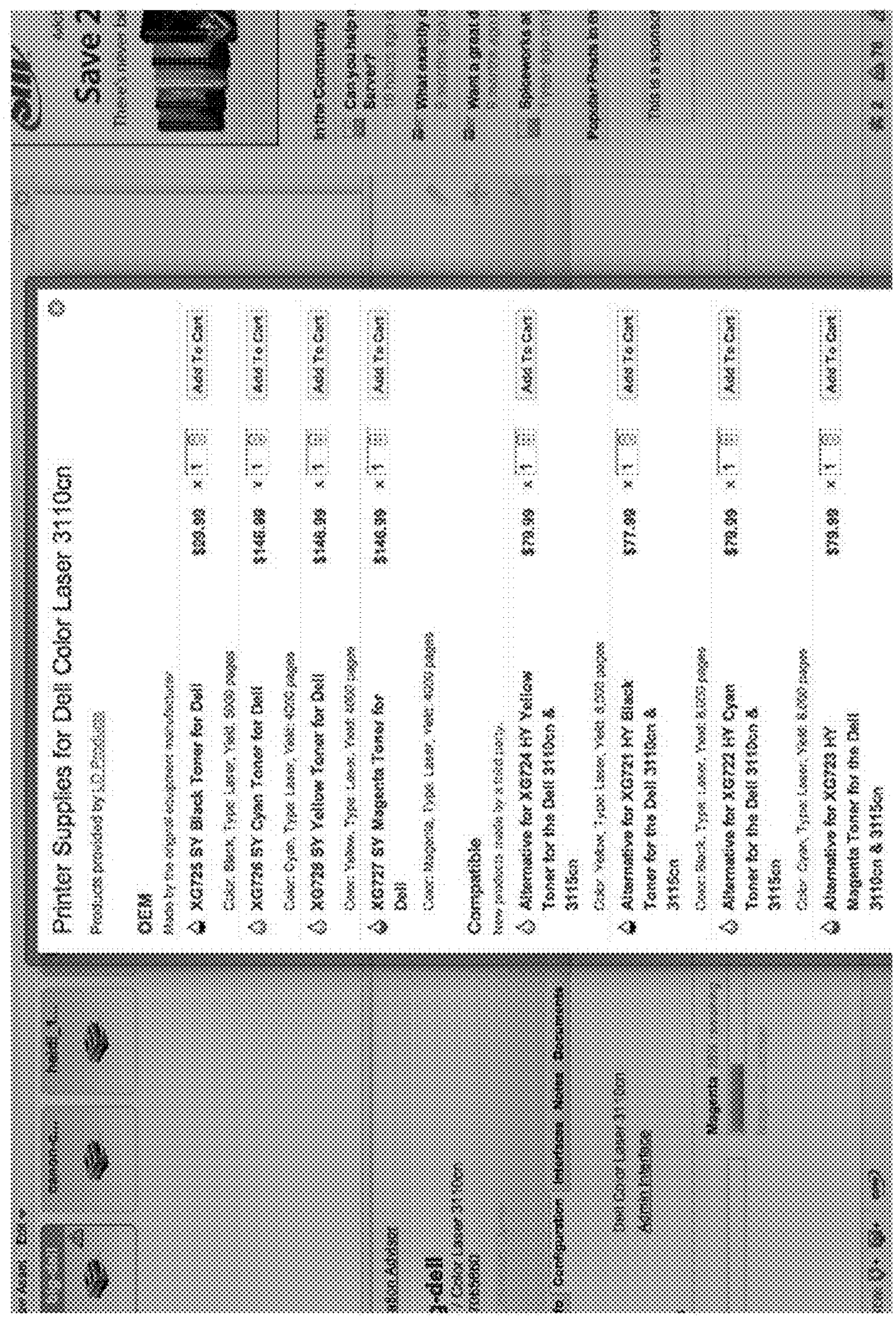
*Fig. 26 (screenshot)*

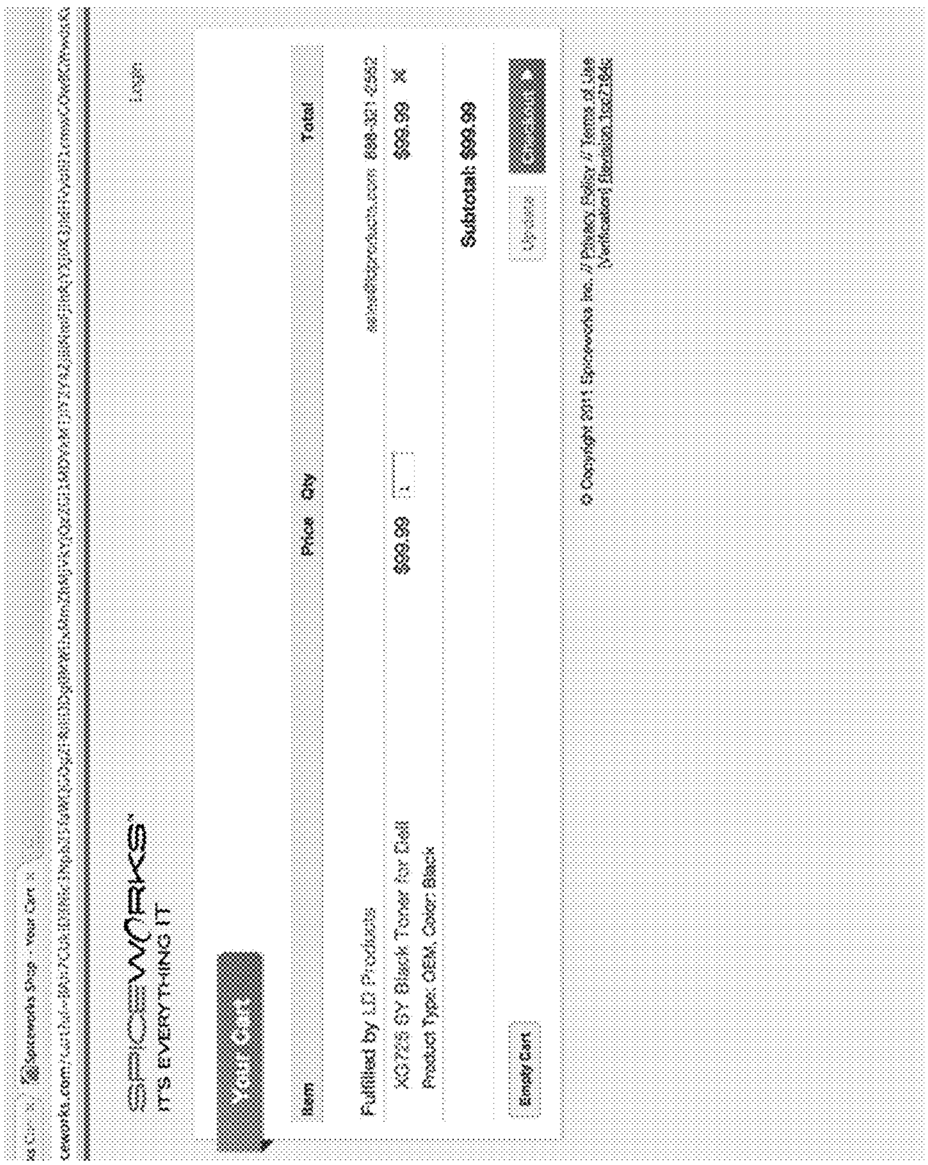
*Fig. 27 (screenshot)*

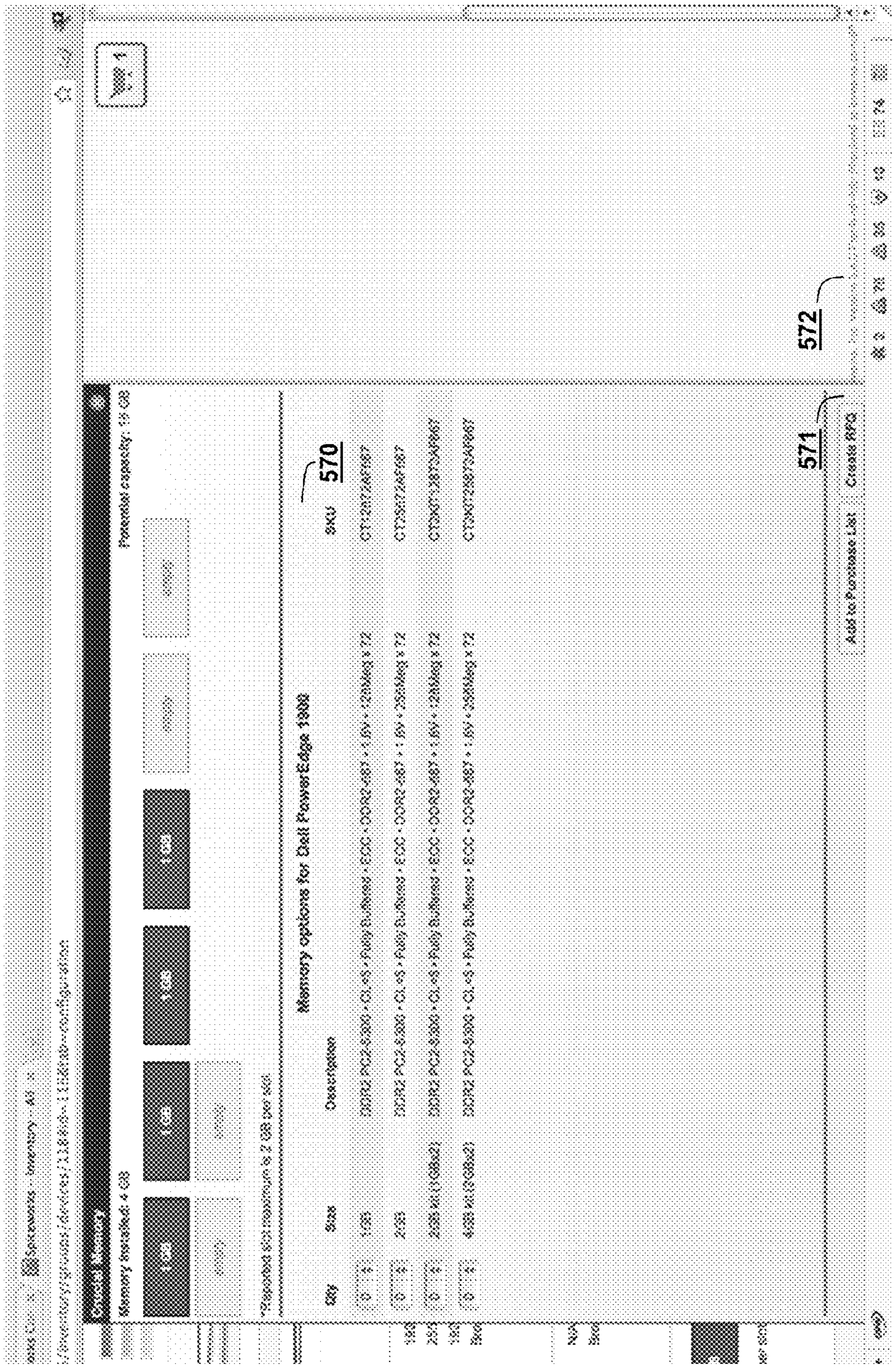
*Fig. 28* (screenshot)

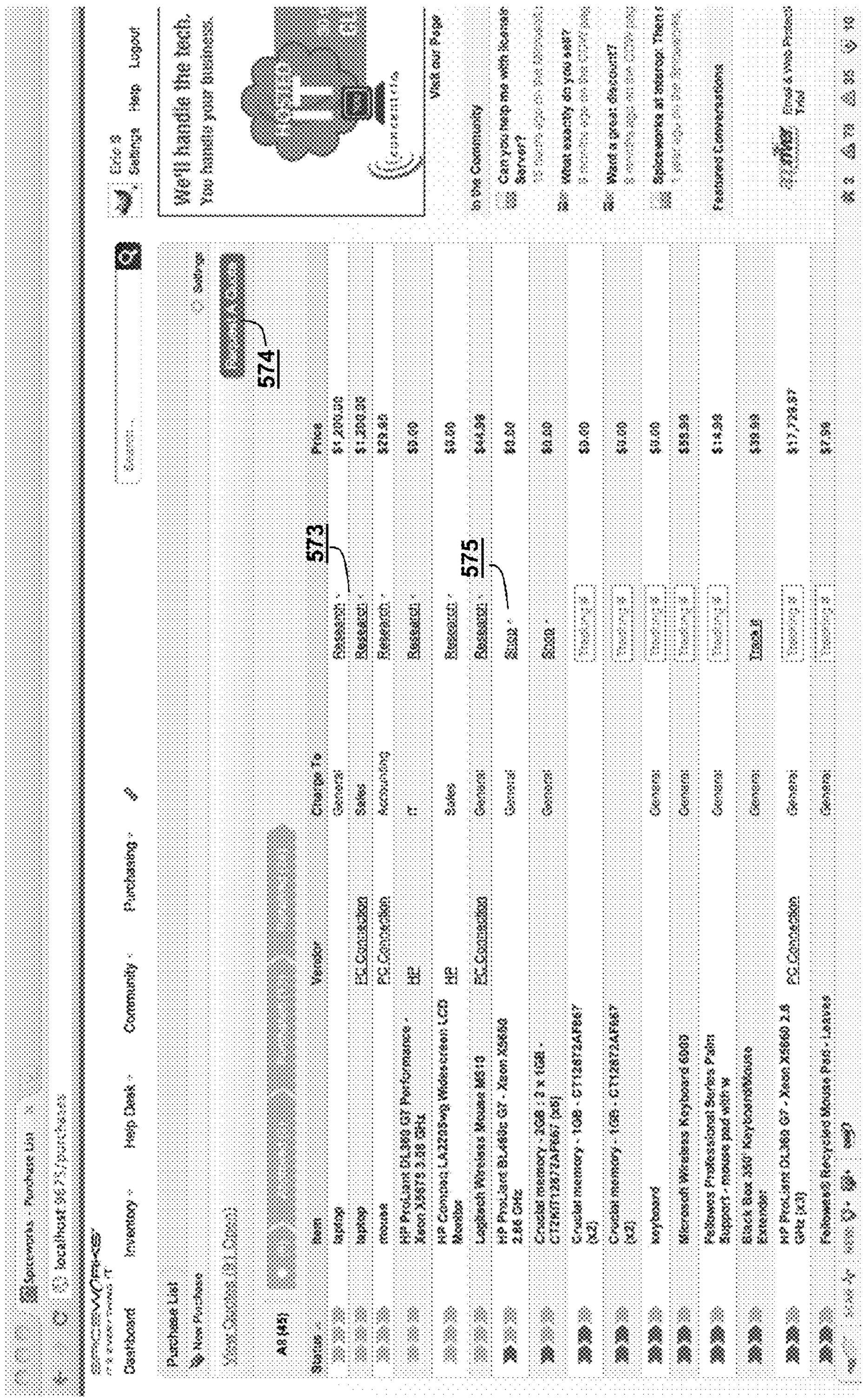
*Fig. 29A (screenshot)*

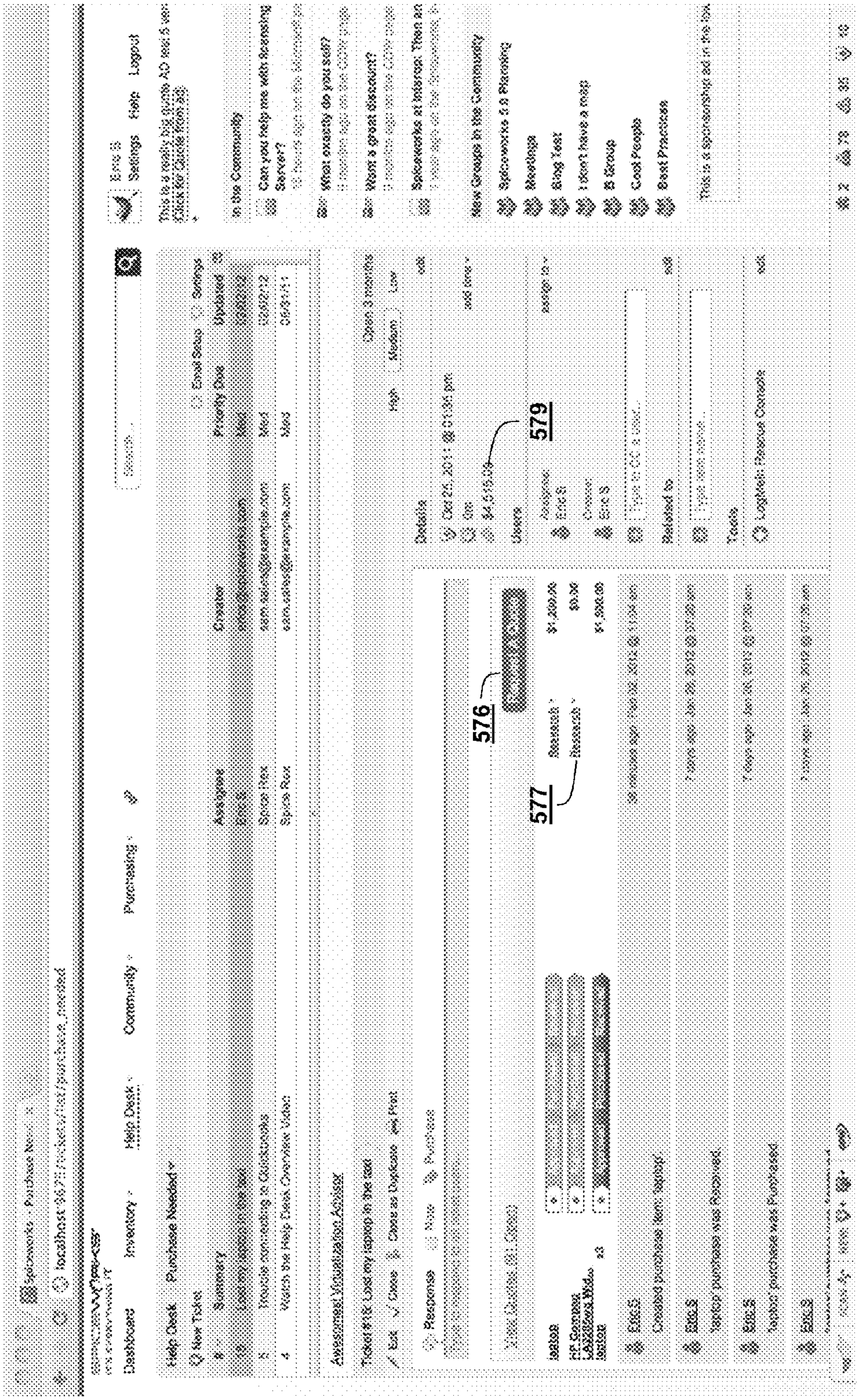
*Fig. 29B (screenshot)*

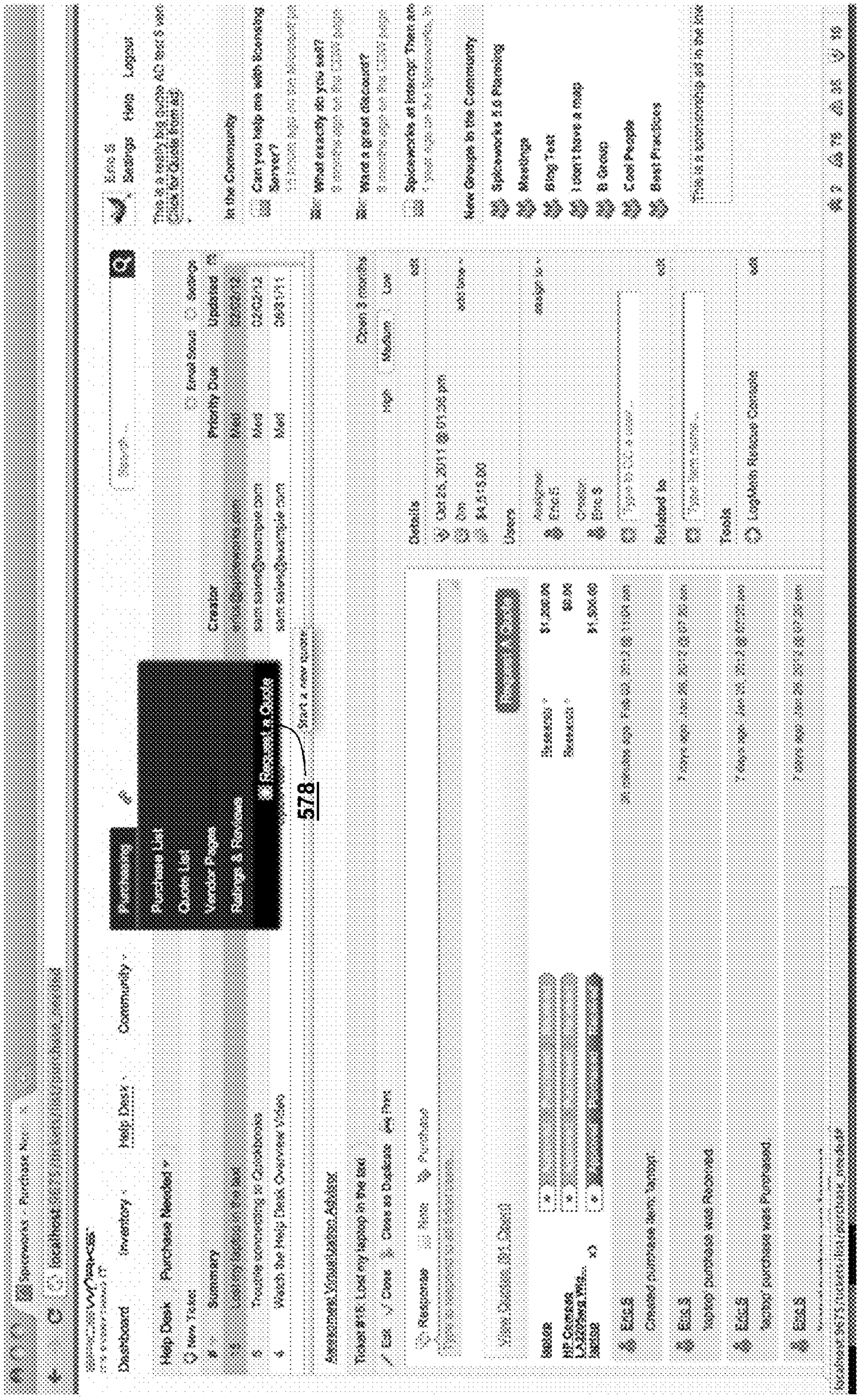
*Fig. 29C (screenshot)*

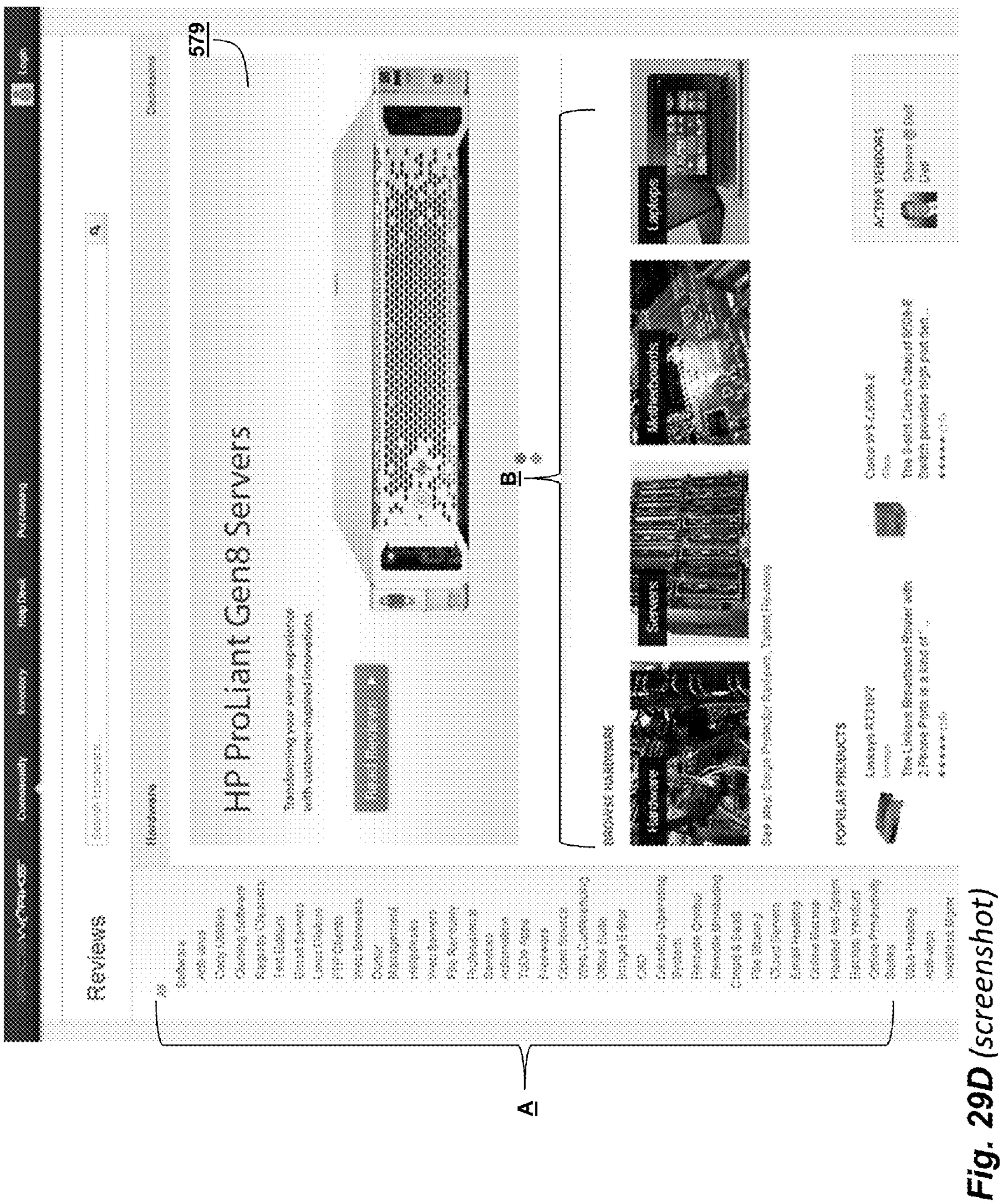
*Fig. 29D* (screenshot)

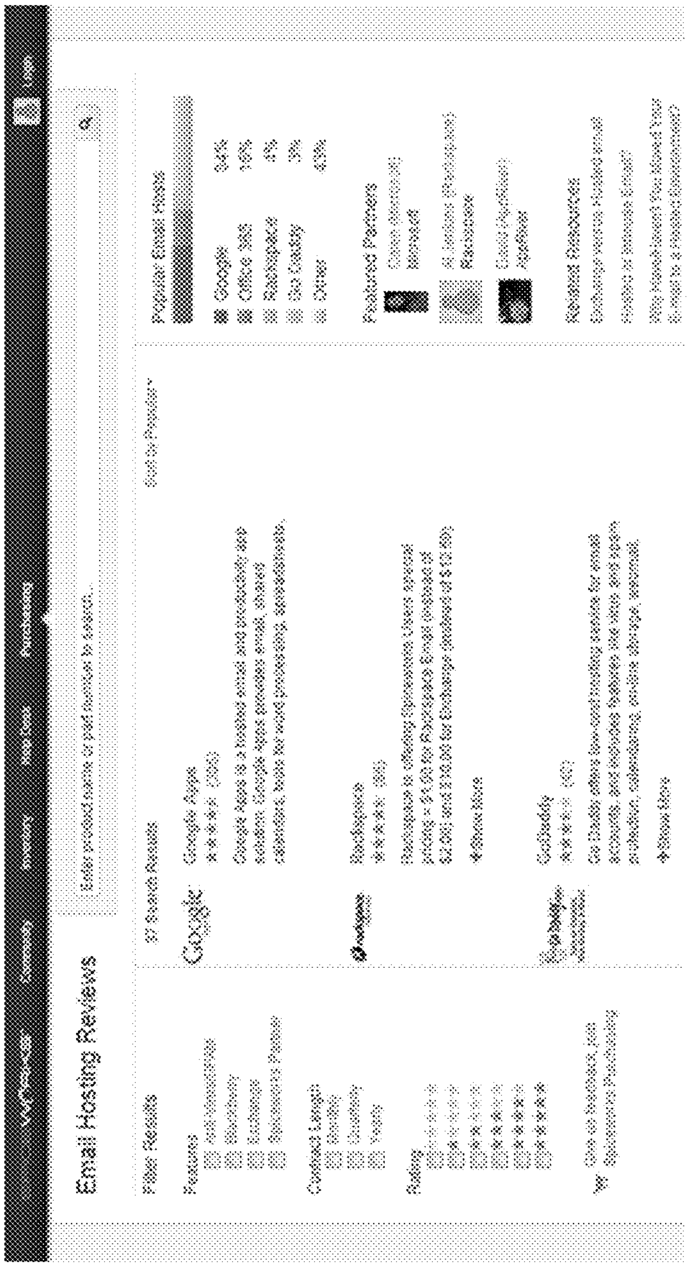
*Fig. 29E (screenshot)*

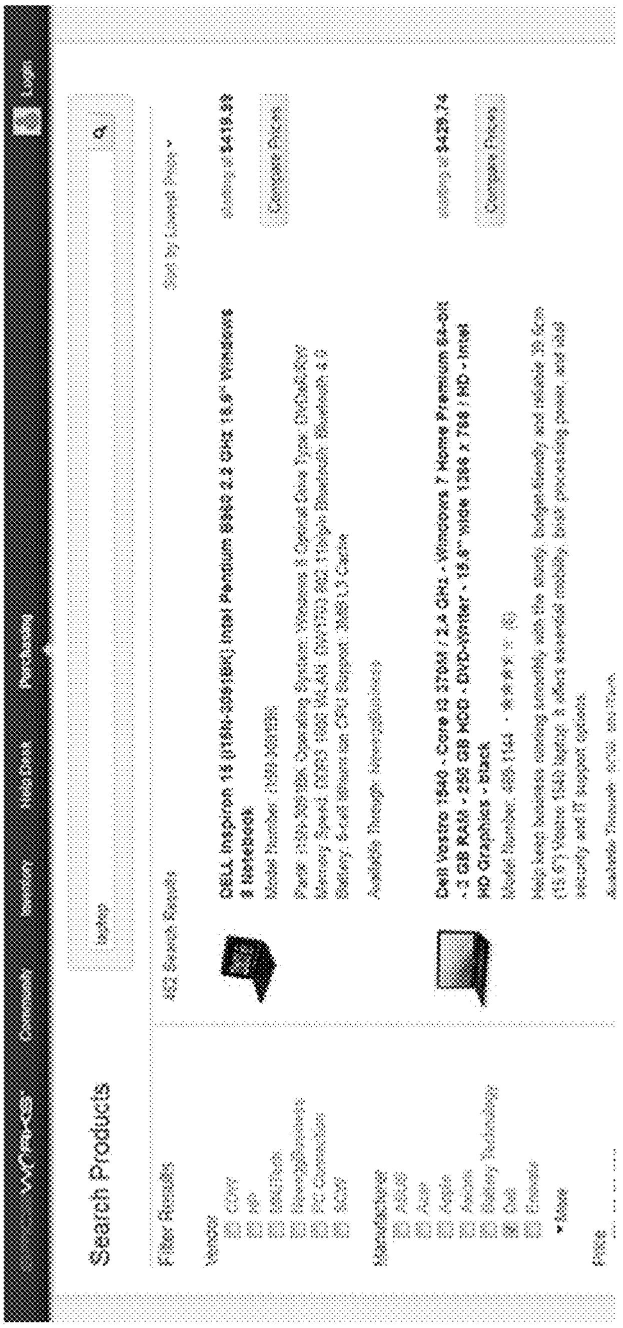
Fig. 29F (screenshot)

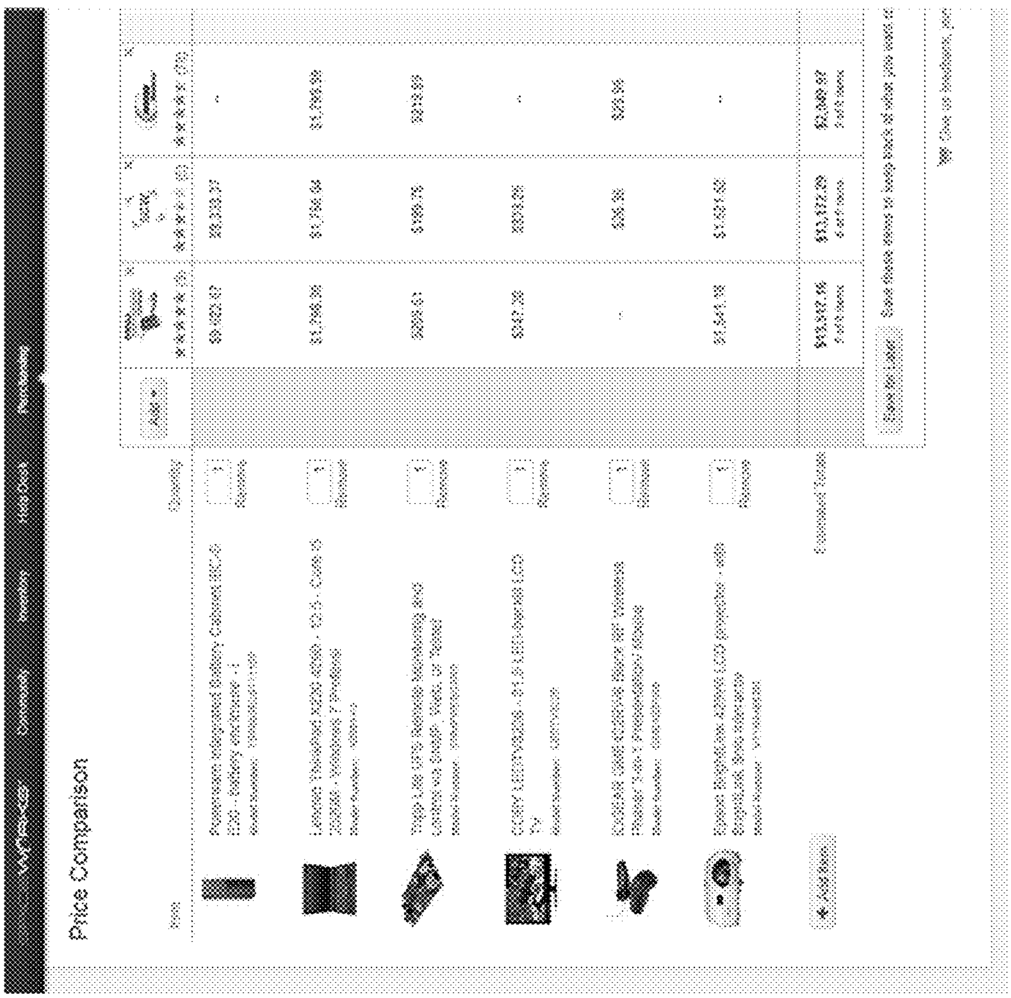
*Fig. 29G (screenshot)*

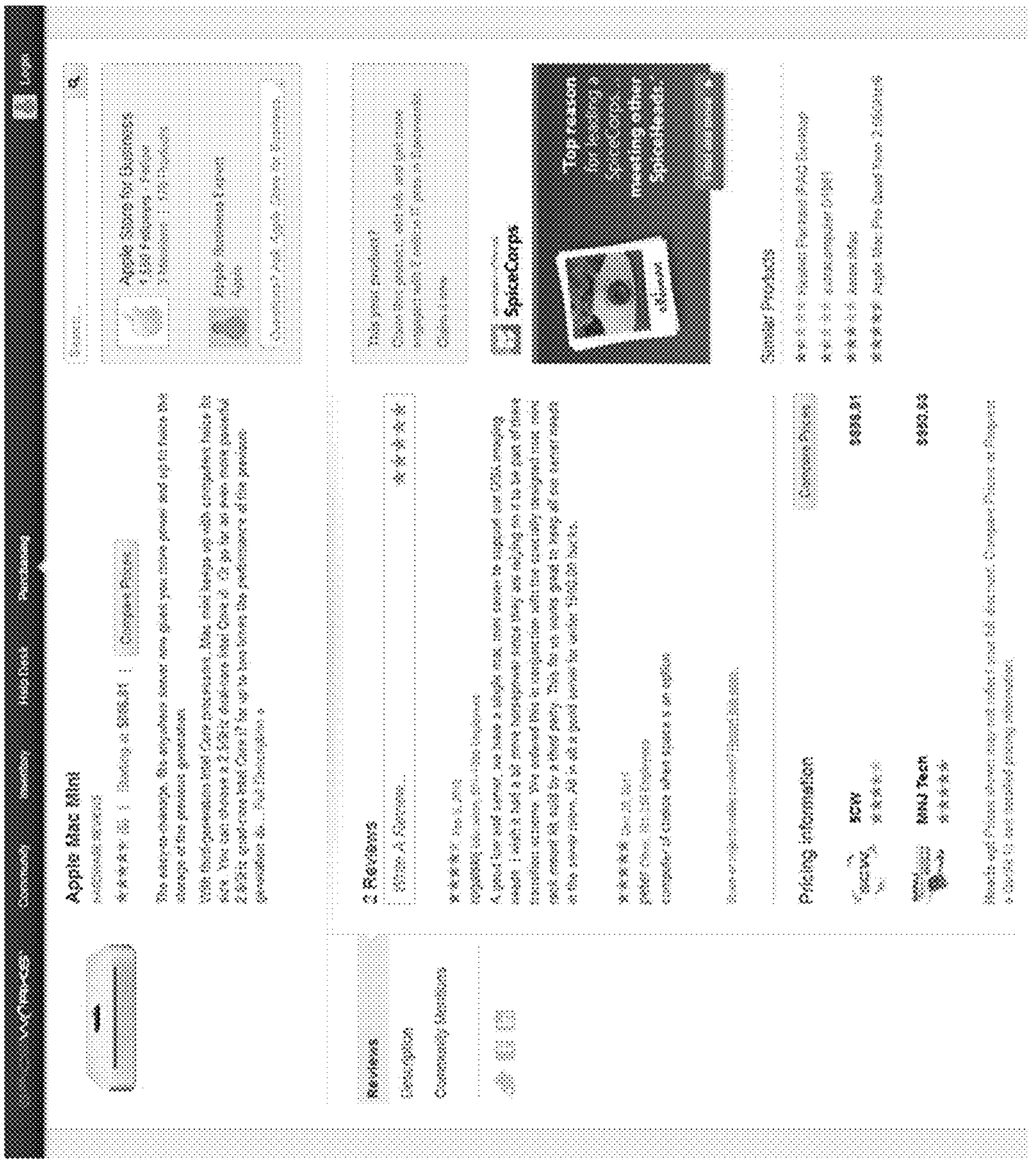
*Fig. 29H (screenshot)*

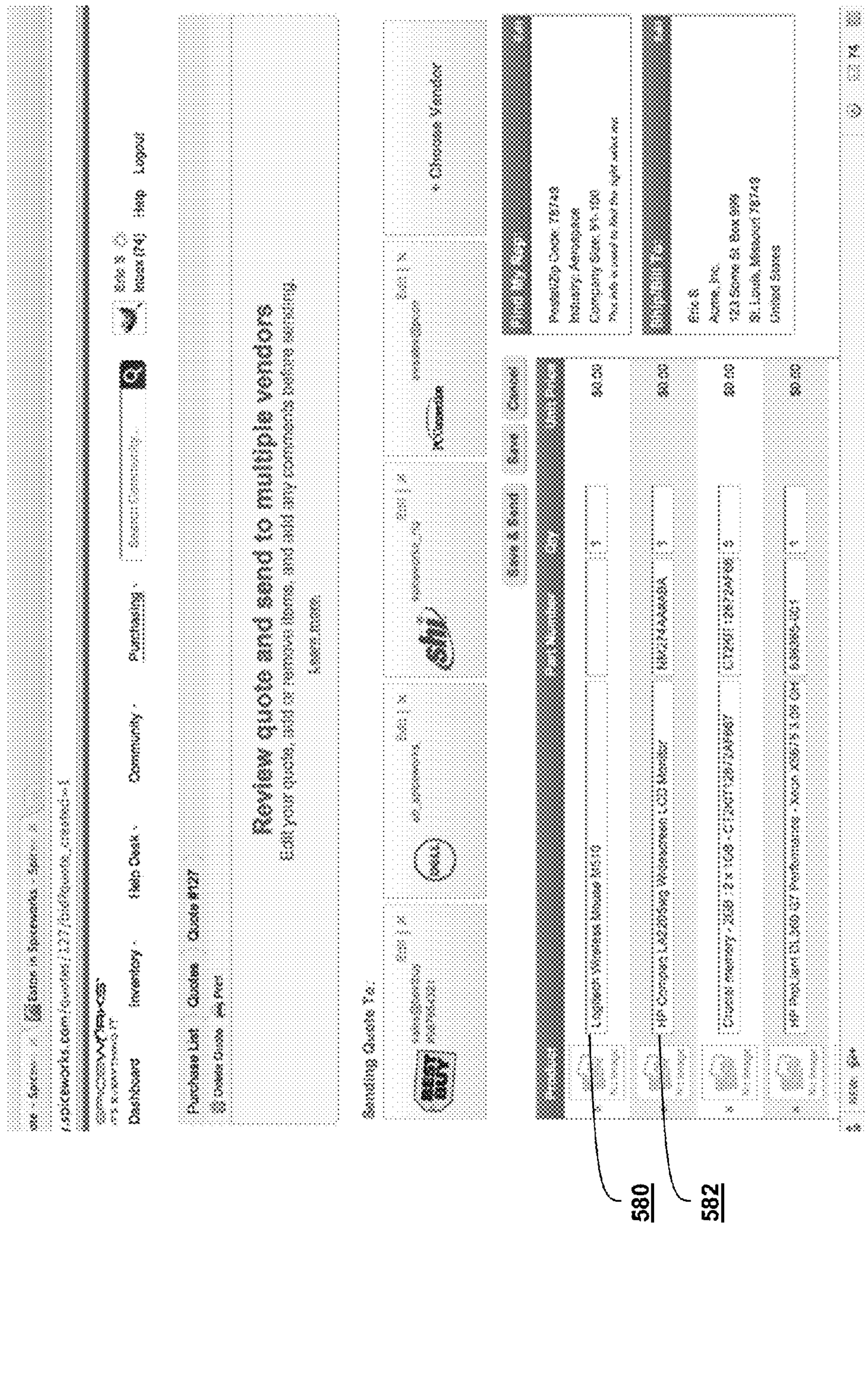
*Fig. 30 (screenshot)*

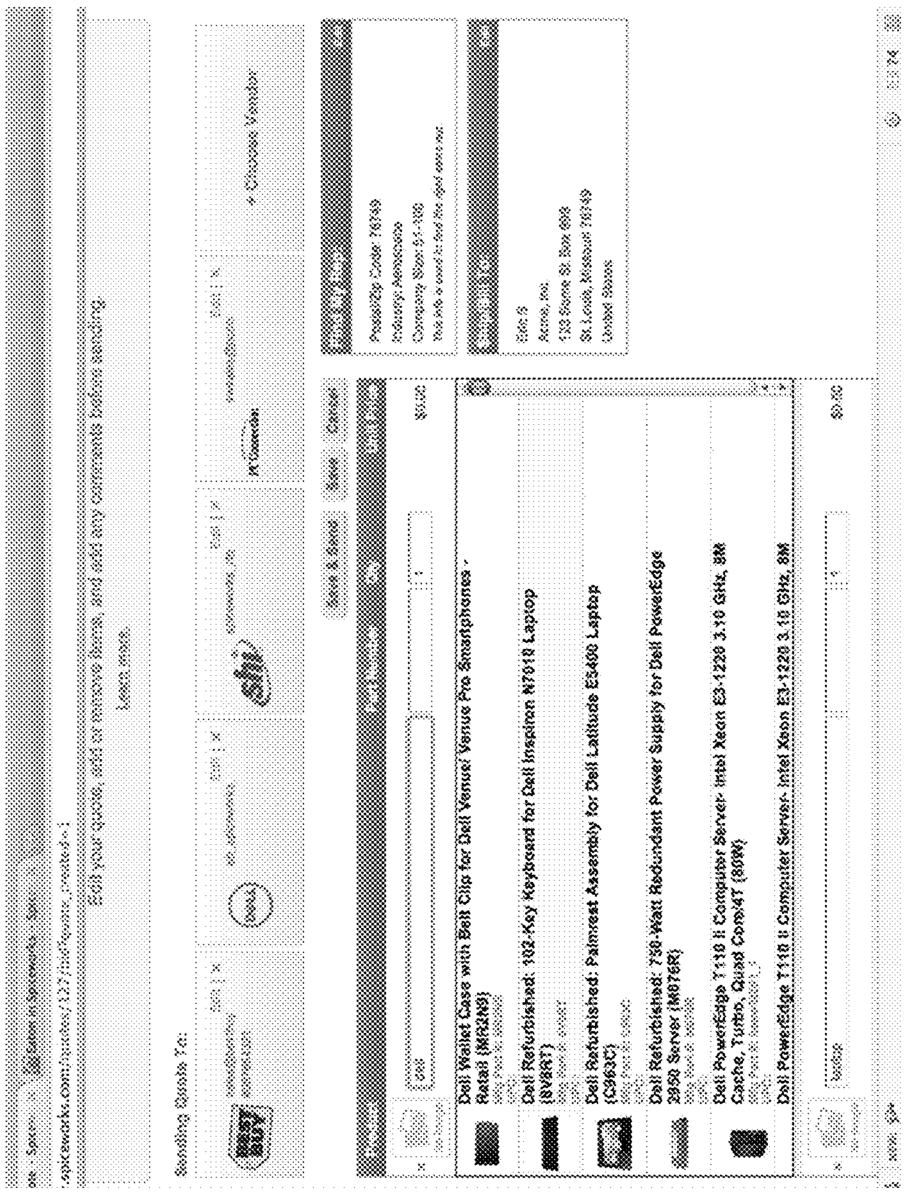
Fig. 31 (screenshot)

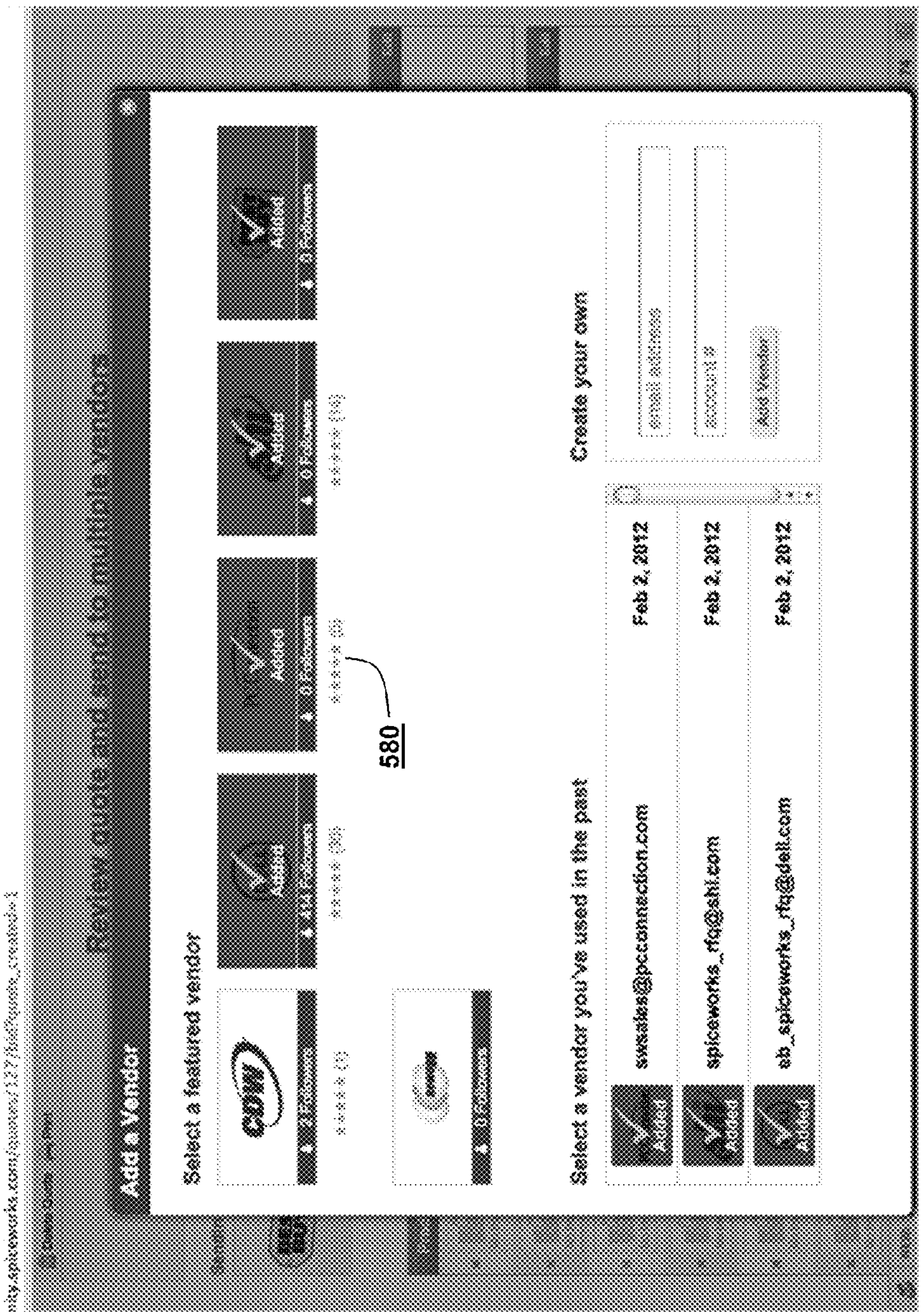
*Fig. 32* (screenshot)

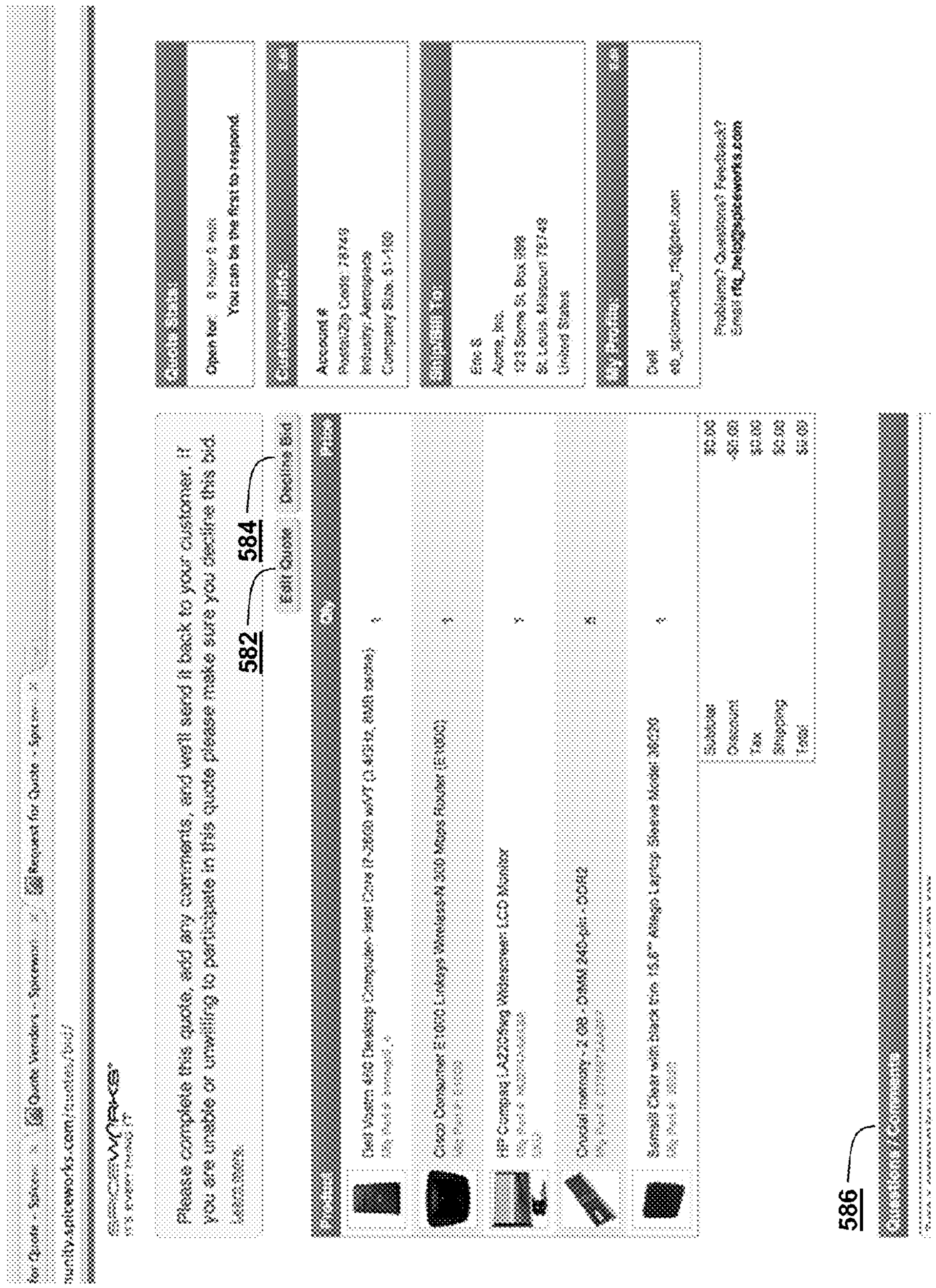
Fig. 33 (screenshot)

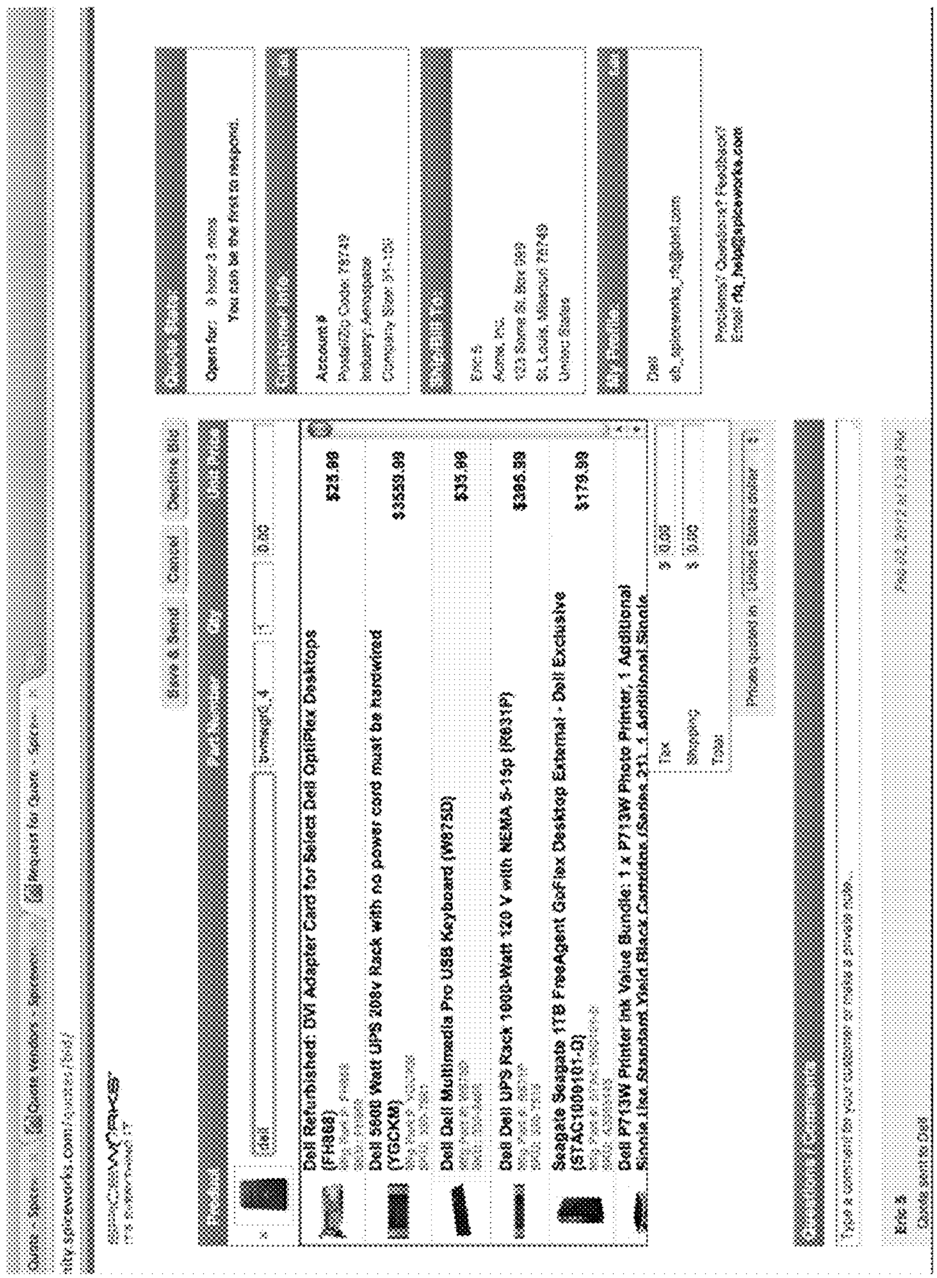
*Fig. 34 (screenshot)*

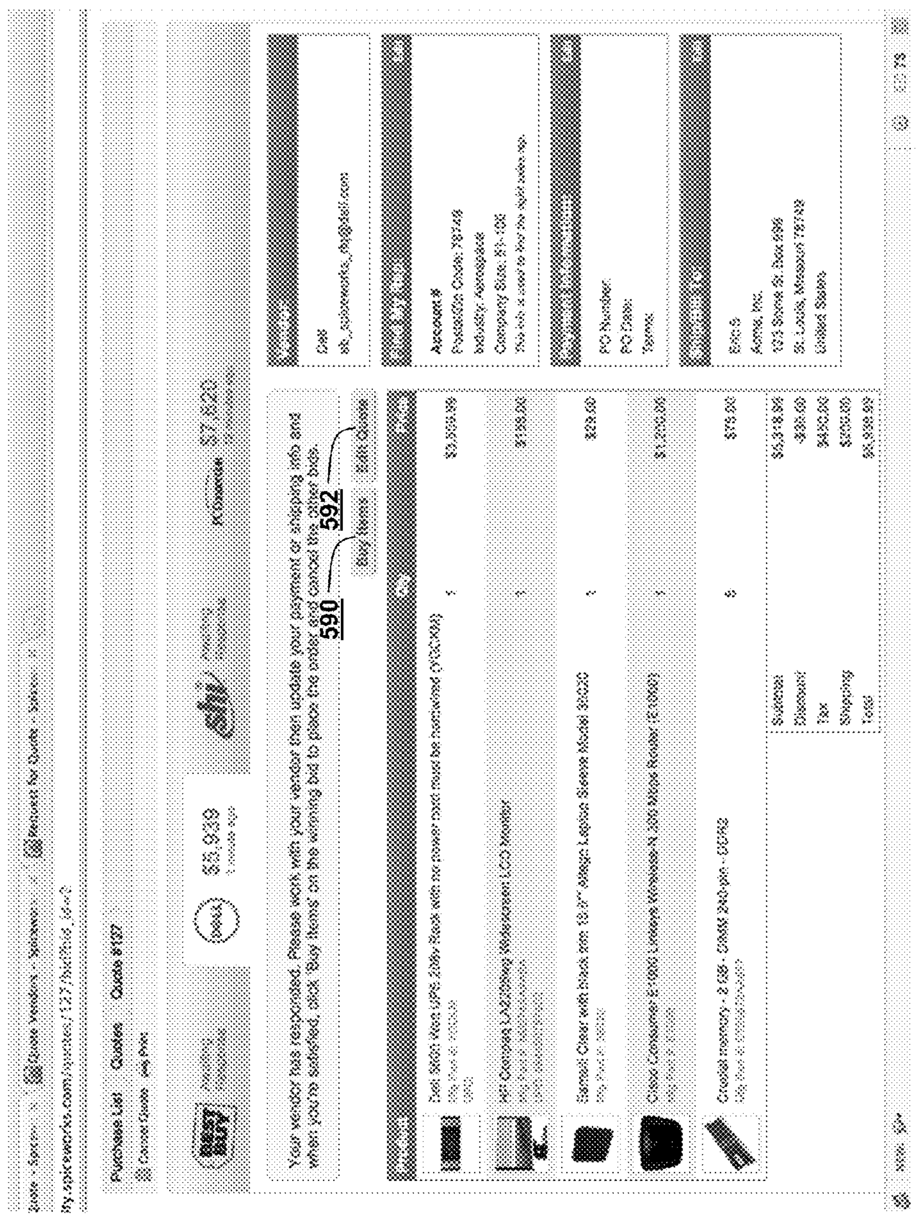
*Fig. 35* (screenshot)

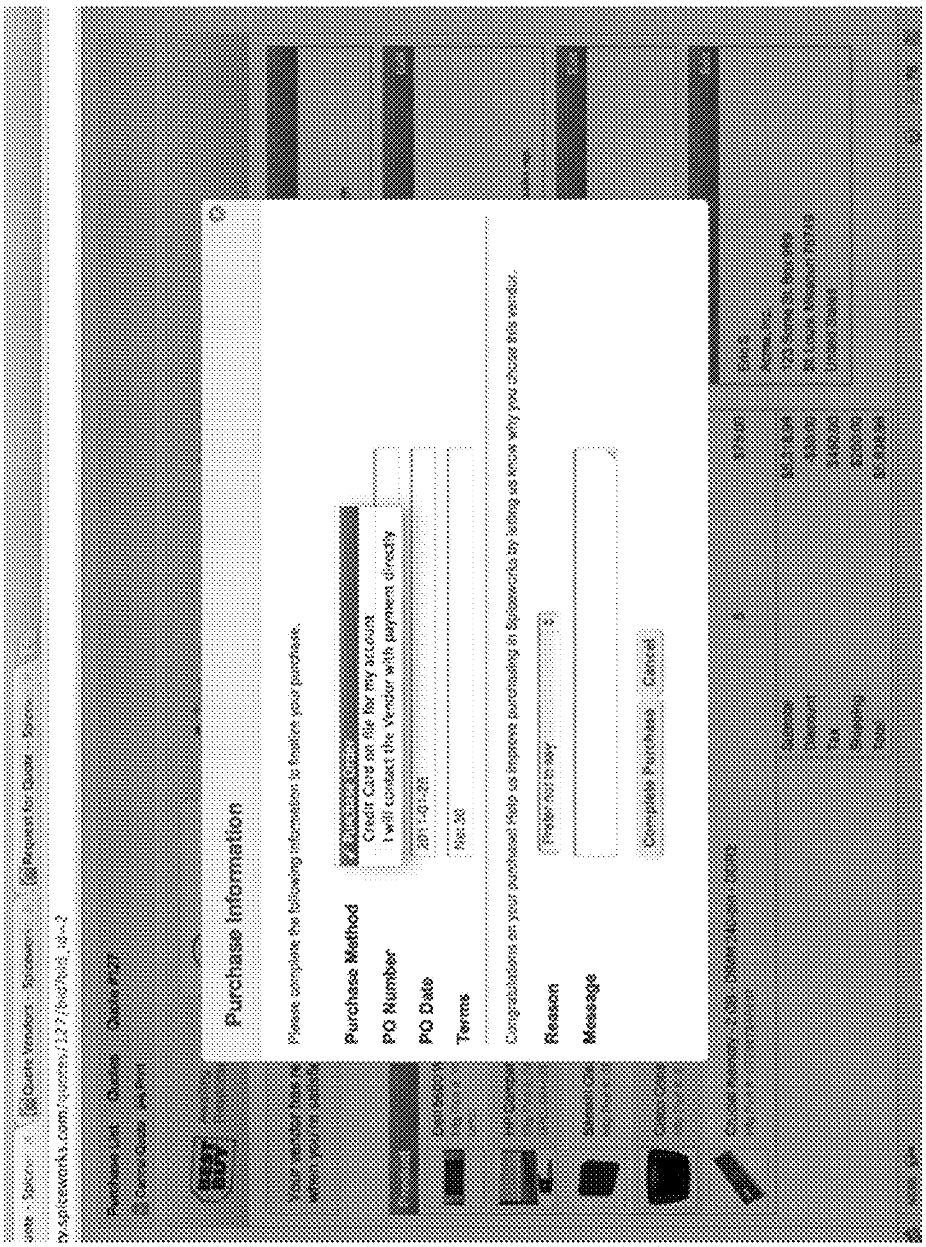
*Fig. 36 (screenshot)*

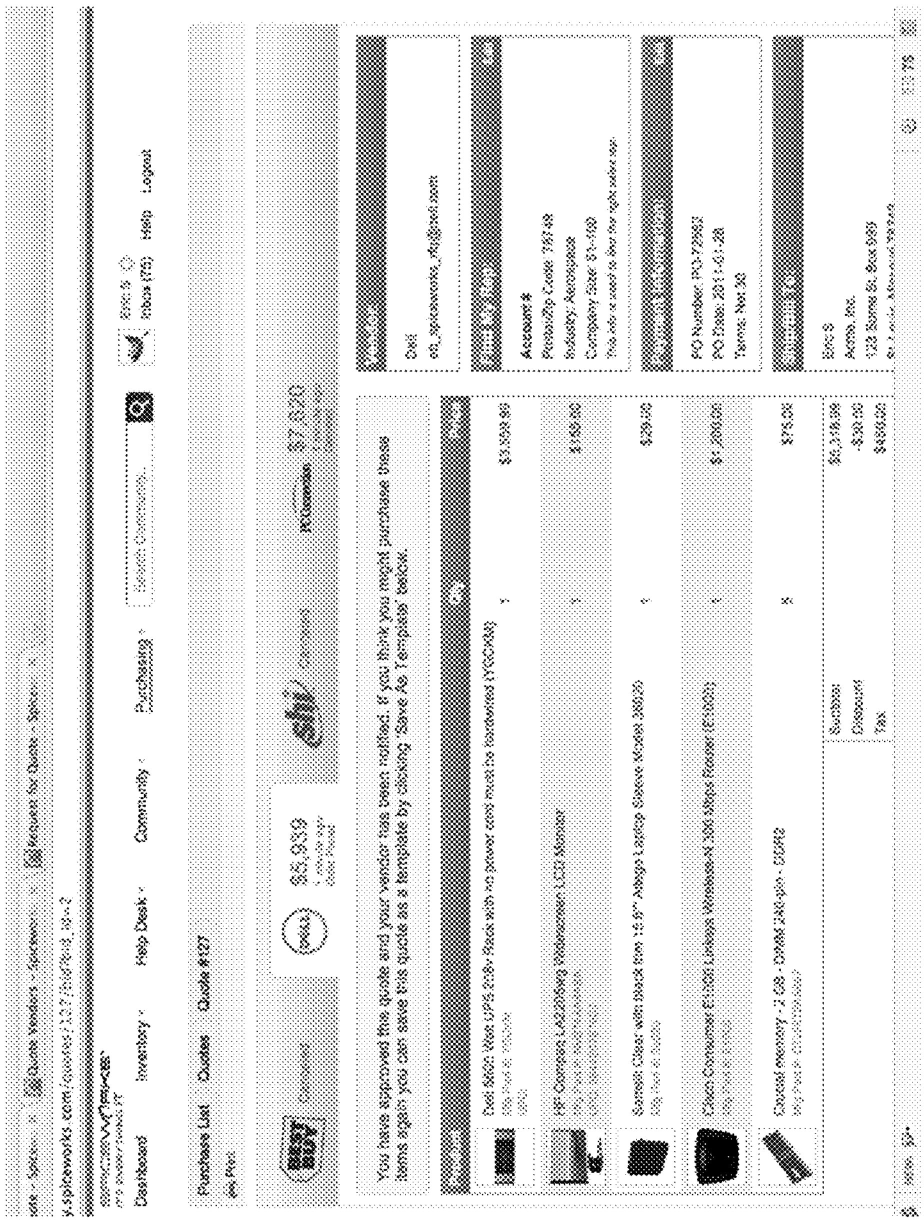
Fig. 37 (screenshot)

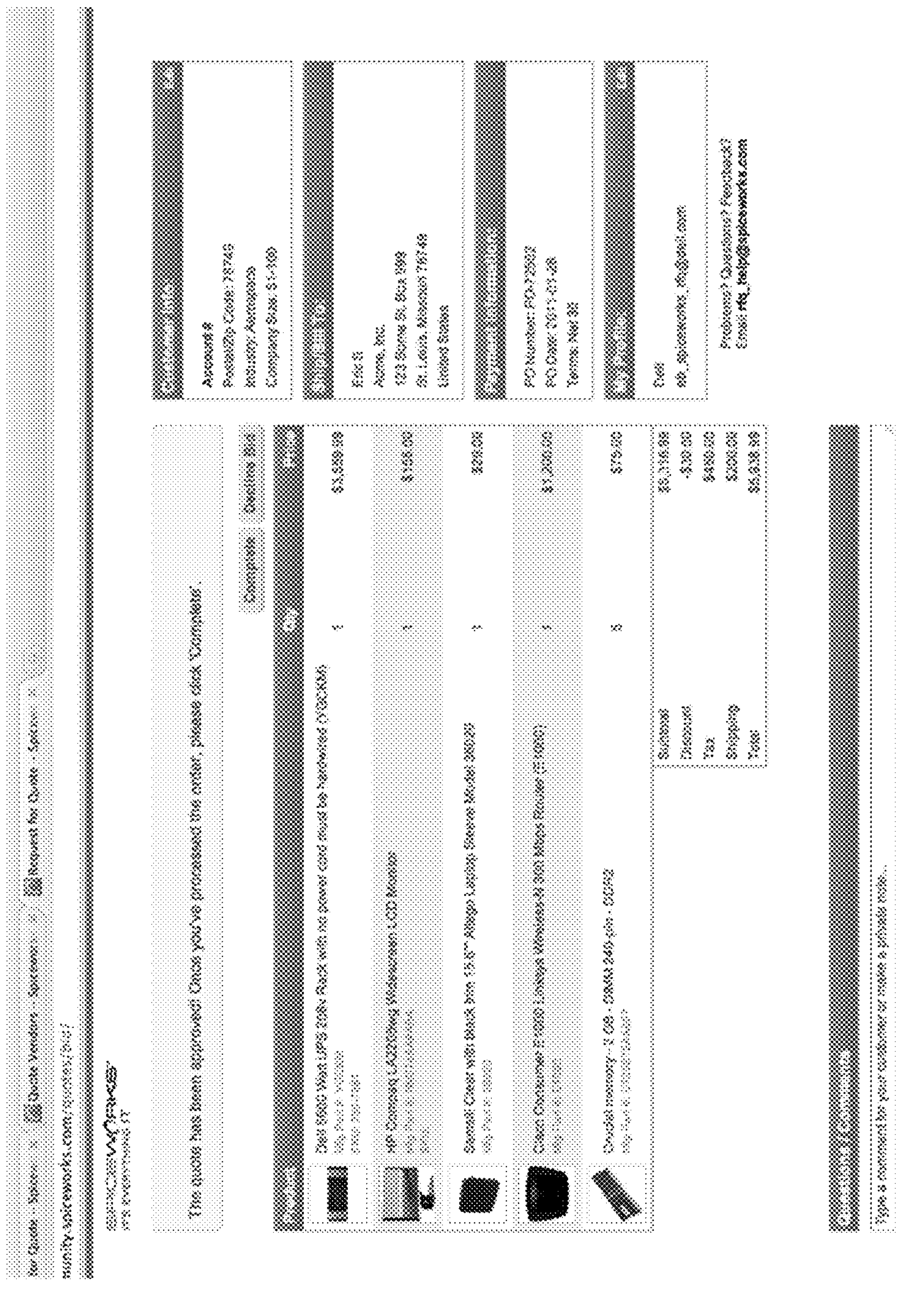
*Fig. 38* (screenshot)

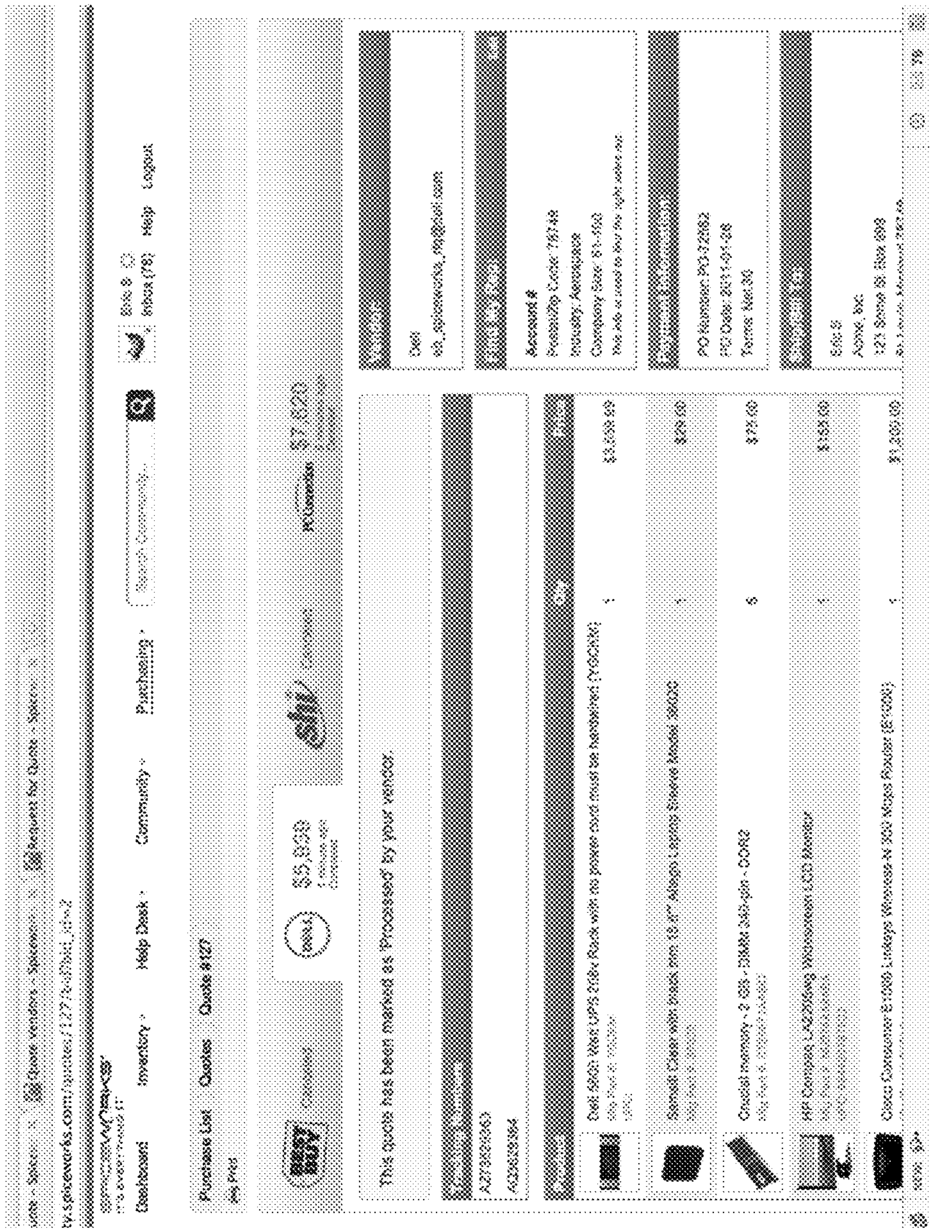
*Fig. 39* (screenshot)

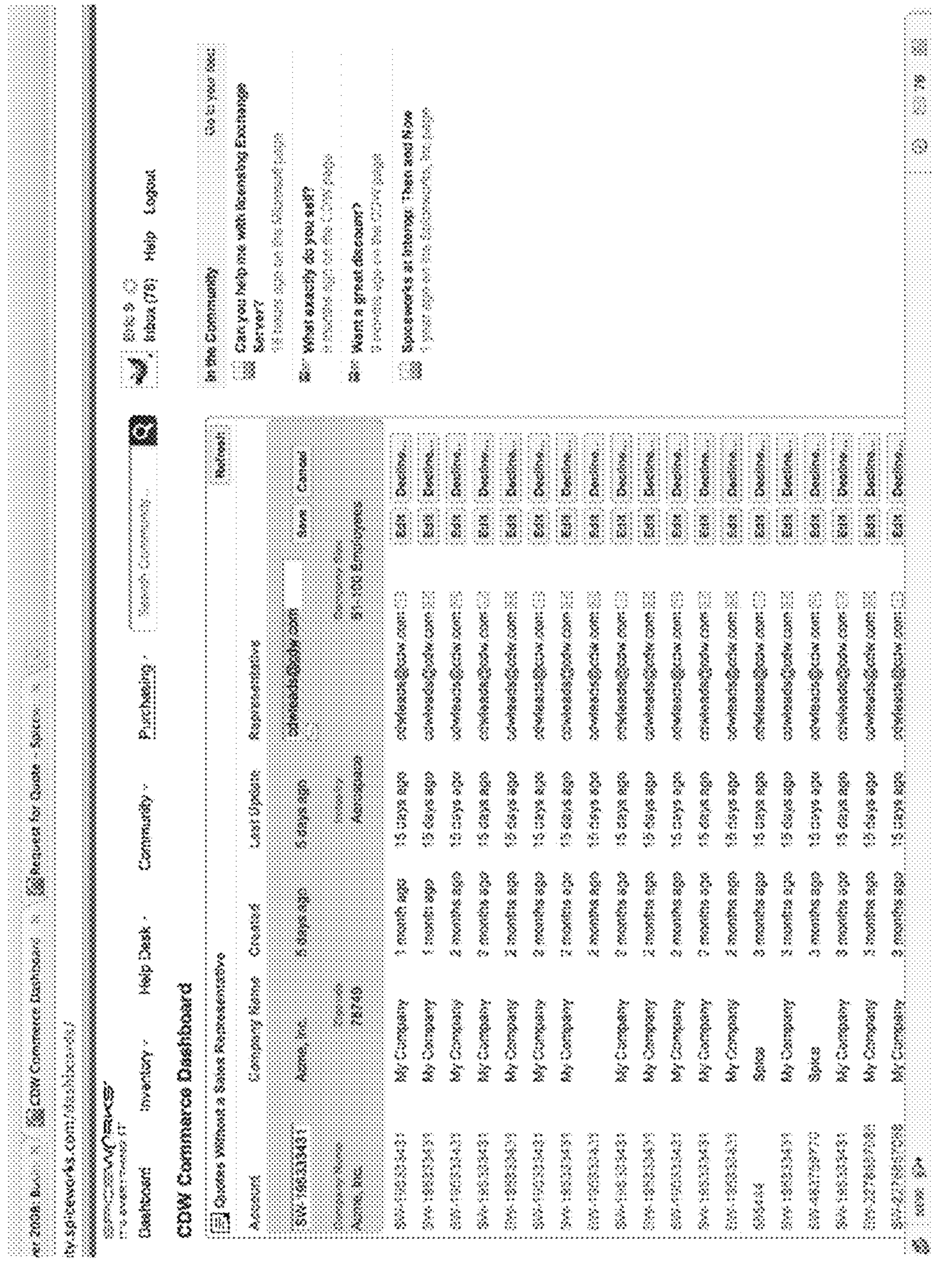
Fig. 40 (screenshot)

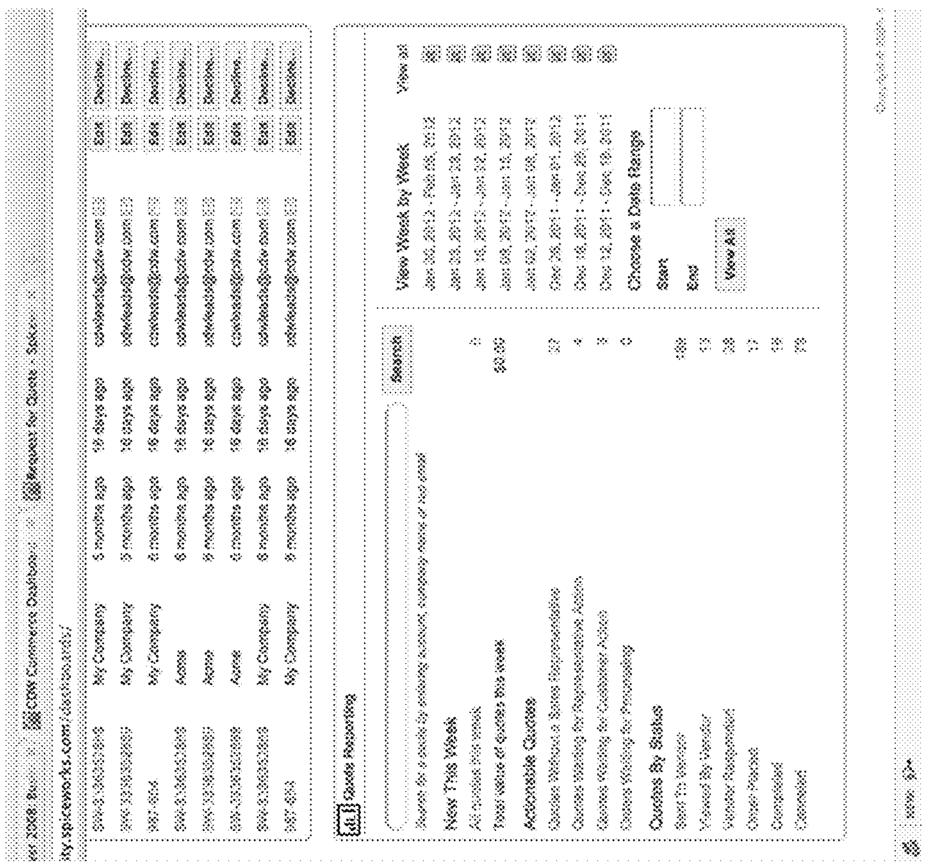
Fig. 41 (screenshot)

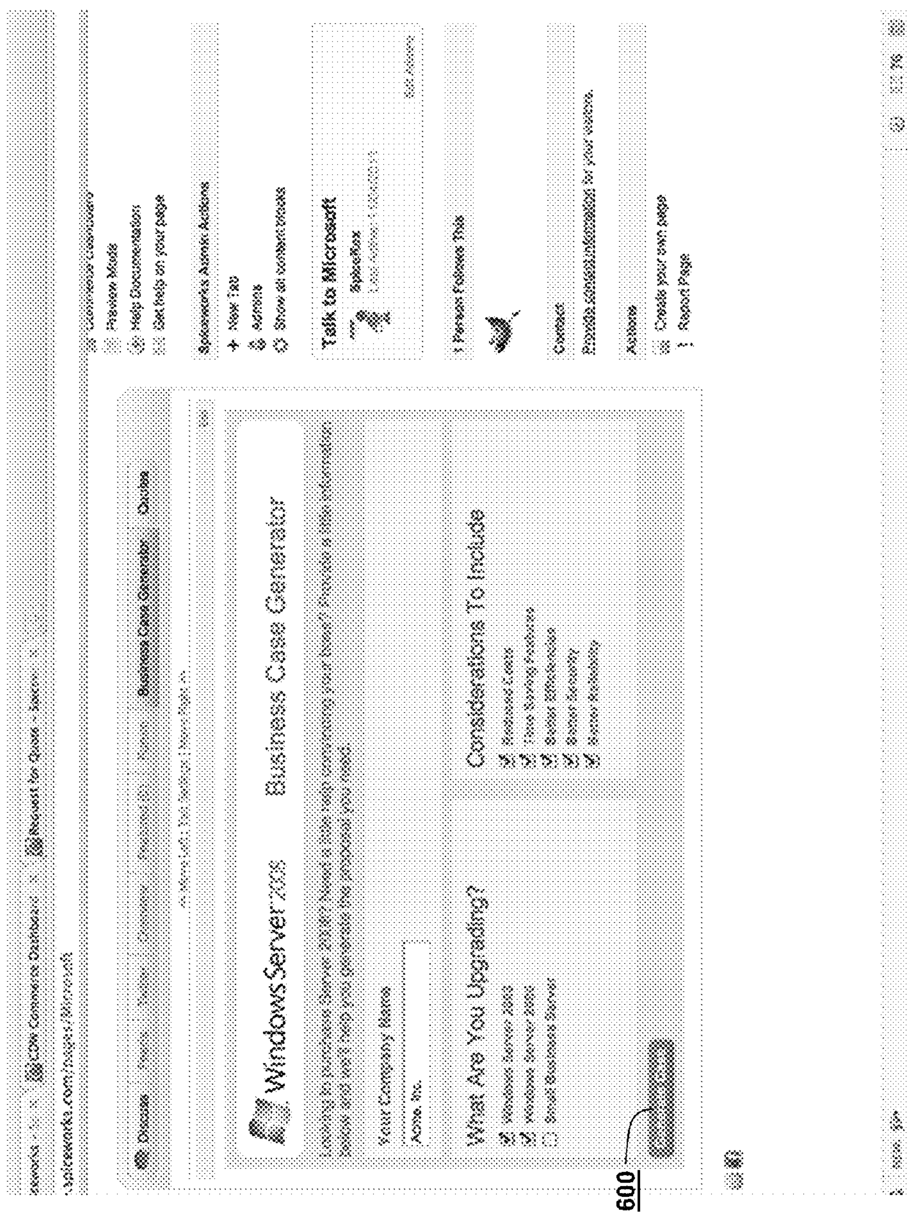
600
*Fig. 42 (screenshot)*

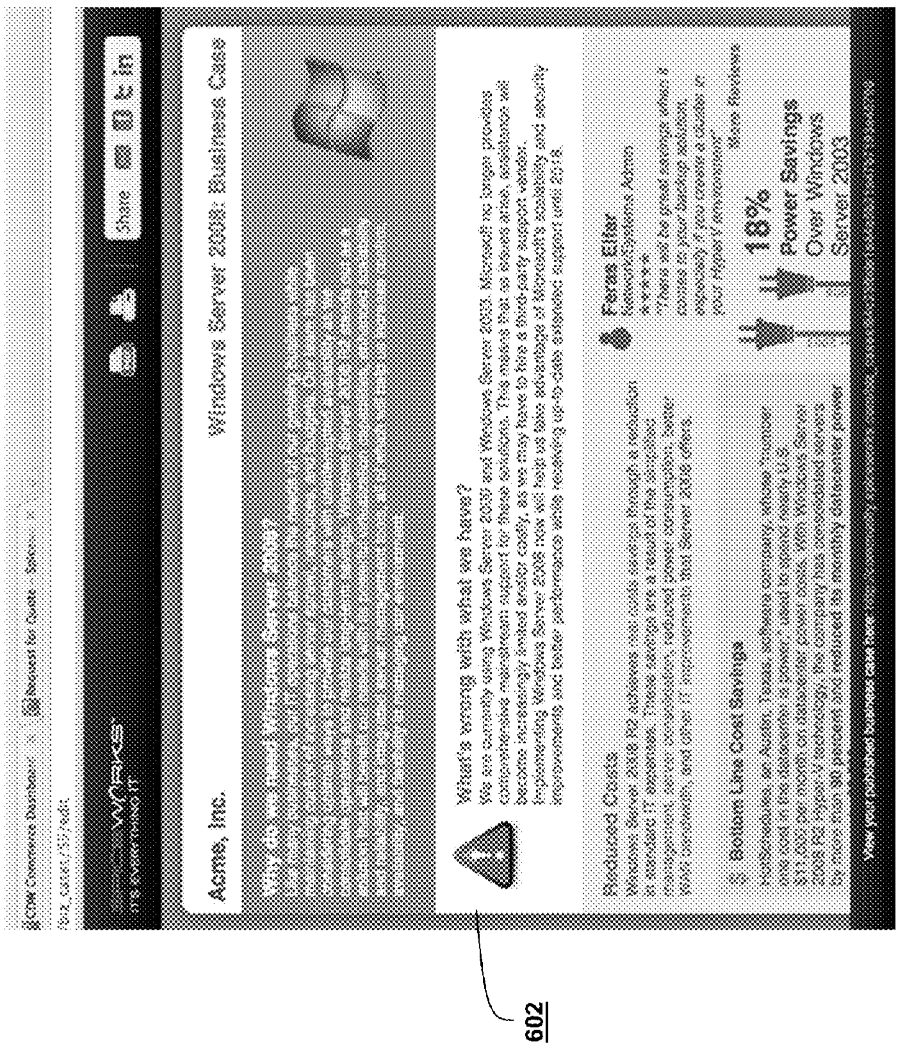
602
*Fig. 43* (screenshot)

604
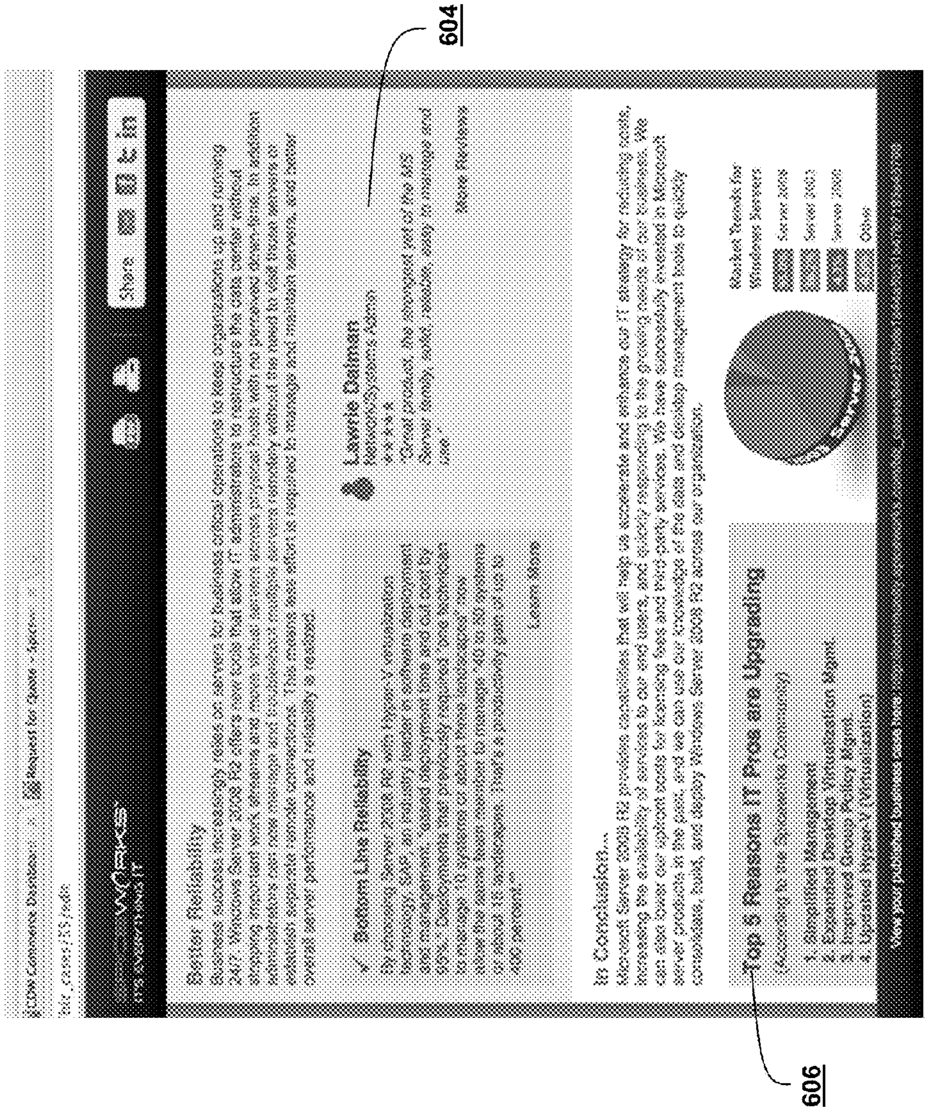
606
*Fig. 44* (screenshot)

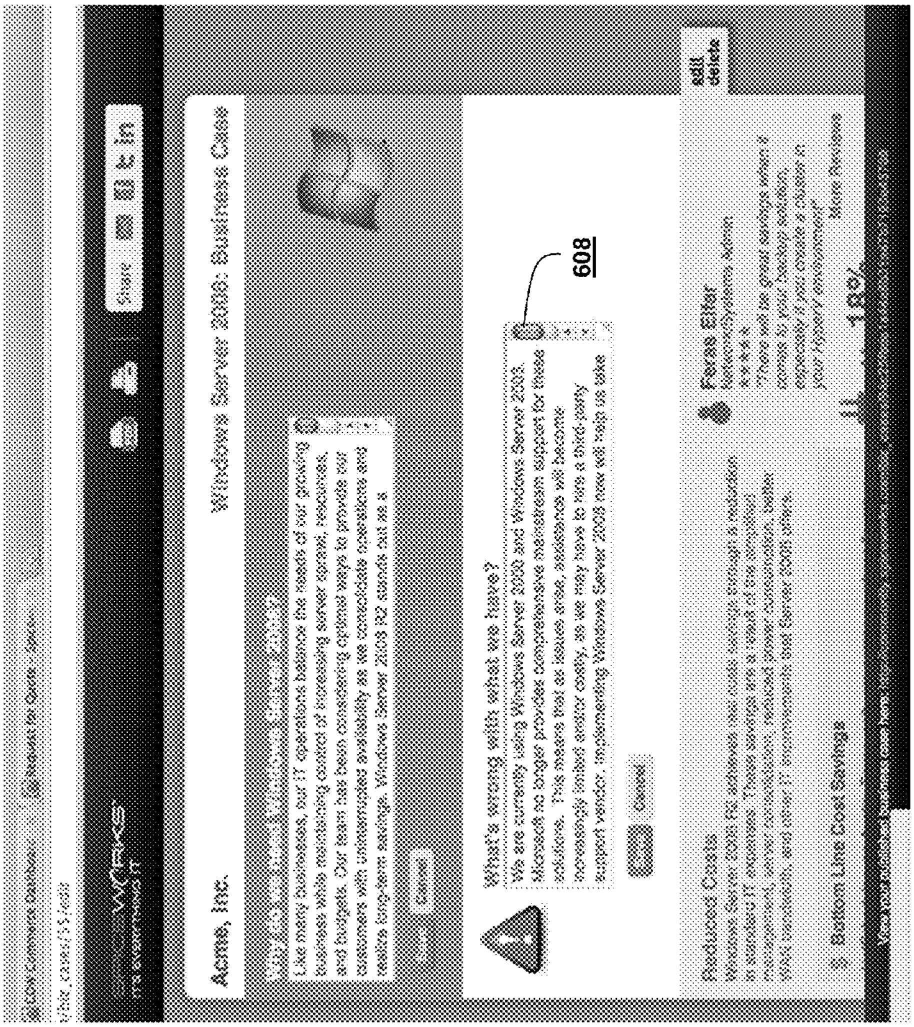
*Fig. 45 (screenshot)*

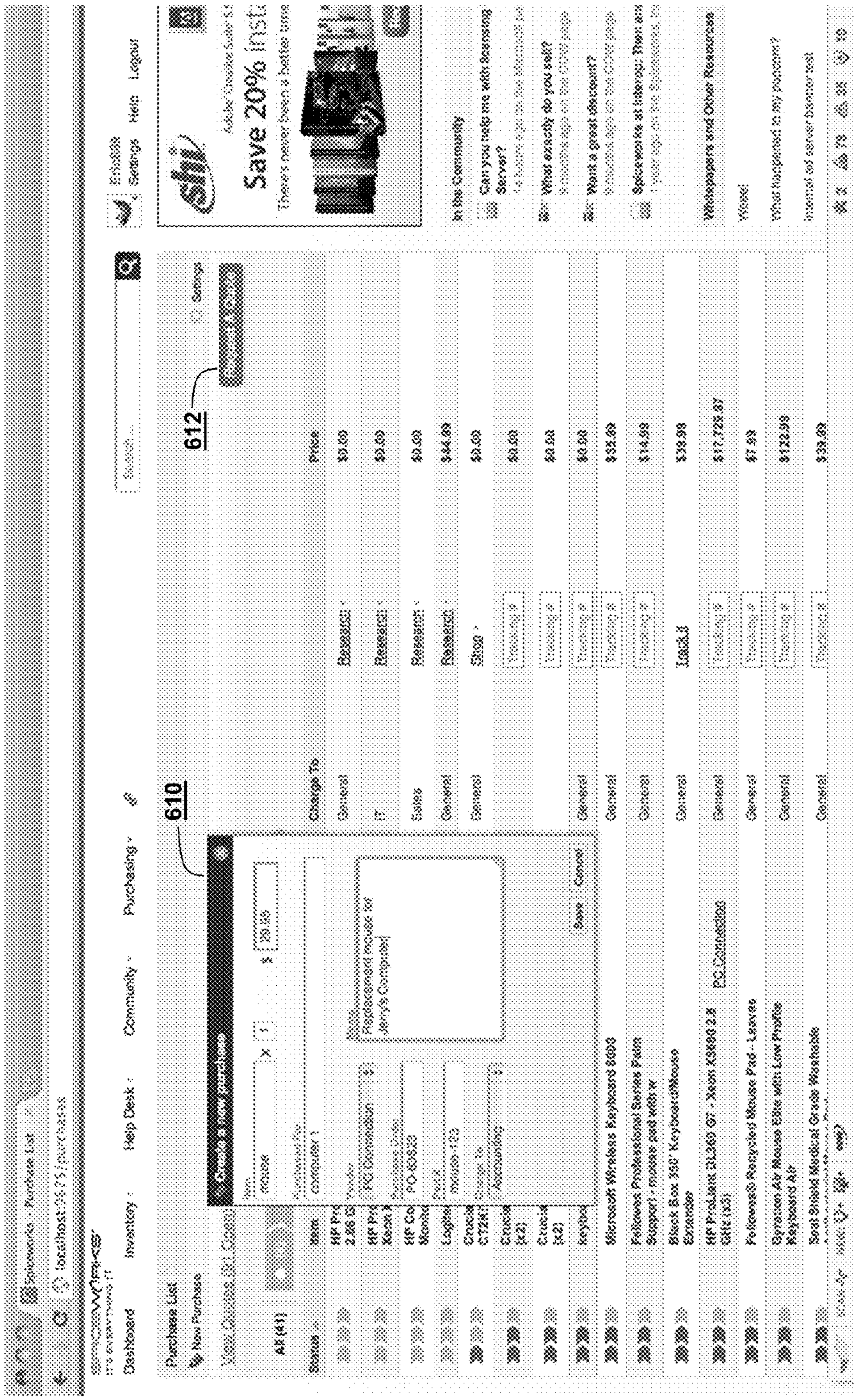
*Fig. 46A (screenshot)*

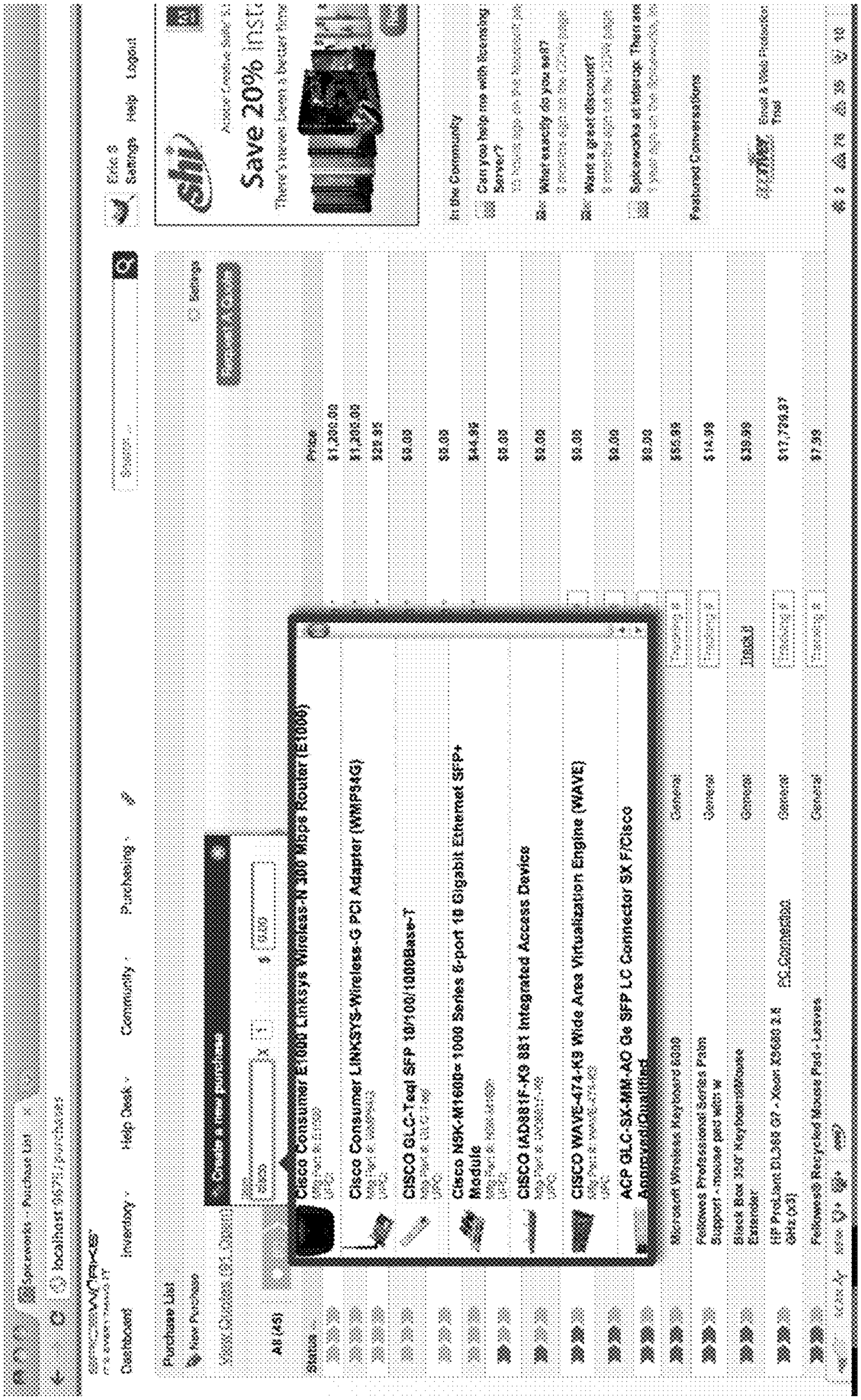
*Fig. 46B (screenshot)*

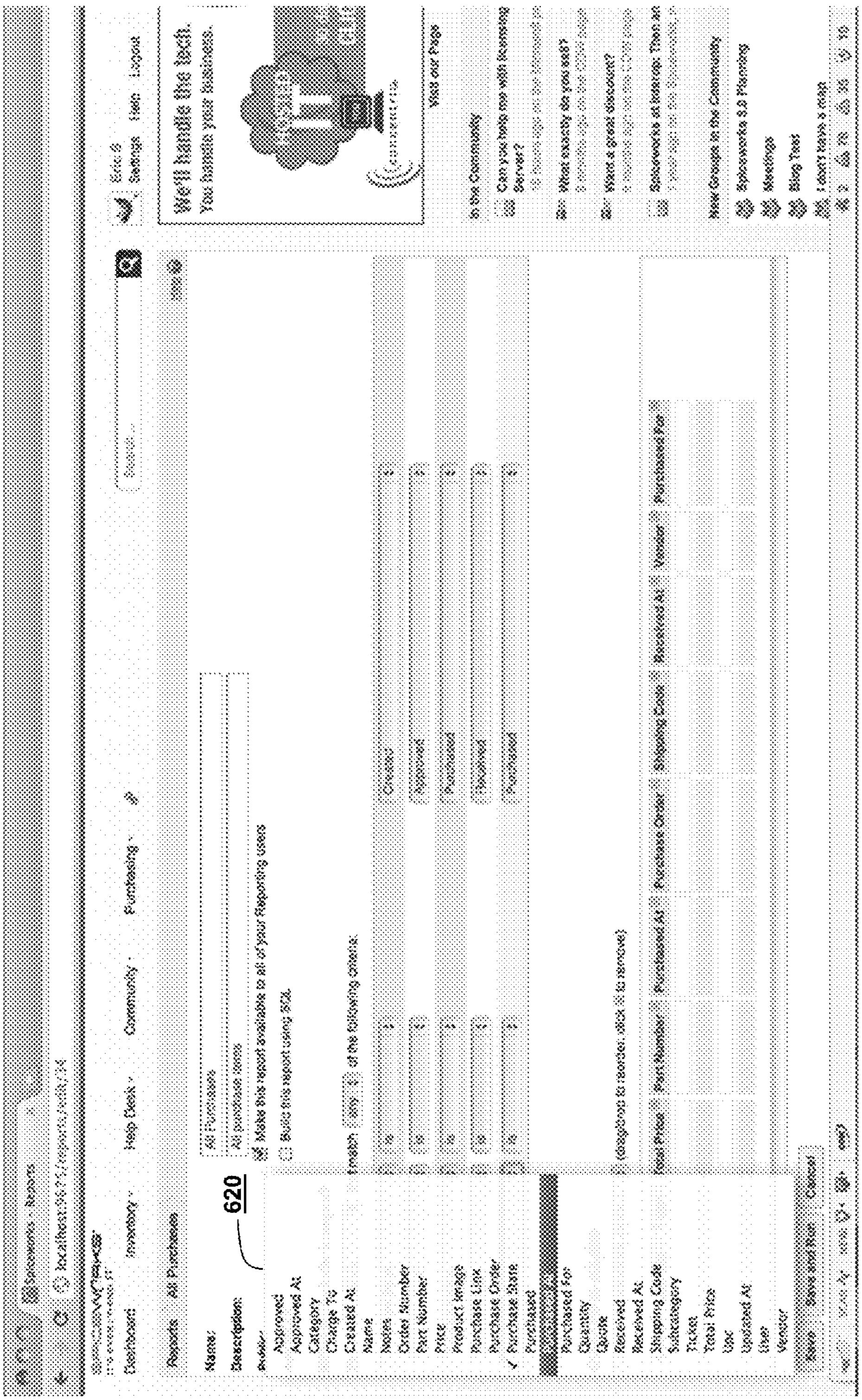
Fig. 47 (screenshot)

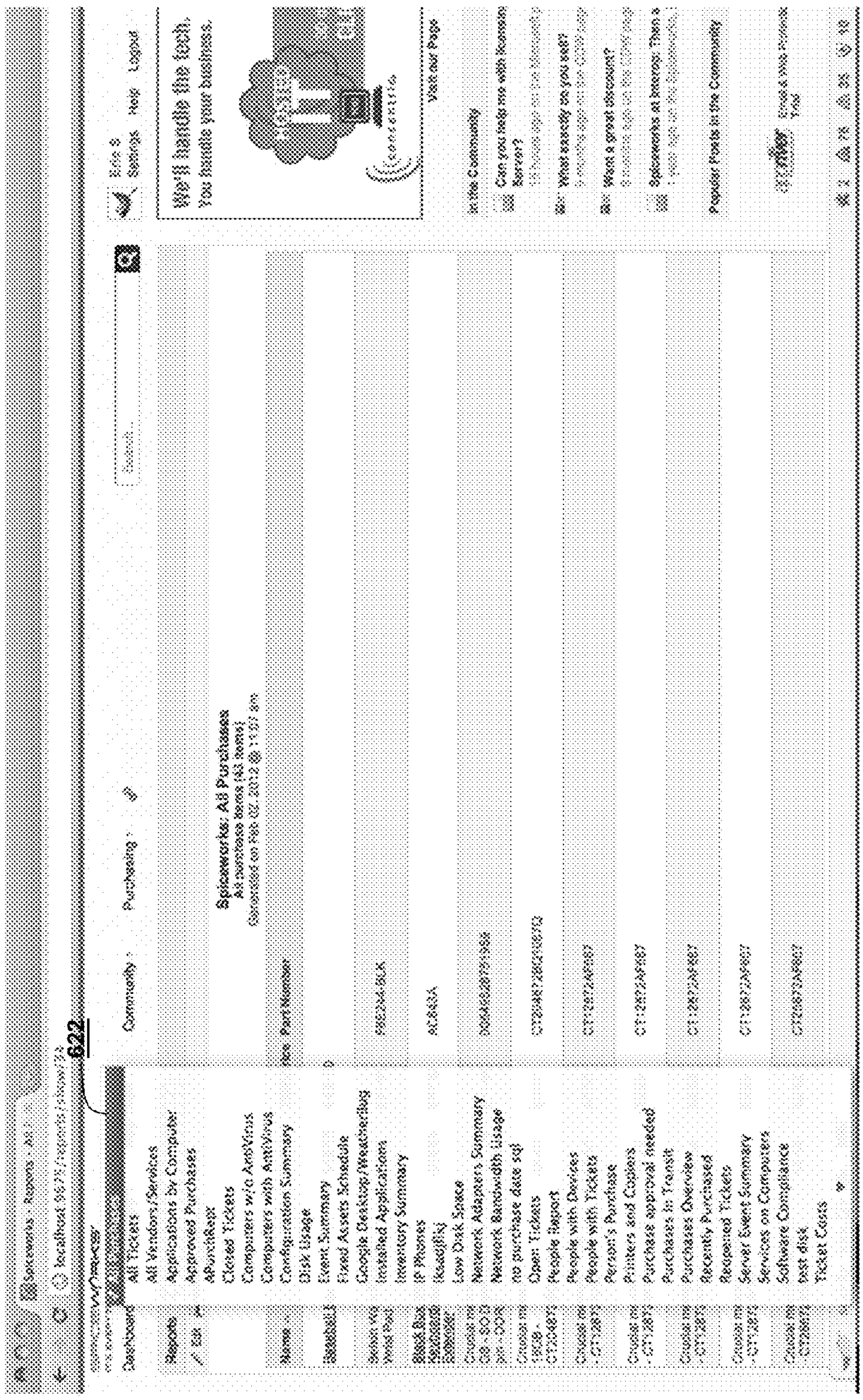
*Fig. 48 (screenshot)*

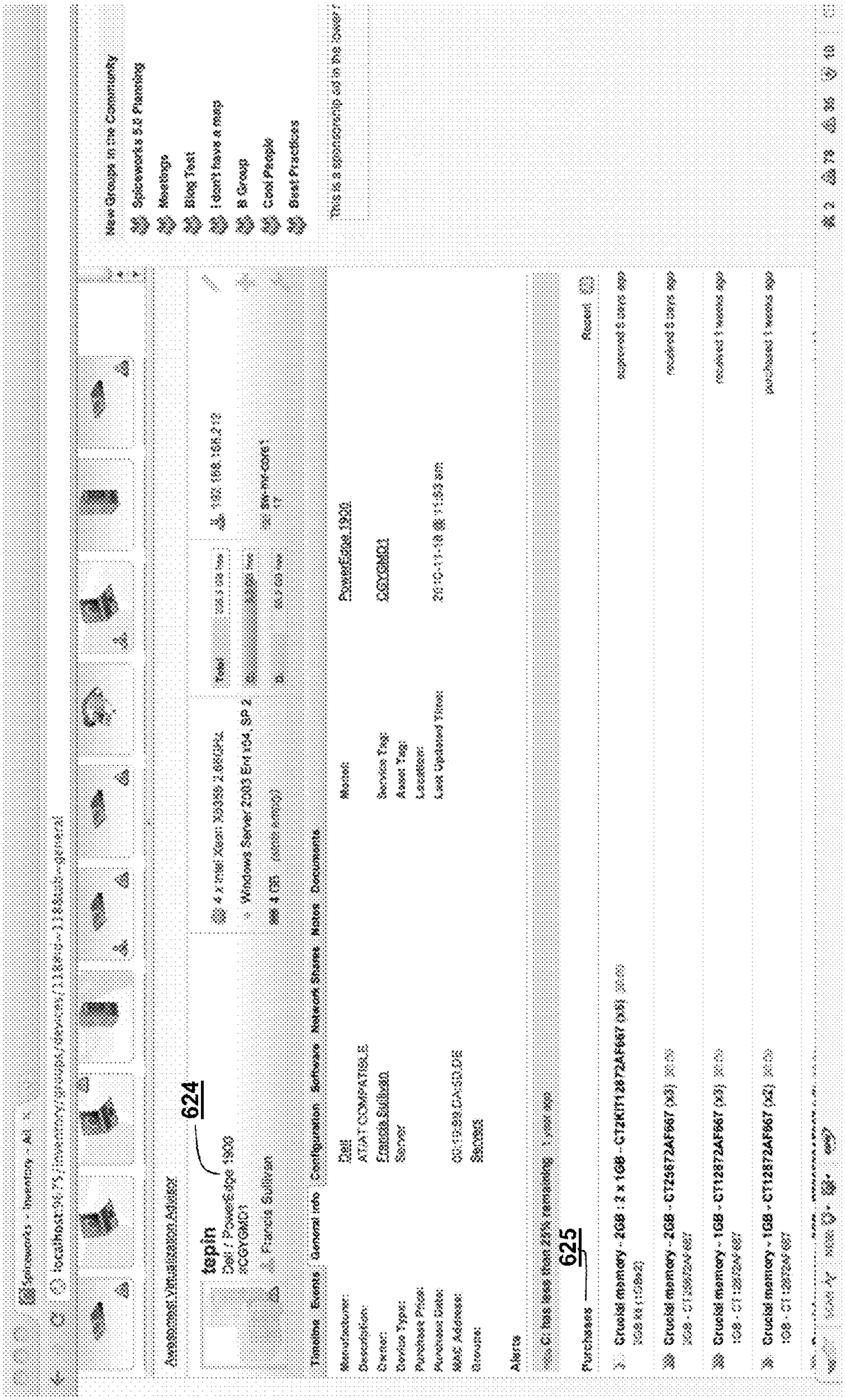
*Fig. 49* (screenshot)

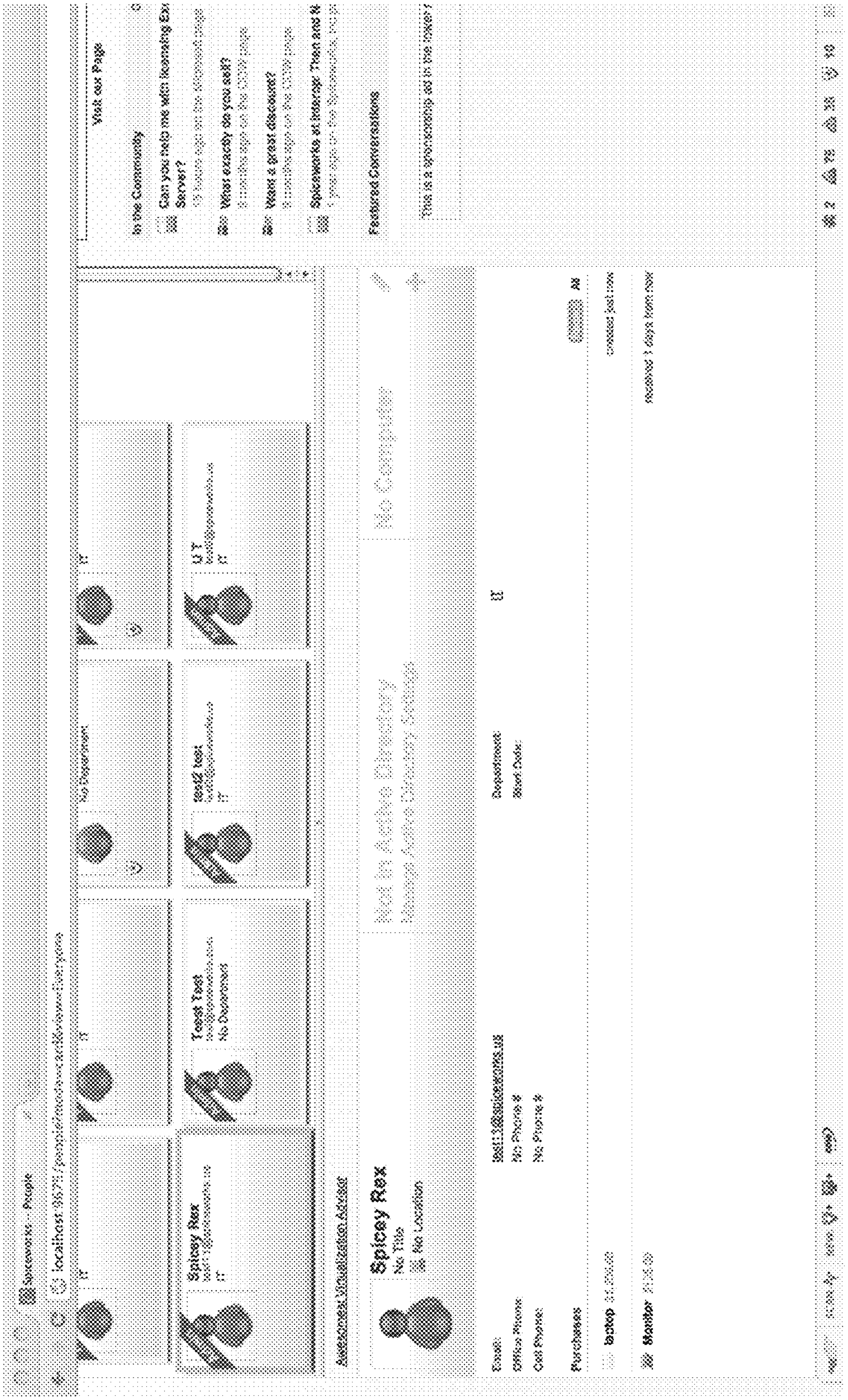
*Fig. 50 (screenshot)*

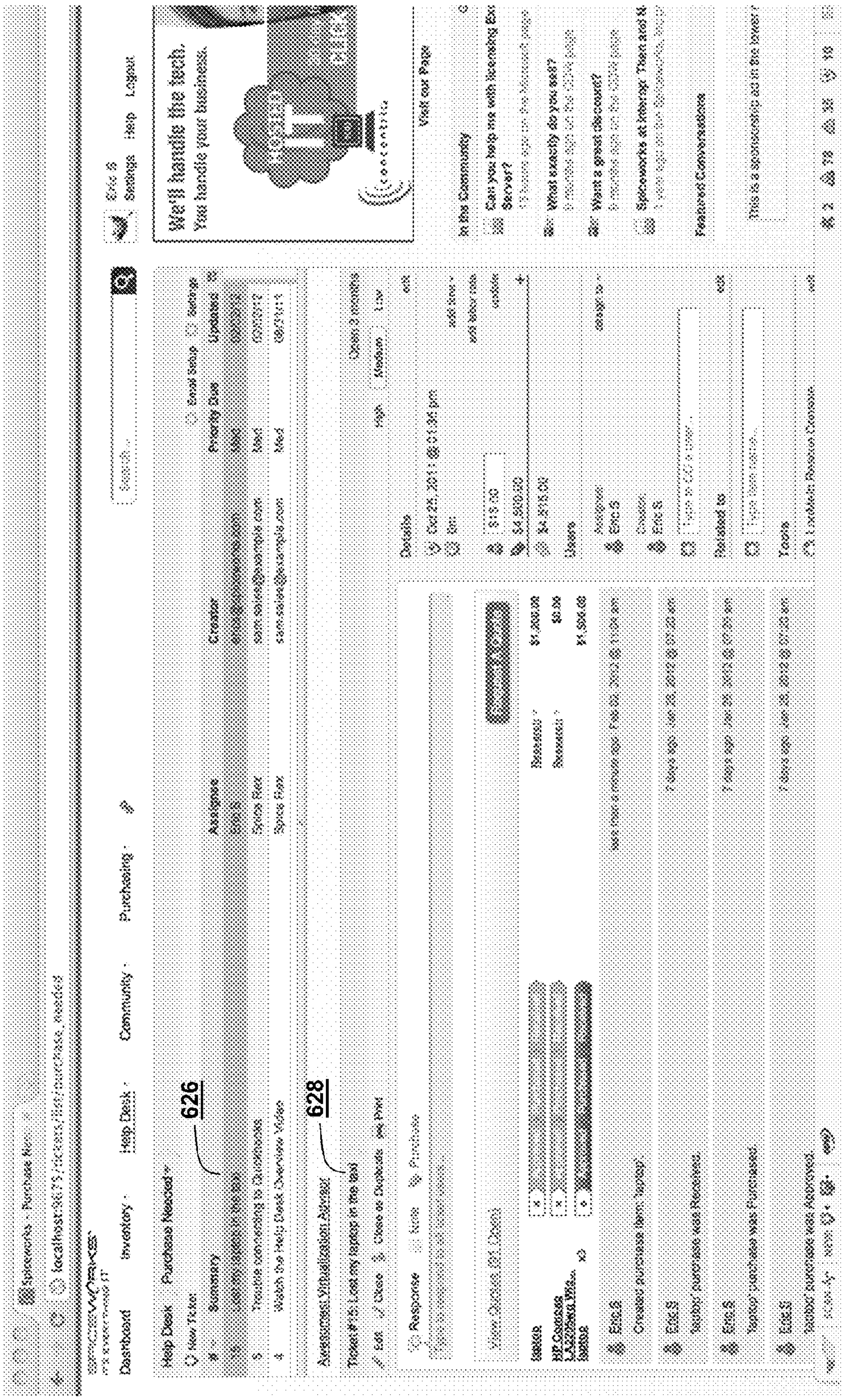
*Fig. 51A (screenshot)*

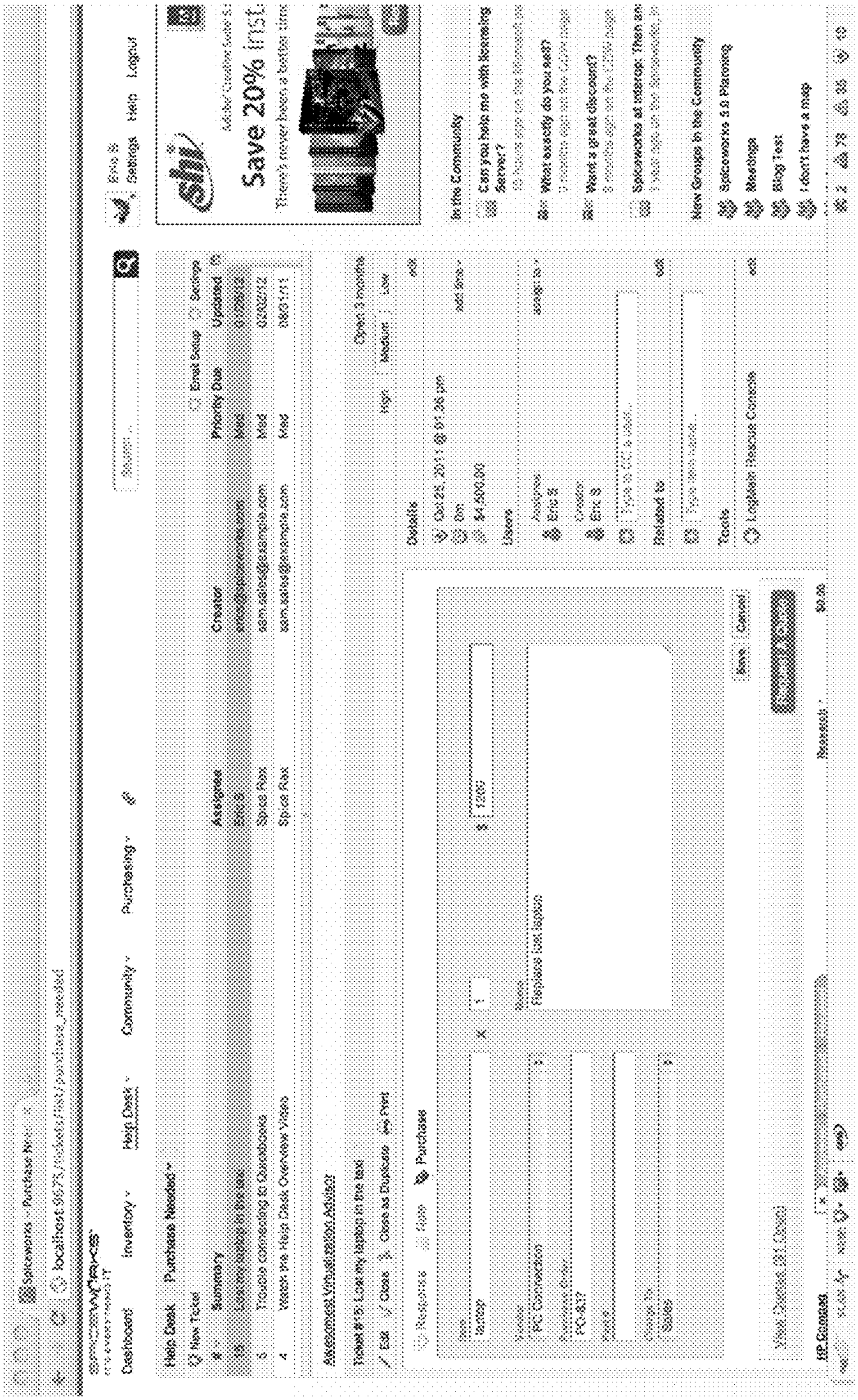
*Fig. 51B (screenshot)*

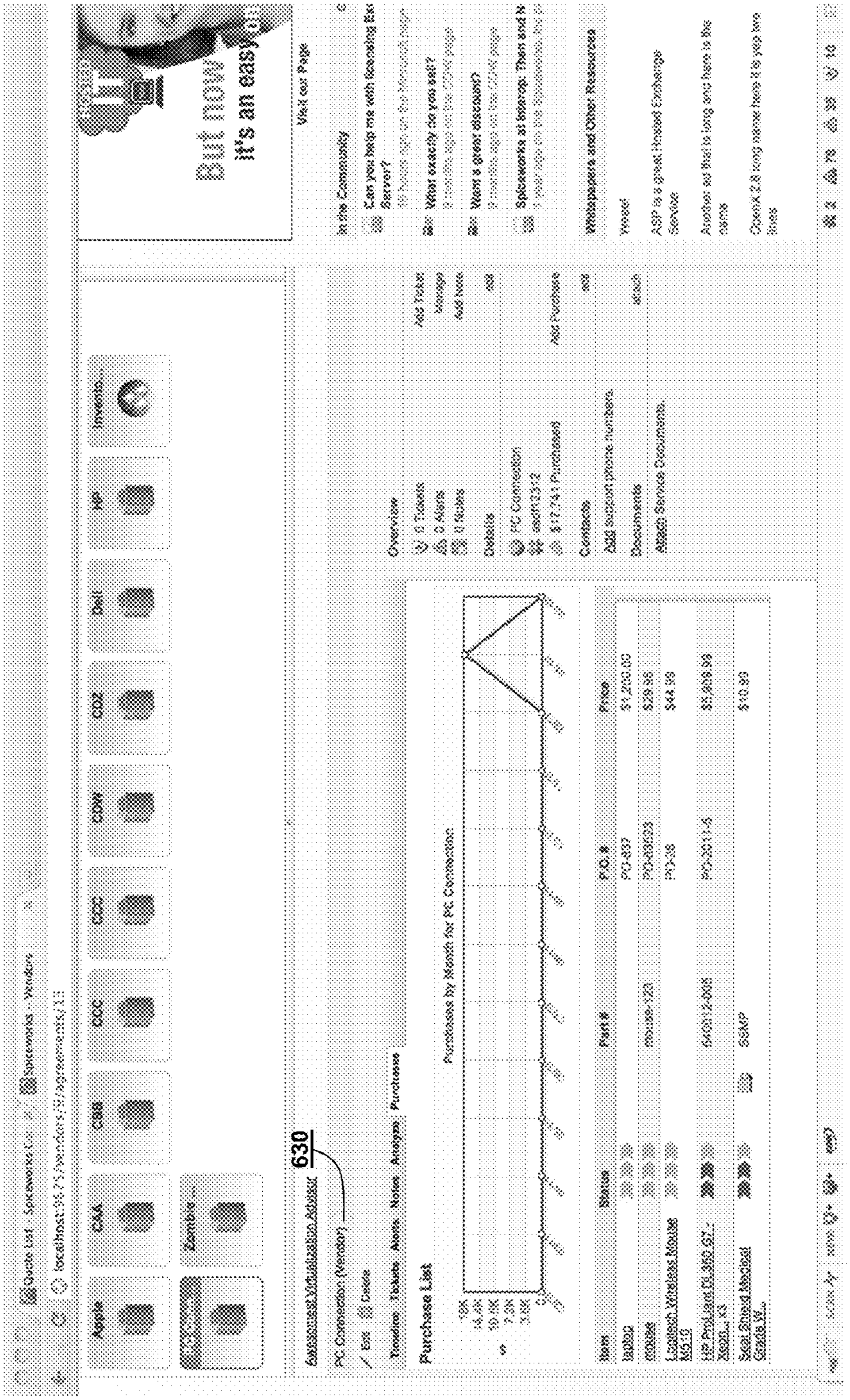
Fig. 52 (screenshot)

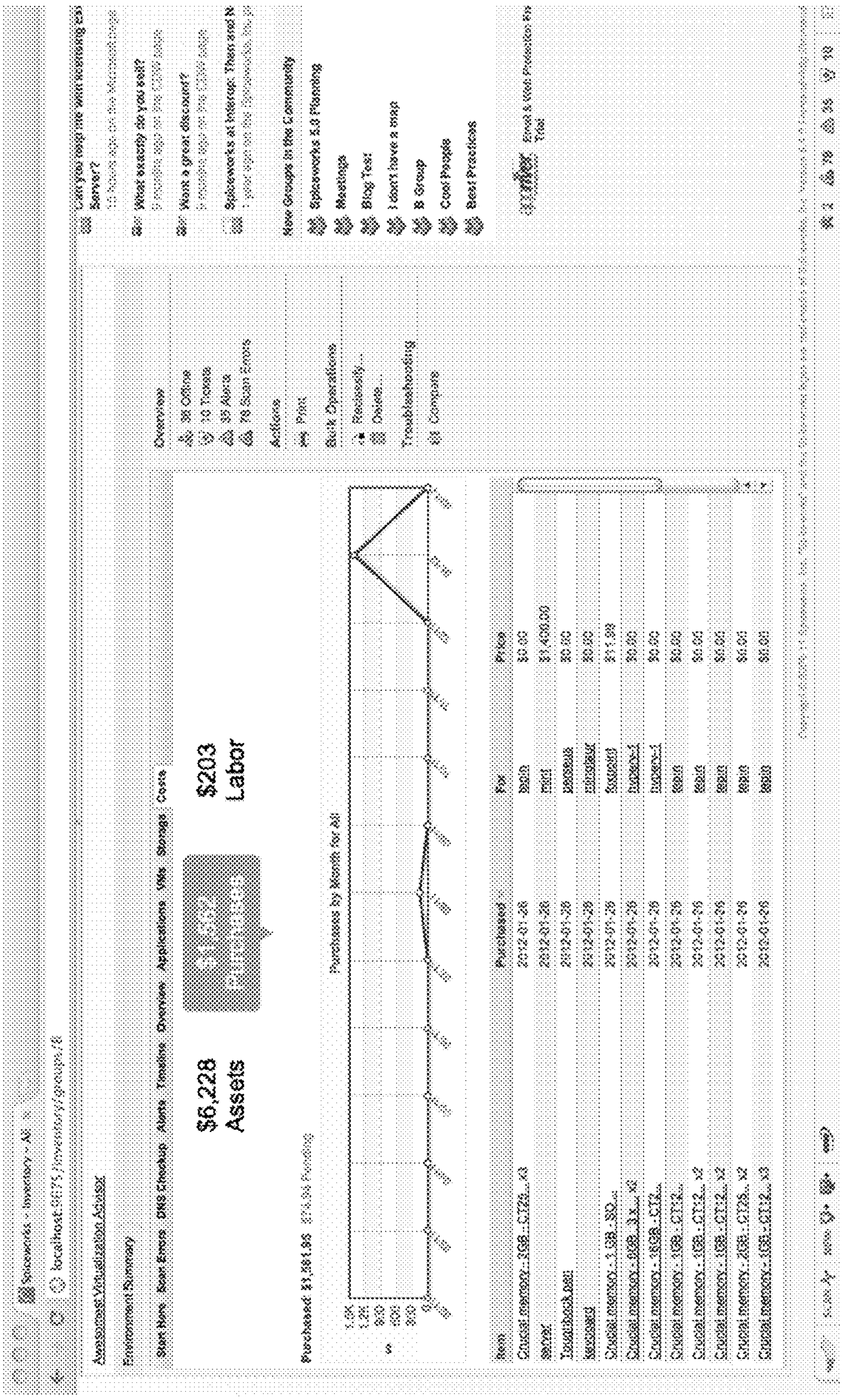
*Fig. 53 (screenshot)*

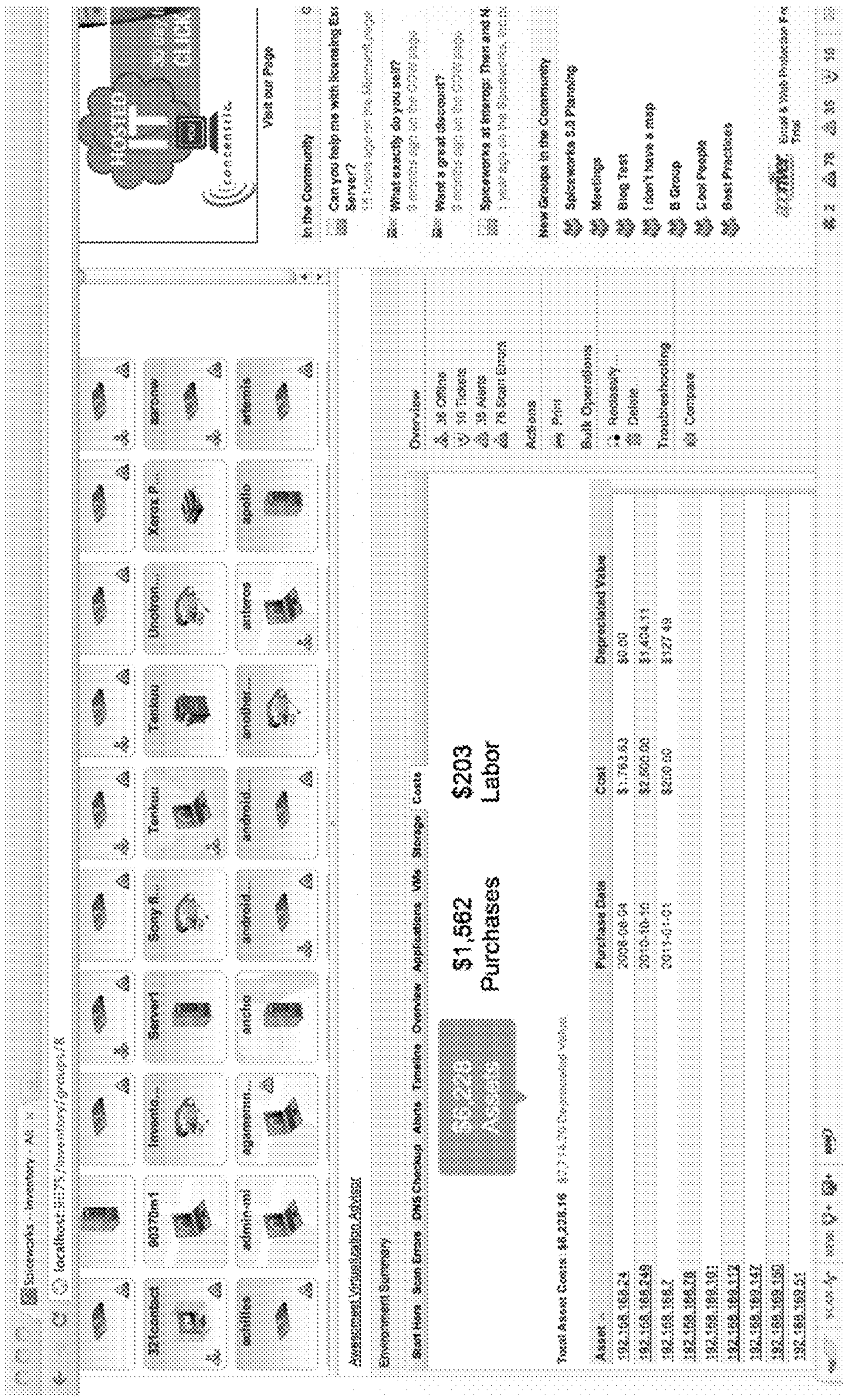
*Fig. 54* (screenshot)

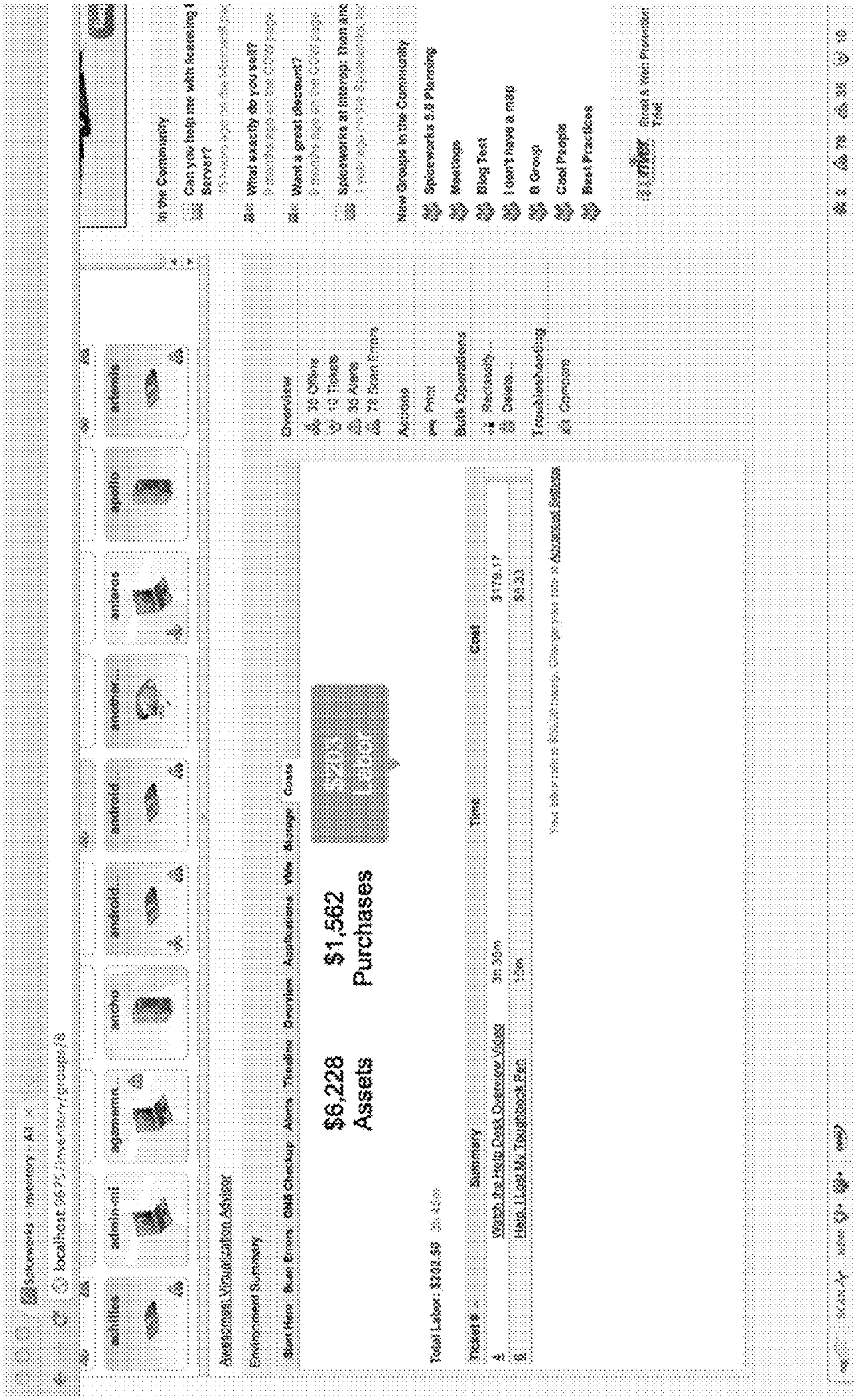
*Fig. 55 (screenshot)*

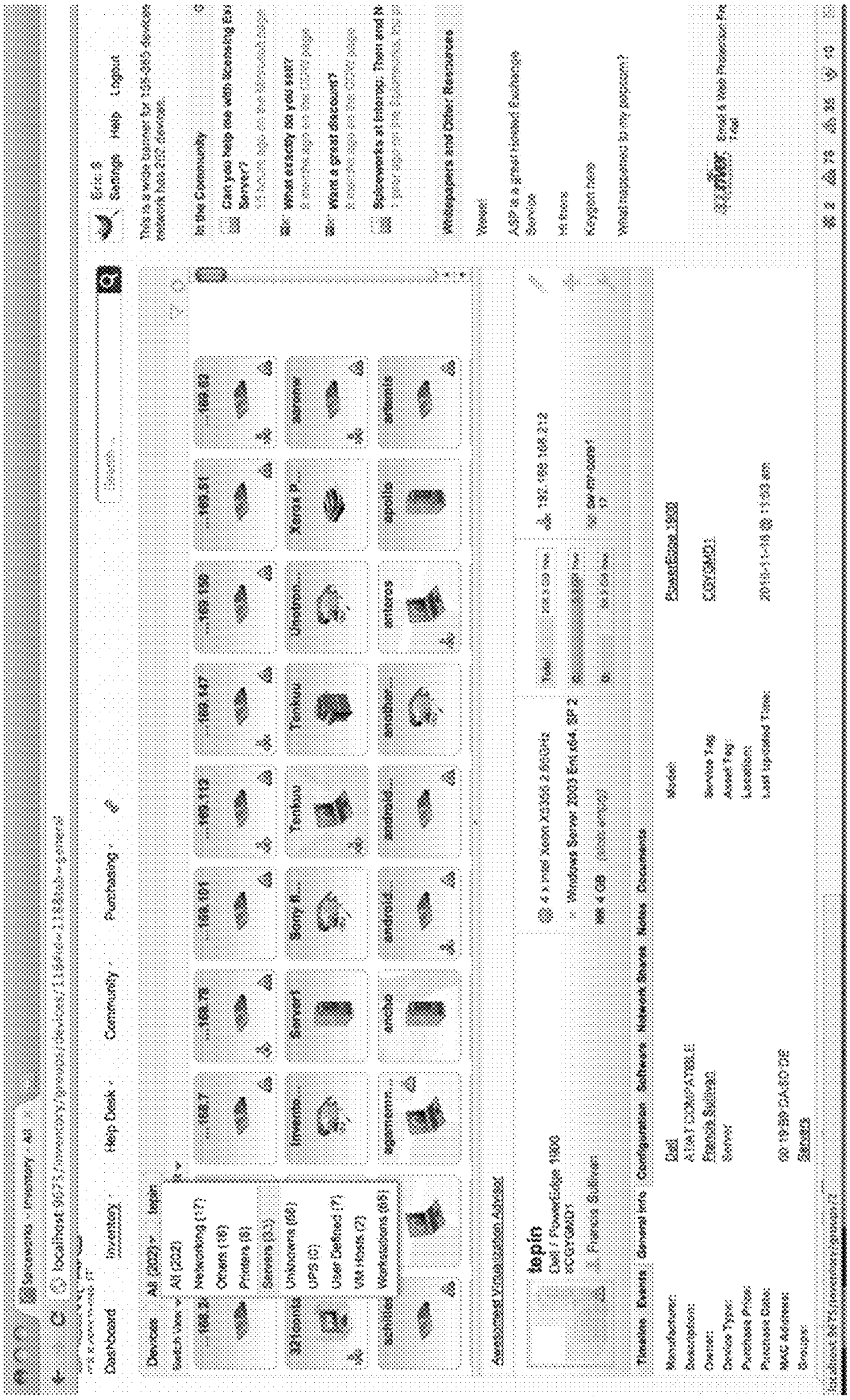
Fig. 56 (screenshot)

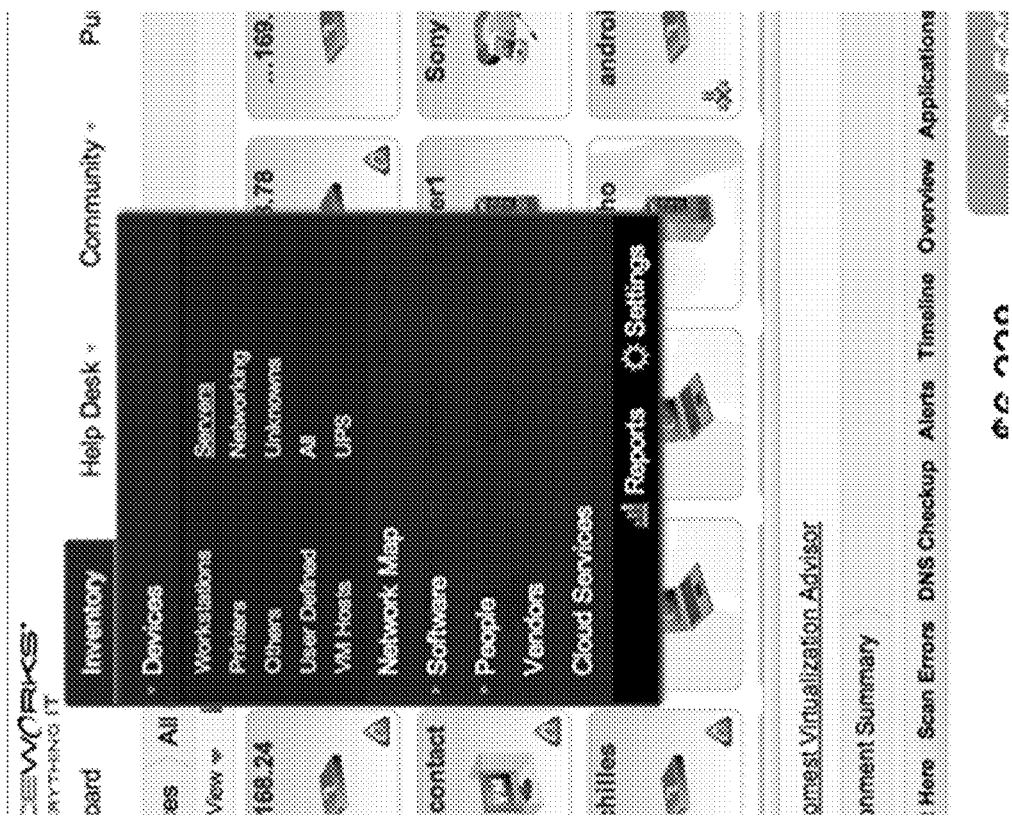
*Fig. 57* (screenshot)

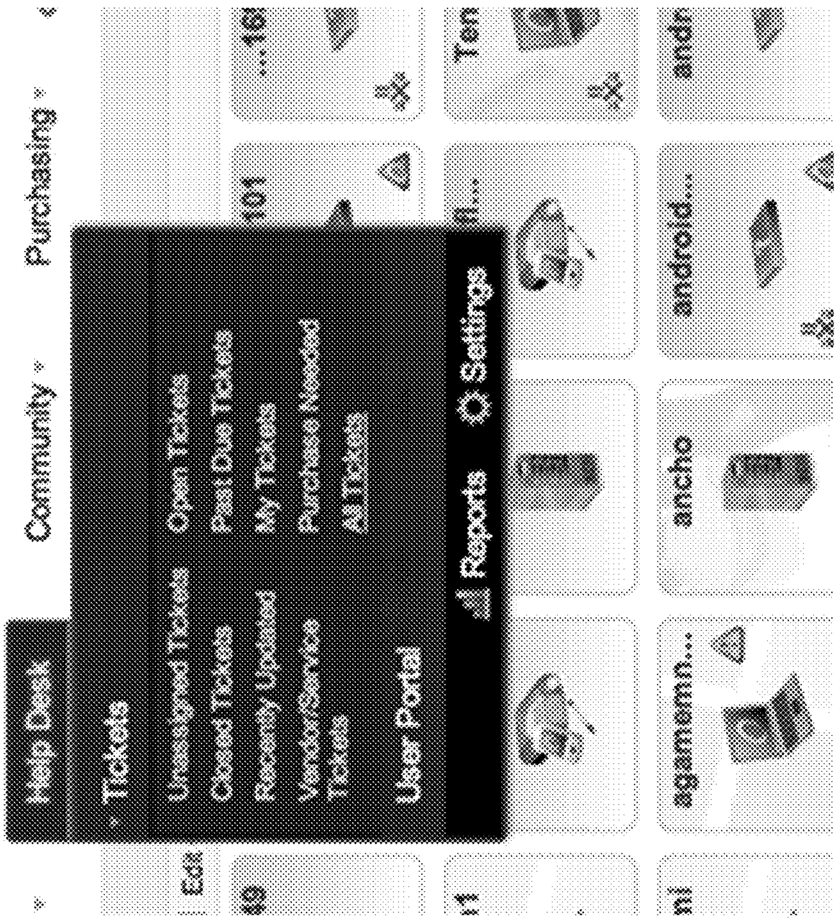
*Fig. 58 (screenshot)*

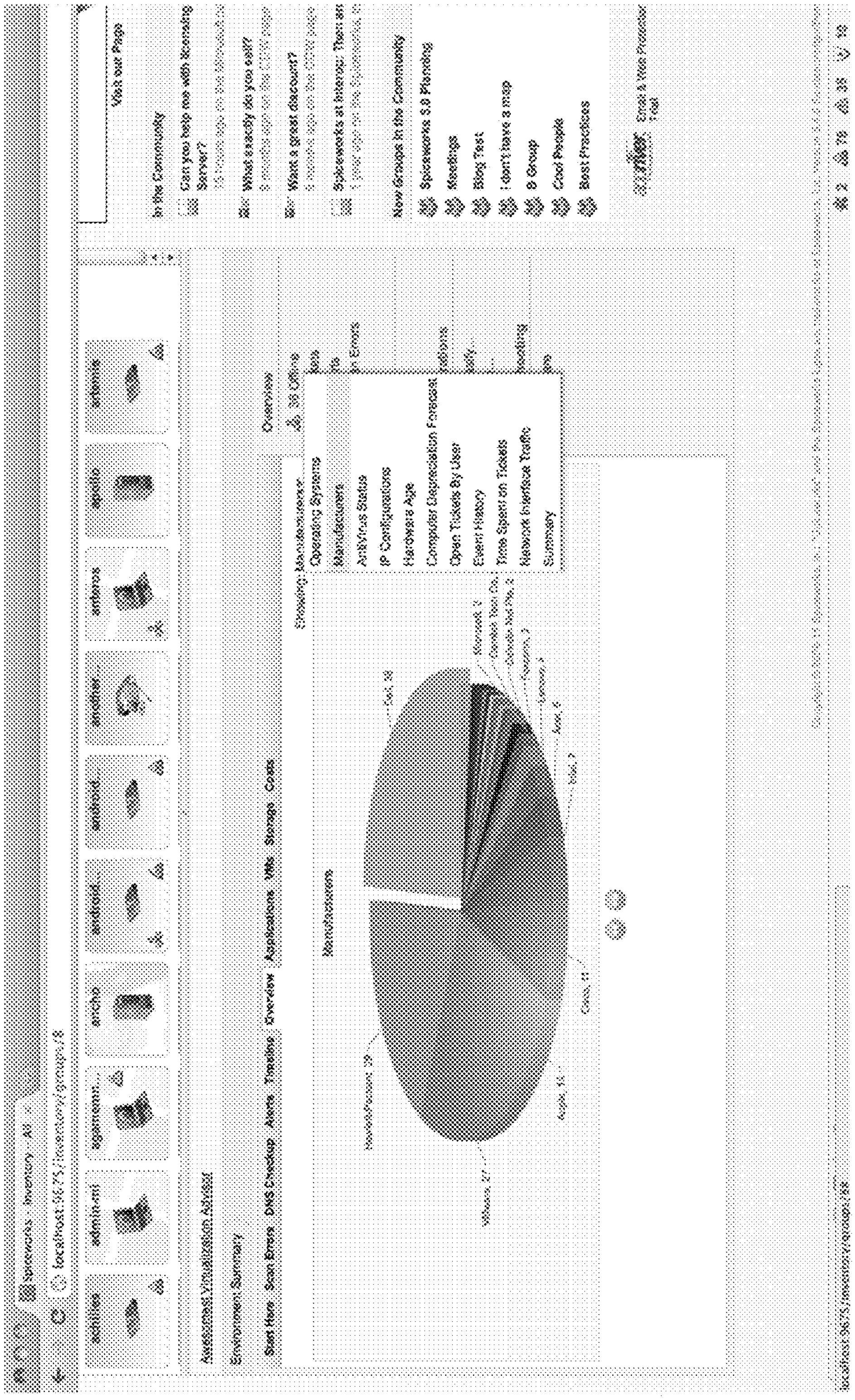
*Fig. 59 (screenshot)*

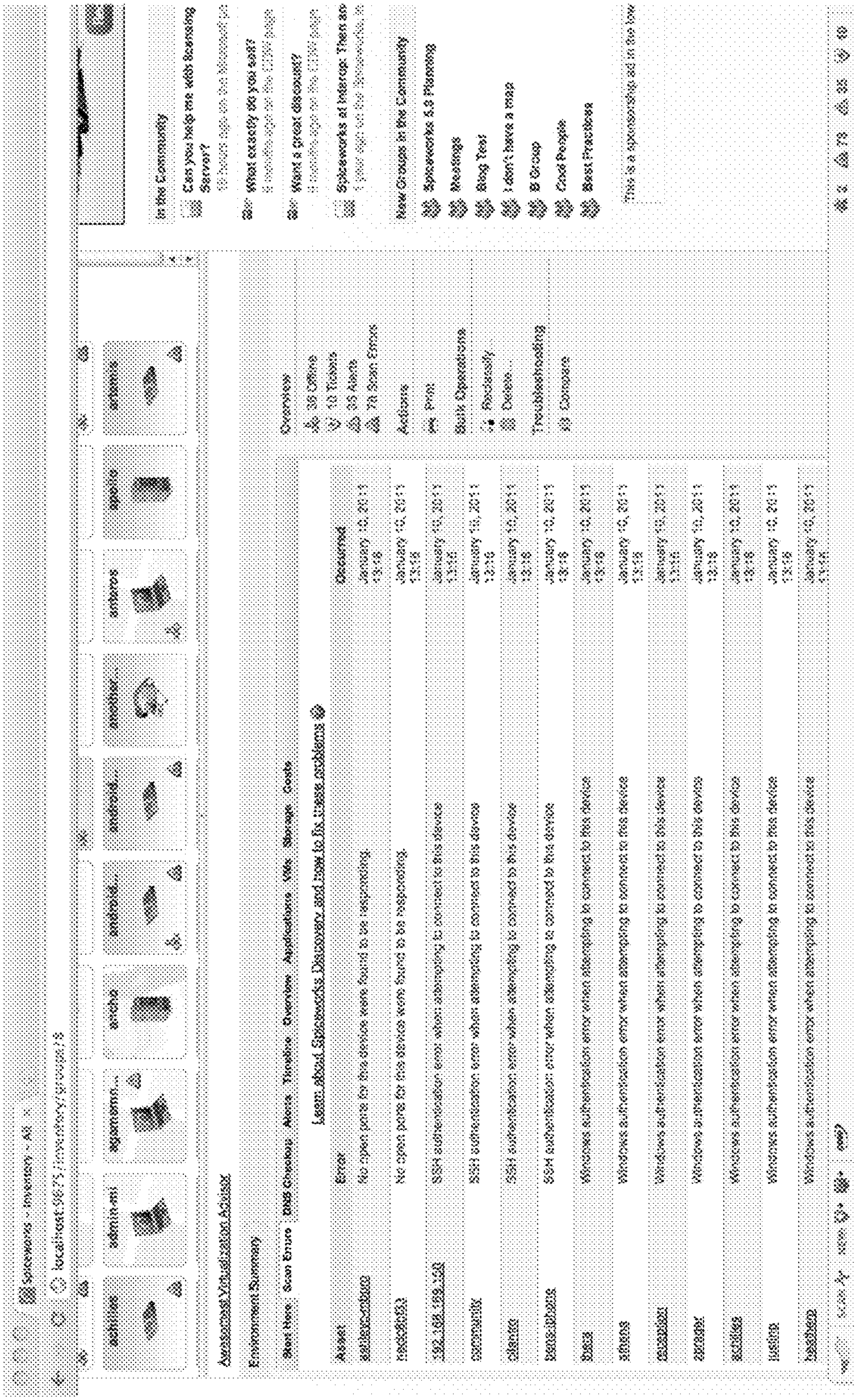
*Fig. 60 (screenshot)*

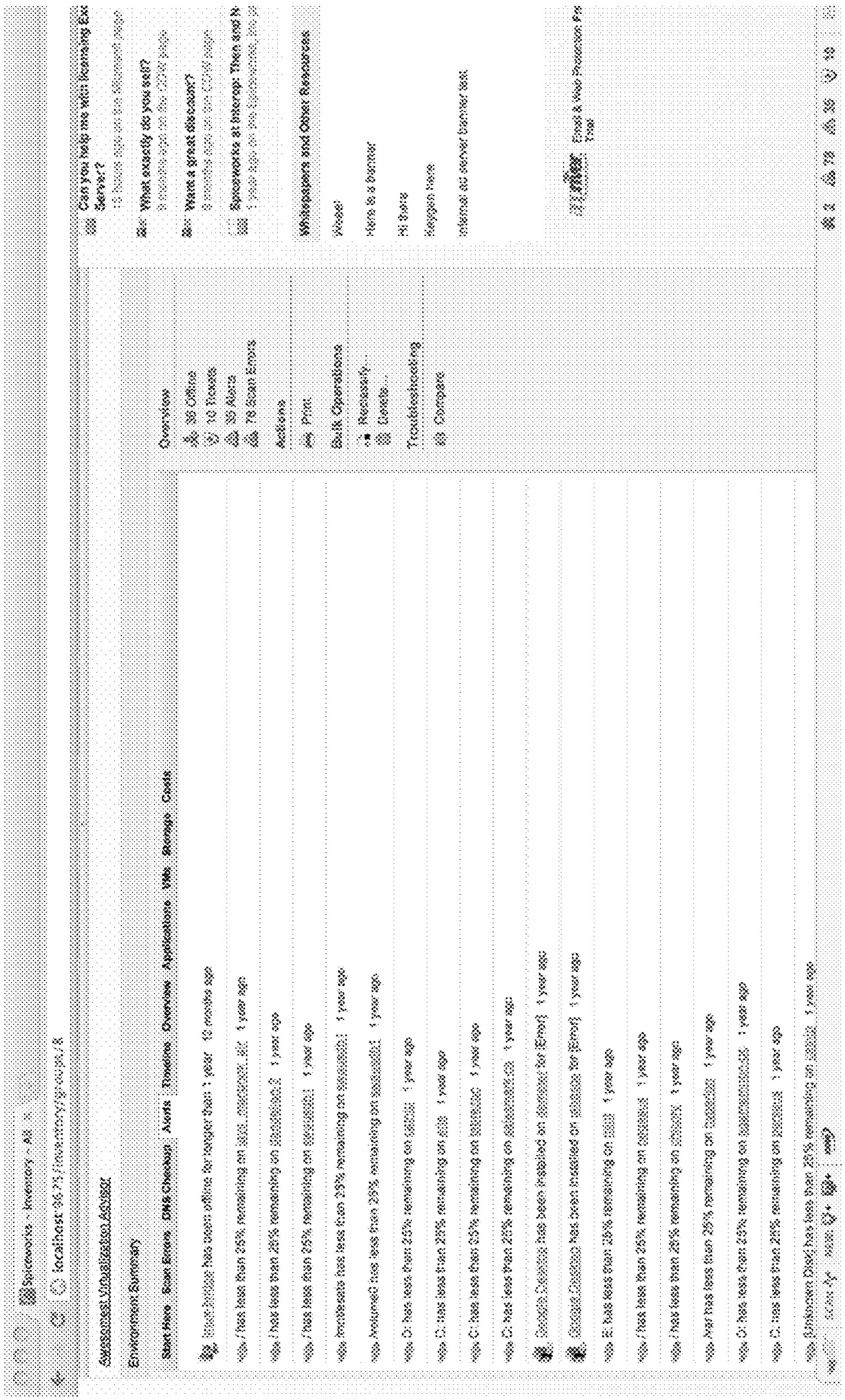
*Fig. 61 (screenshot)*

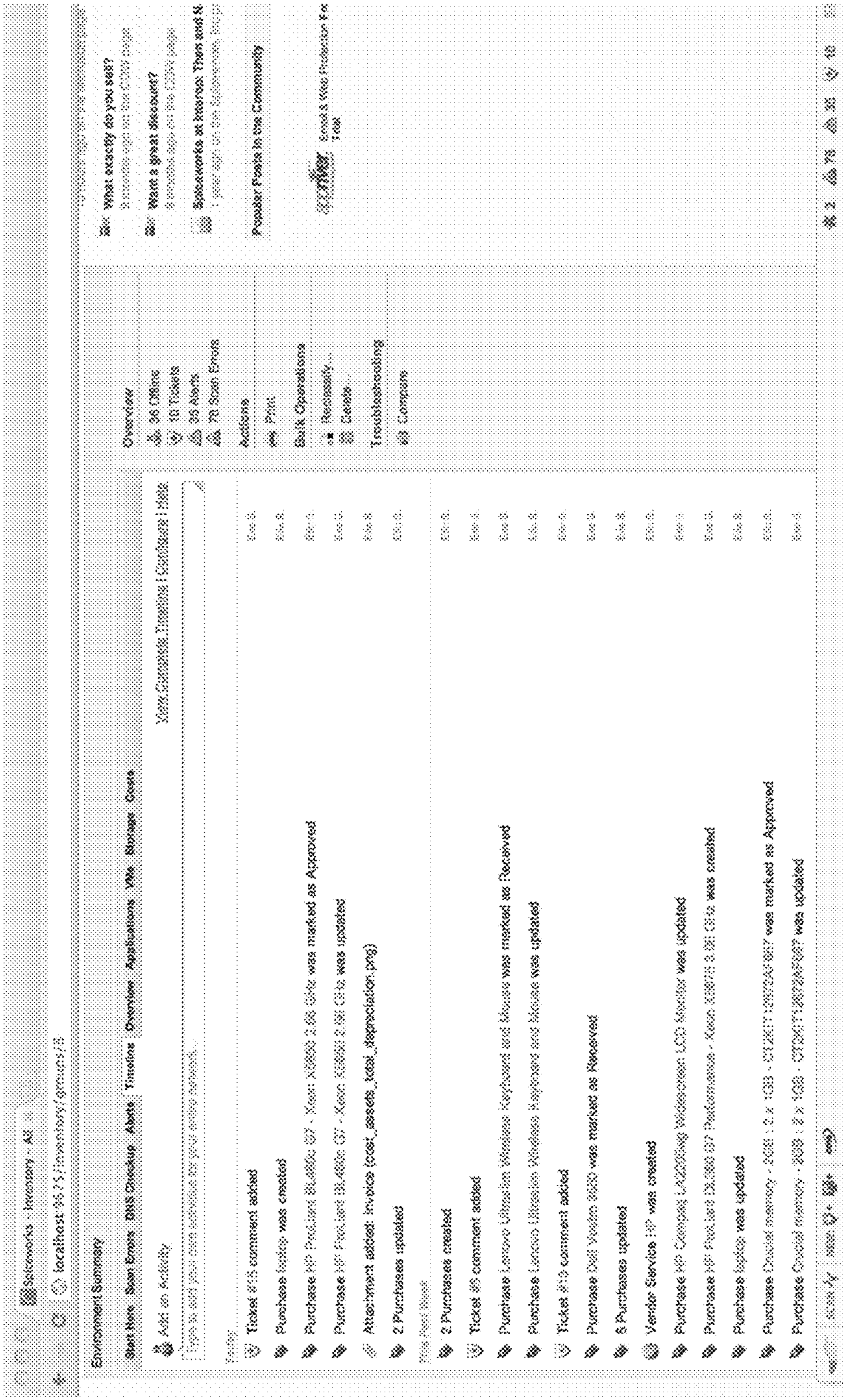
*Fig. 62 (screenshot)*

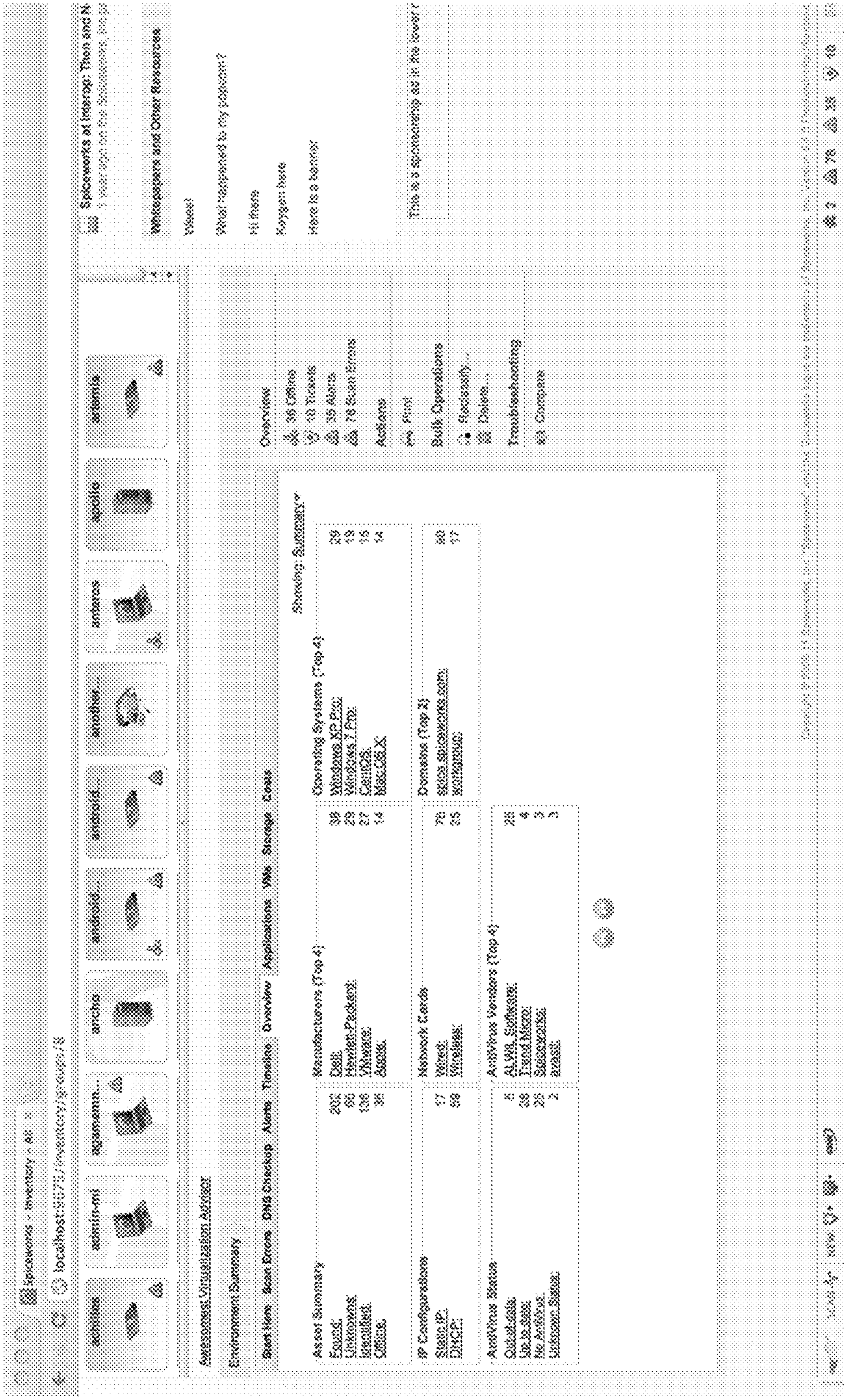
*Fig. 63* (screenshot)

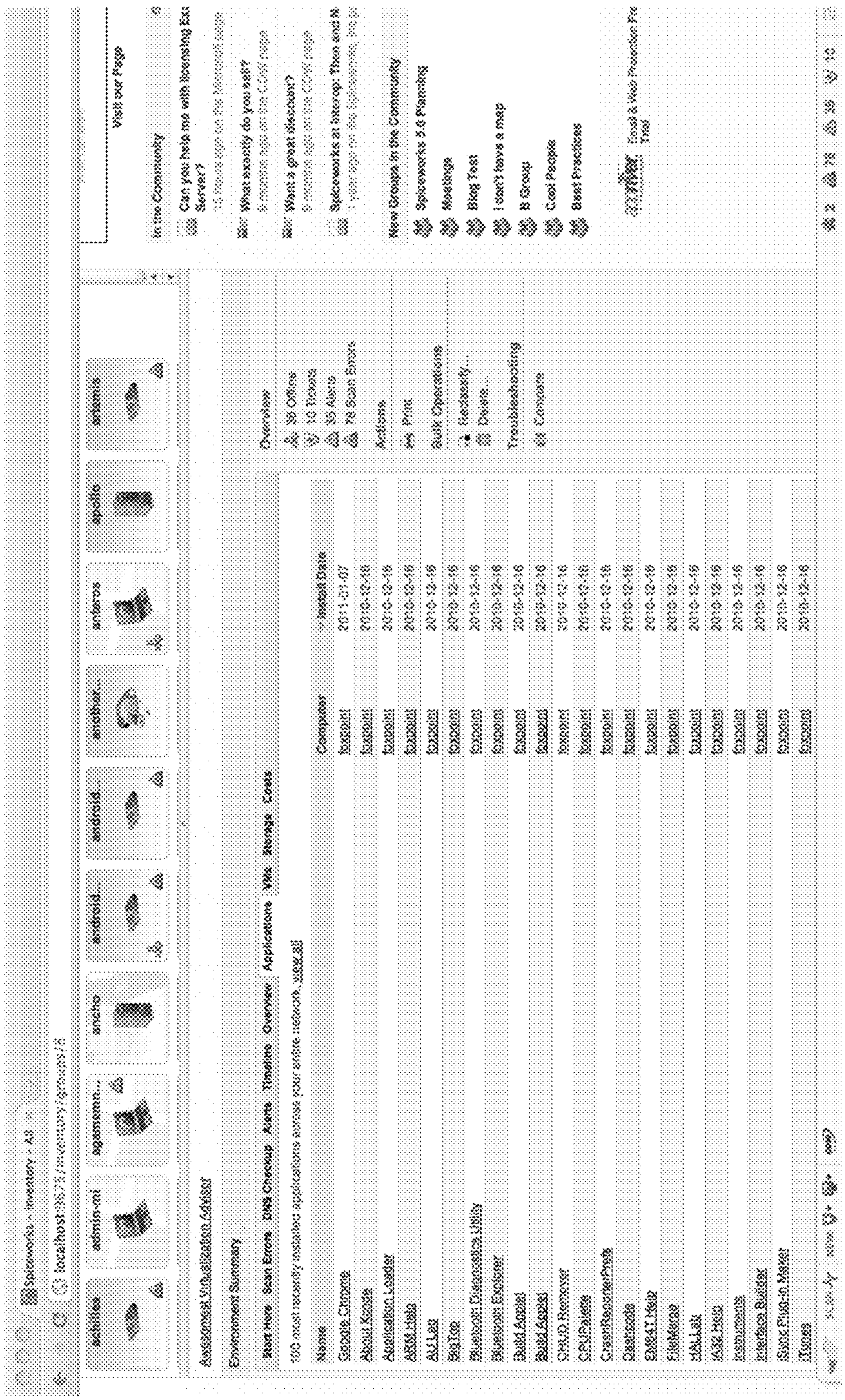
*Fig. 64* (screenshot)

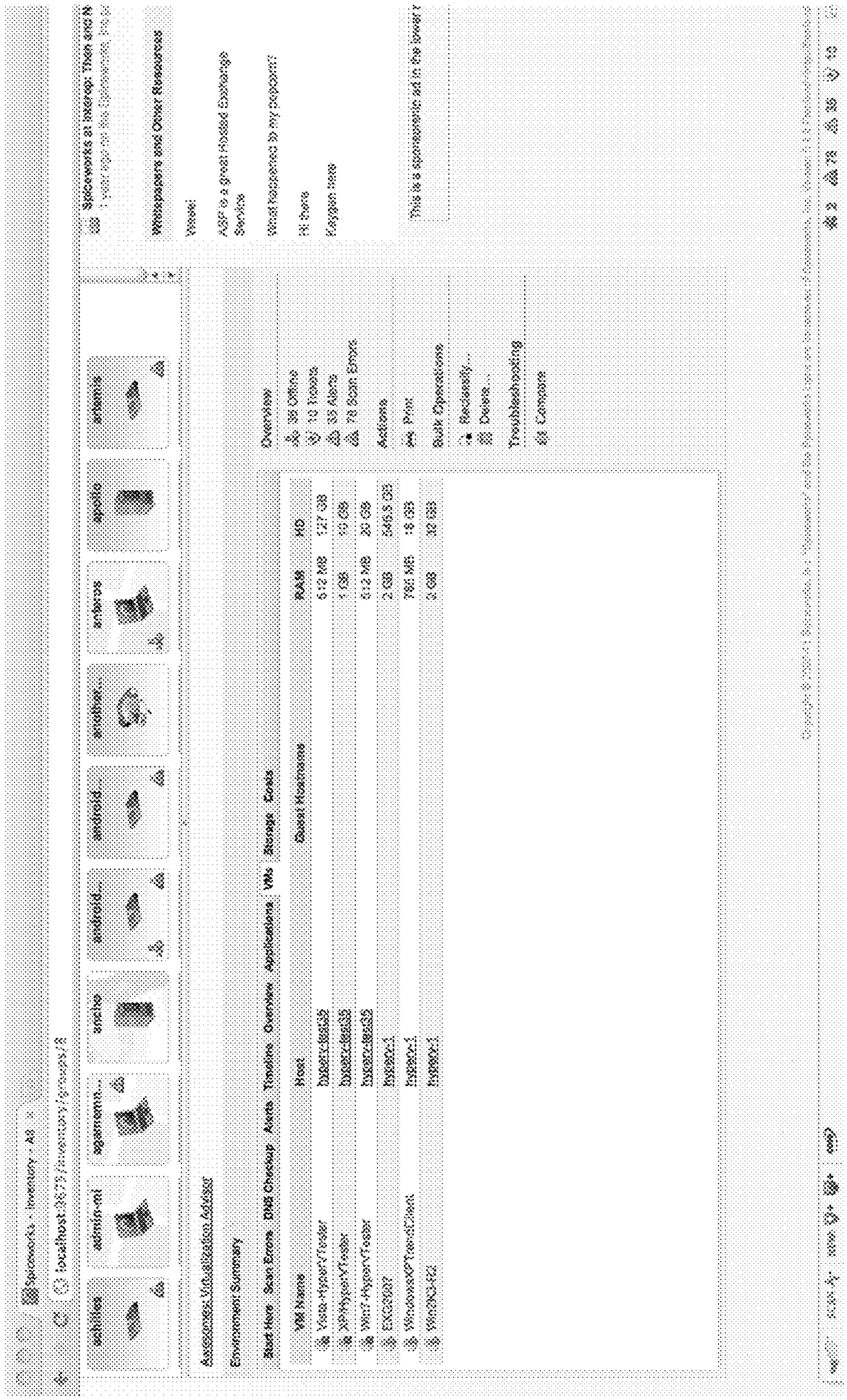
*Fig. 65* (screenshot)

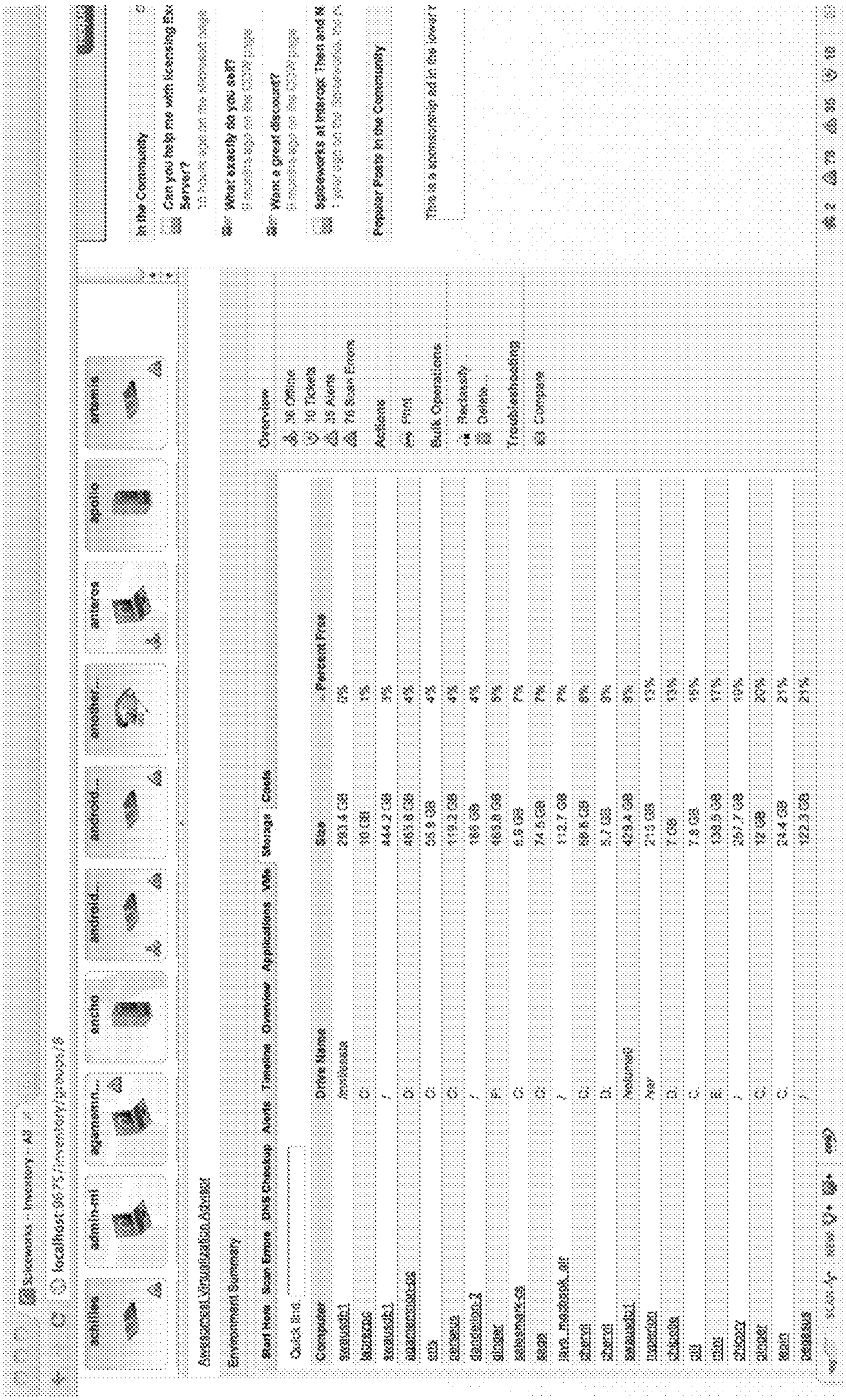
*Fig. 66 (screenshot)*

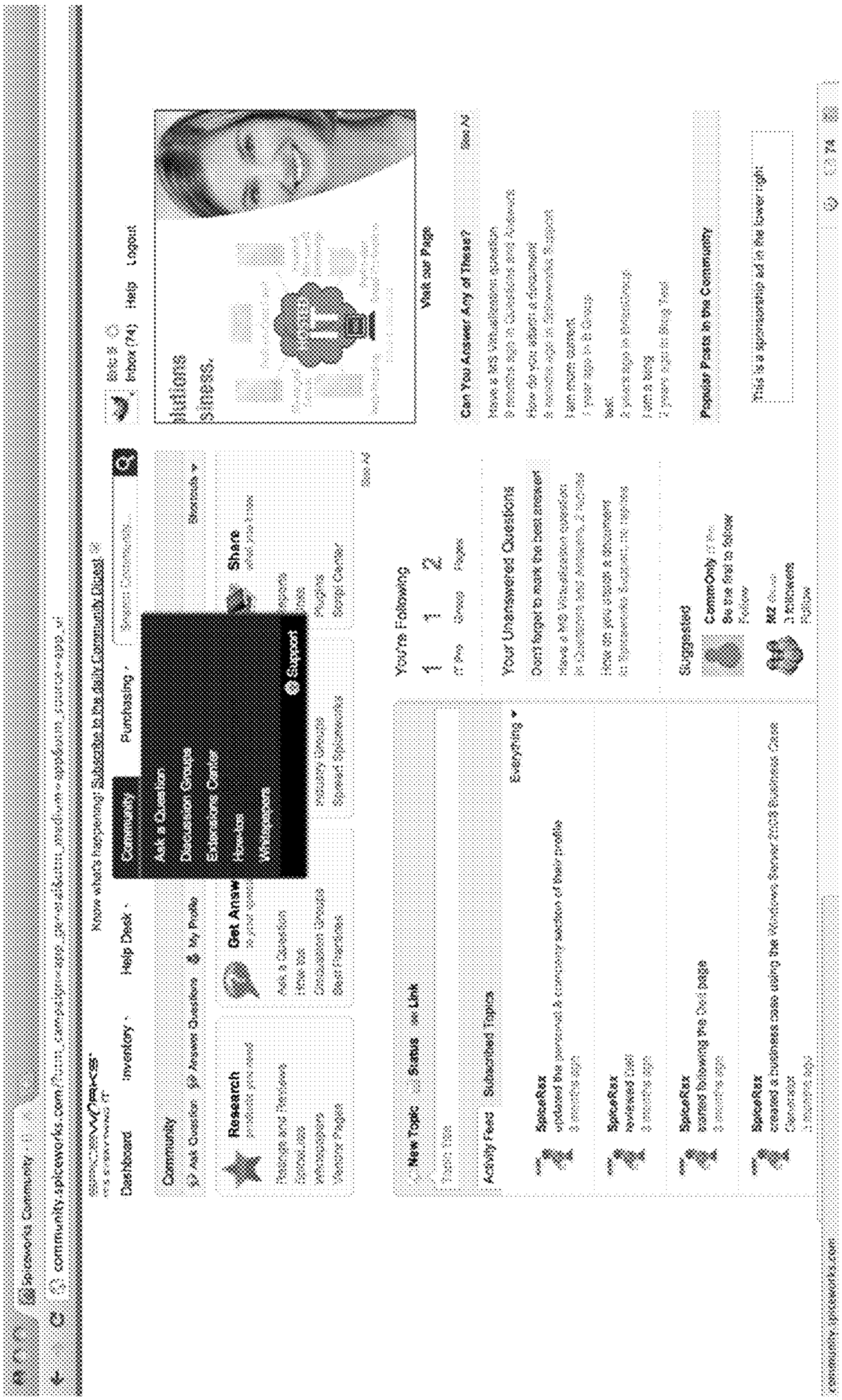
*Fig. 67* (screenshot)

NETWORK SOFTWARE AND HARDWARE MONITORING AND MARKETPLACE

RELATED APPLICATIONS

This application claims priority to U.S. Provisional Patent Application Ser. No. 61/602,575, filed Feb. 23, 2012, which is hereby incorporated by reference in its entirety.

This application is a continuation-in-part of U.S. patent application Ser. No. 12/041,480, filed May 3, 2008, which is hereby incorporated by reference in its entirety.

This application is also a continuation-in-part of U.S. patent application Ser. No. 13/487,091, filed Jun. 1, 2012, which is a continuation of U.S. patent application Ser. No. 12/117,533, filed May 8, 2008, which claims priority to U.S. Prov. Pat. App. Nos. 60/917,528, filed May 11, 2007, and 60/892,831, filed Mar. 2, 2007, and which is a continuation-in-part of U.S. patent application Ser. No. 12/041,480, filed May 3, 2008, which claims priority to U.S. Prov. Pat. App. No. 60/892,831, all of which are hereby incorporated by reference in their entirety.

FIELD

The present disclosure relates in general to the field of software, and more particularly to information technology management and asset marketplace.

BACKGROUND

Existing information technology (IT) management software packages have several shortcomings. Existing IT management software packages are often complicated. Often, such software packages are geared toward professional IT personnel in large businesses, neglecting small and medium sized businesses. While the presentation of large amounts of information may be beneficial in certain contexts, it is often unnecessary and overwhelming for less sophisticated IT management personnel.

Existing IT management software packages may not integrate important data into a single interface. One IT management software package may be more effective for managing one issue, while another may be more effective for another issue. An IT manager may need to review many disparate sources of information in order to effectively manage the IT infrastructure. Common management issues are often mixed with the less commonly encountered issues, making it tedious and time consuming to filter the common issues from the less common issues.

Network management software has earned a reputation as being both costly to buy and complicated to set up and use. As a result, many smaller organizations tend to forgo it, filing it under "nice to have, but not worth the expense or hassle." But, in putting off network management, a risk arises of letting a potential problem go unnoticed, or even grow worse over time. There is a need for an easy-to-use application that can inventory a network's systems and software (along with various other devices) and includes monitoring and reporting capabilities. Such a system should constitute a relatively small download that may be available via the Internet or other on-line source. The application should be able to run on a current Microsoft Windows system such as Windows XP Professional, Window Vista Business, or Windows 2003 Server system, but it can manage all the common types of assets found in a business such as Windows 2000/XP, Mac OS X, Linux/Unix machines, printers, switches, routers, etc.

Such a network management system should use a minimum of document and other complex instructions in its use. It should also avoid the need to install software agents on every system to provide control and query capabilities. Such a system should require the installation of software on only one system, to make configuring simple in most cases.

There is a need for such a system to provide displays within a simple browser-based interface, with default setting presenting an overview of a network organized by category. Such a display should show how many workstations, servers, printers and miscellaneous devices, as well as and other network information operate on the network.

There is a need for a network management system that reports all of the software, services and operating system updates (or hot fixes) present on each of the systems it finds. Such a system should provide a rapid path to the software manufacturer for recognized applications. A further need exists for a system that allows sifting through a great deal of network information with a built-in report generator.

With such a network monitoring system, there is the need to stay in-step with the network by monitoring workflow within the network. The network monitoring system needs to provide in a desktop application a way to automatically identify PCs and servers with low disk space, the presence of unwanted software on your network, the status of your anti-virus updates, printers with low toner and ink levels, and offline servers. Moreover, such a system should be able to create monitors for anything else an IT administer may want to be warned about such as license violations or un-patched machines. Such alerts and information should arrive quickly and easily to the network's IT administrator.

Accordingly, there is a need for an IT management software package that addresses the shortcomings of existing IT management software noted above.

There is a further need for an IT management software package that is easy to use, integrated and directed to common IT management issues.

SUMMARY

A need has arisen for a network device and software monitoring system that provides an online marketplace for purchasing product solutions from third party vendors. In accordance with the disclosed subject matter, network device and software monitoring and online marketplace platform for purchasing product solutions from third party vendors is provided which substantially eliminates or reduces disadvantages associated with previously developed network monitoring and purchasing platforms.

According to one aspect of the disclosed subject matter, a method, system, and network for interfacing the work-flow monitoring and reporting of a host computer, a local network of information technology devices, a community of network users, and third party vendors is provided. This includes processes and systems for initiating an inventory, including software, of a plurality of information technology devices associated with a local network of information technology devices from a host computer and determining the operational status of the information technology devices associated with the local network. The operational status of the information technology devices associated with the local network is monitored and presented to a host computer. Needs relating to the local network are identified and determined and a purchasing platform for purchasing product solutions from third party vendors is provided.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE DRAWINGS

The features, nature, and advantages of the disclosed subject matter may become more apparent from the detailed description set forth below when taken in conjunction with the drawings in which like reference characters identify correspondingly throughout and wherein:

FIGS. 24 through 45 are screen shots showing aspects and functionalities of an online market place platform request for quote component in accordance with the disclosed subject matter;

FIG. 46A and FIG. 46B are screen shots showing aspects of an online market place component/platform in accordance with the disclosed subject matter;

FIGS. 47 through 55 are screen shots showing various reports and purchasing status updates that are provided to the user relating to device purchases; and FIGS. 56 through 67 are screen shots depicting various aspects and functionalities of an online network management (inventory) component.

DETAILED DESCRIPTION OF THE DISCLOSURE

Figure 1:
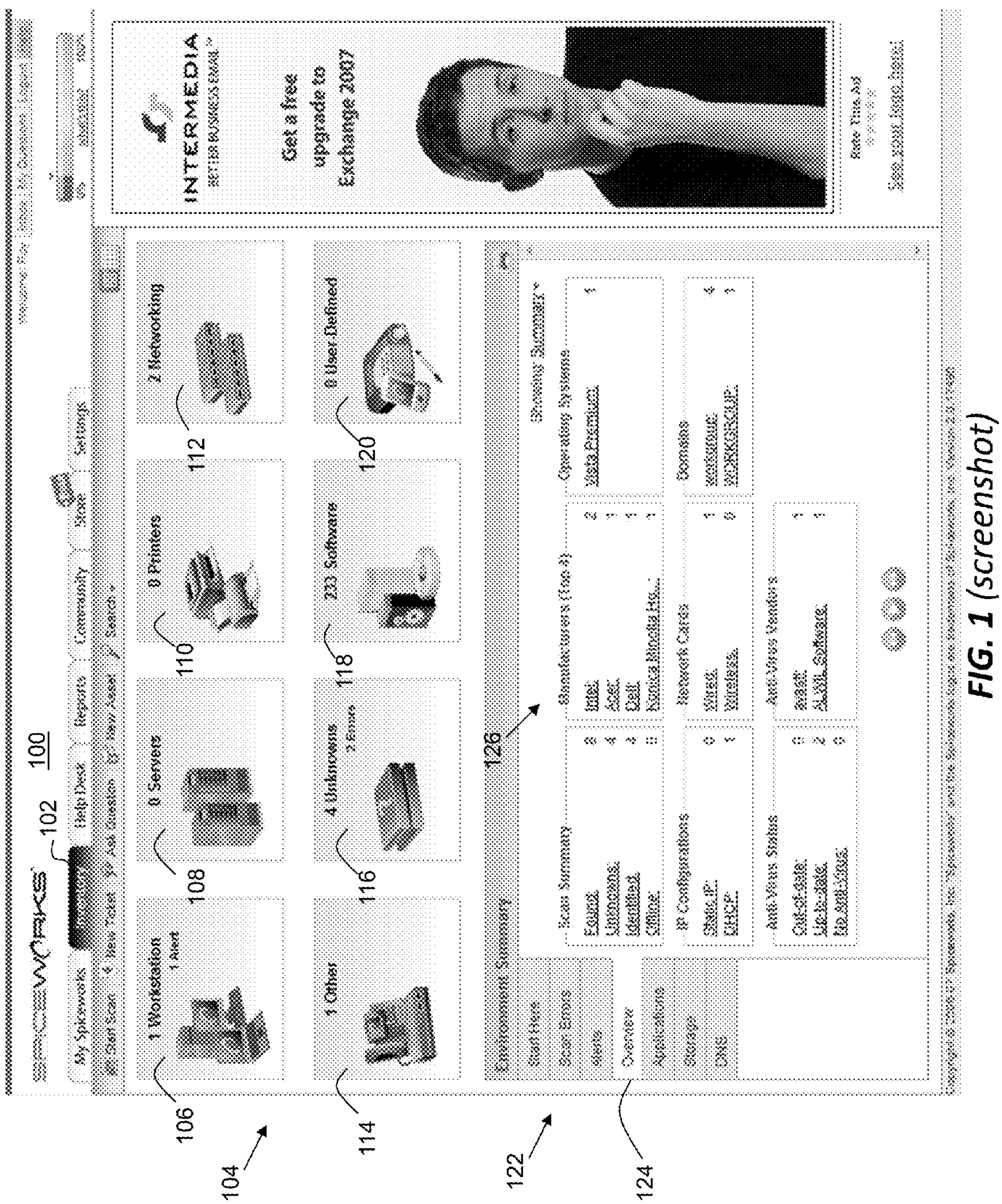
FIGS. 1 through 11 show views of the inventory tab of one embodiment of the disclosed subject matter.

The following description is not to be taken in a limiting sense, but is made for the purpose of describing the general principles of the present disclosure. The scope of the present disclosure should be determined with reference to the claims. Preferred embodiments of the disclosed subject matter are illustrated in the FIGUREs, like numerals being used to refer to like and corresponding parts of the various drawings.

In the context of this document, a "memory," "recording medium," and "database" can be any means that contains, stores, communicates, propagates, or transports the program and/or data for use by or in conjunction with an instruction execution system (such as a database management system), apparatus, or device. Memory, recording medium, and database can be, but are not limited to, an electronic, magnetic, optical, electromagnetic, infrared or semiconductor system or device. Memory, recording medium, and database also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored. Instruction execution systems (such as a database management system) allow for the creation, maintenance, use, and management of the database and its contents.

Further, the disclosed subject matter may be described in the general context of computer-readable instructions, such as program modules, being executed by a computer. Generally, program modules include routines, programs, objects, components, data structures, etc. that perform particular tasks or implement particular abstract data types. The disclosed subject matter may also be practiced in distributing computing environments wherein tasks are performed by remote processing devices that are linked through a communications network (herein referred to as an "online" network or "online"). Such a distribution method may be achieved through a network-transfer distribution (i.e. internet delivery). In a distributed computing environment, program modules may be located in local (host) and/or remote computer storage media including memory storage devices.

The disclosed subject matter relates to IT management software. Features of the disclosed subject matter include the ability to inventory a network, run an IT help desk, monitor a network for trouble, report on a network, troubleshoot issues on a network, collaborate with IT professionals, and provide feedback for software improvement.

The disclosed subject matter allows for an inventory of all hardware, software and other assets on a network. The disclosed subject matter allows for discovery of the Windows, Mac, and Linux PCs and servers, routers, printers and any other IP-based devices on a network. All relevant technical data plus the software, patches and services on each machine may be gathered and logged. Other data such as number of licenses, purchase price, and physical location may also be stored. Other assets such as mobile phones, projectors, and office furniture, etc. may also be stored. All of this information may be gathered without the use of agents. All inventory information may be stored locally and securely on the network, avoiding any concerns about sensitive information being communicated over the internet.

FIG. 1 shows a view 100 of an embodiment of an inventory tab 102 of the present disclosure. The inventory tab 102 allows a user to determine the hardware and software installed in an environment and to take action on that data. The top half of the screen 104 shows the major categories that assets are automatically sorted into upon discovery. In the embodiment shown, the categories include Workstations 106, Servers 108, Printers 110, Networking 112, Other 114, Unknowns 116, Software 118 and User-Defined 120. The bottom half of the screen 122 shows Overview tab 124, displaying the assets discovered in the environment and allowing a user to quickly see any issues. In the embodiment shown, the Overview tab 124 shows the top manufacturers, operating systems, anti-virus vendors and status information along with the number of assets discovered in each category. In one embodiment, underlined data indicates that a user may perform some kind of action on that data. For example, under the Manufacturers (Top 4) tab 126, if a user wishes to see assets manufactured by Dell, a user may click the Dell link to receive a filtered view of environment data. Similarly, to see all assets not manufactured by Dell, a user may hover over the Dell link and see 'Others not like this' (not shown).

Figure 2:
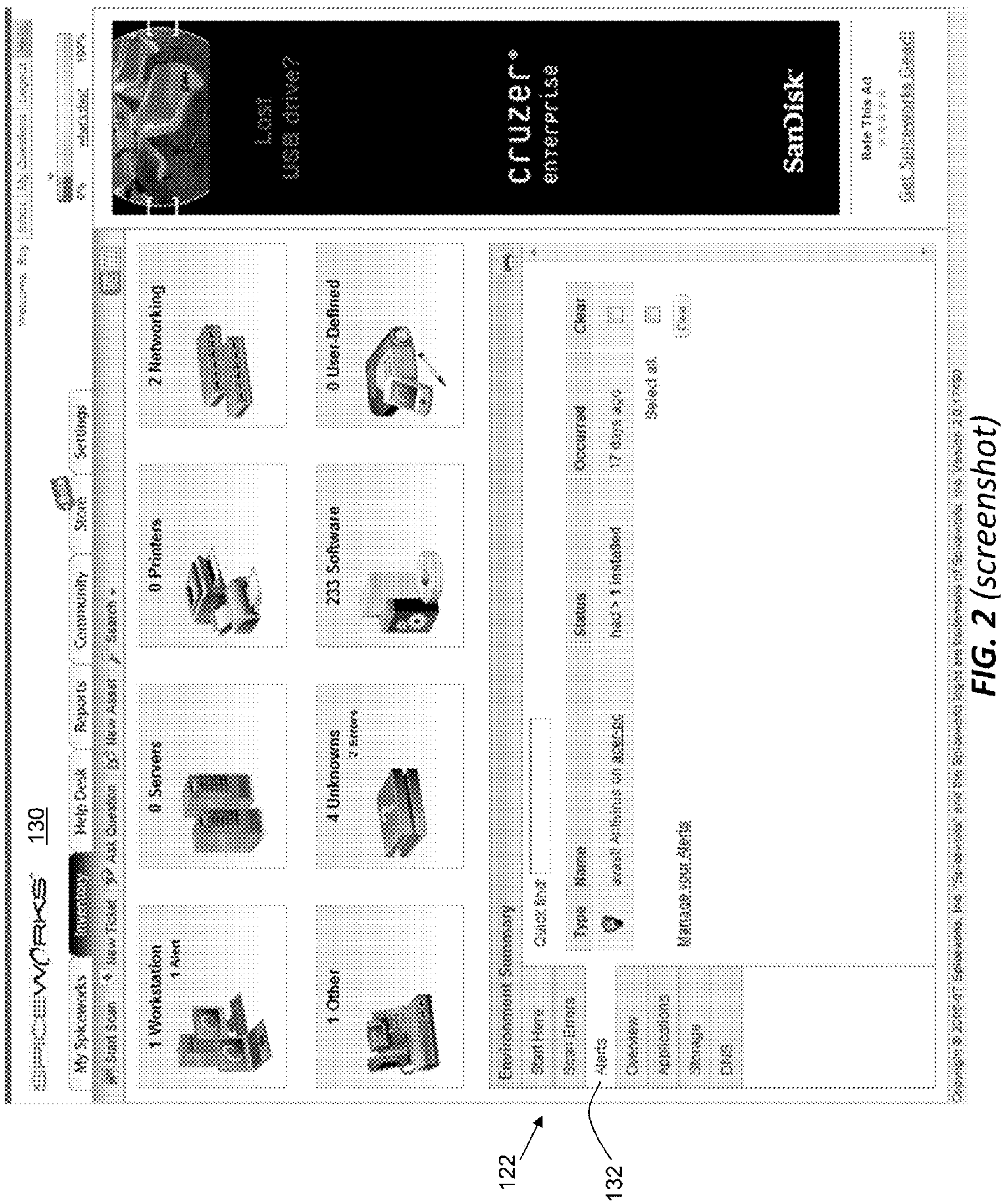

FIG. 2 shows a view 130 of Alerts tab 132 on the bottom half 122 of the screen. The Alerts tab 132 allows a user to see, at a glance, different alerts that have been fired for the entire network. In one embodiment, default alerts may include whether a machine is offline, is running out of disk space, or if anti-virus software is not up to date.

Figure 3:
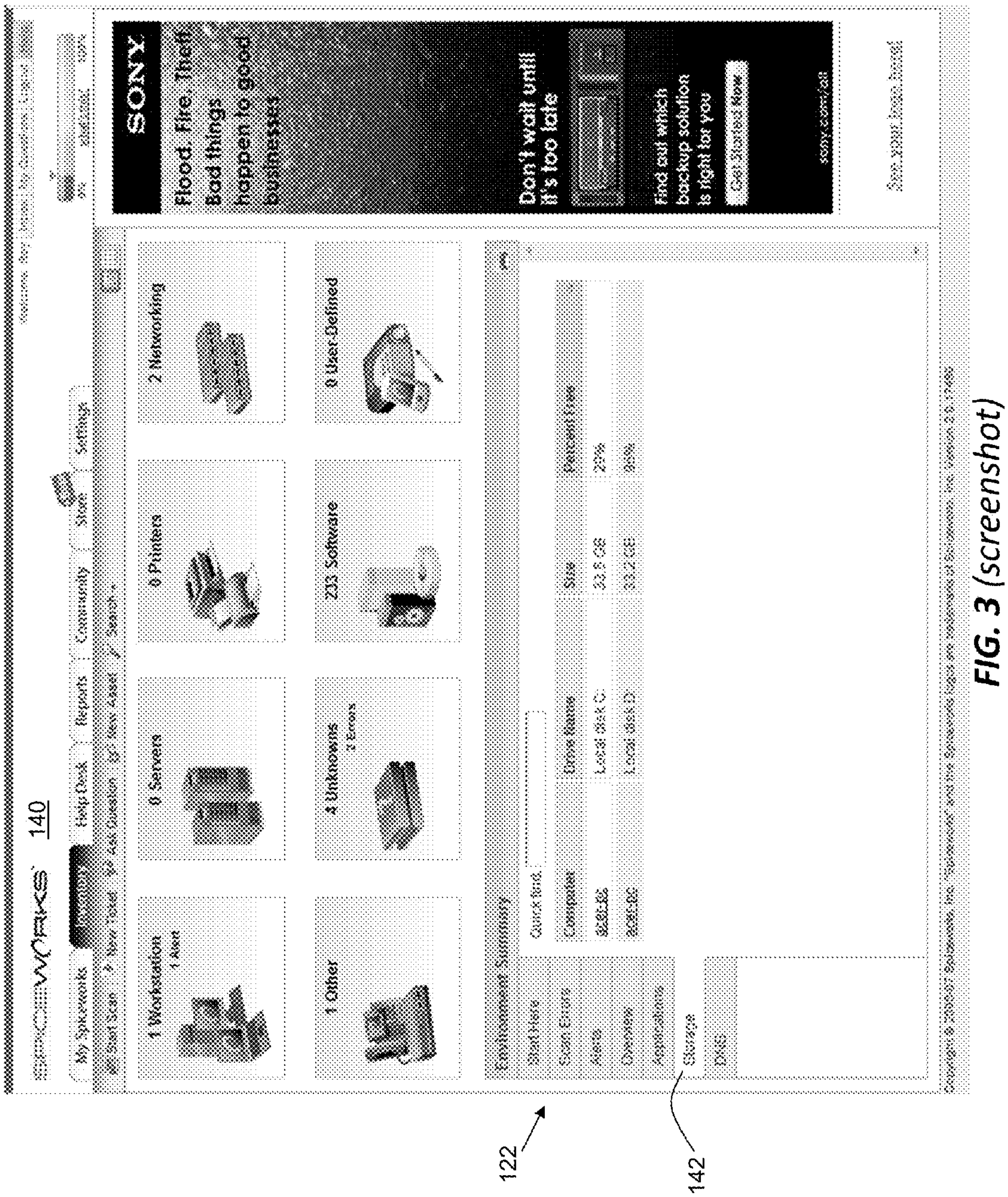

FIG. 3 shows a view 140 of Storage tab 142 on the bottom half 122 of the screen. The Storage tab 142 allows a user to see all assets in the environment and how much hard disk space remains. A user may view that an asset is running out of disk space and proactively try to manage the issue before it becomes a problem.

Figure 4:
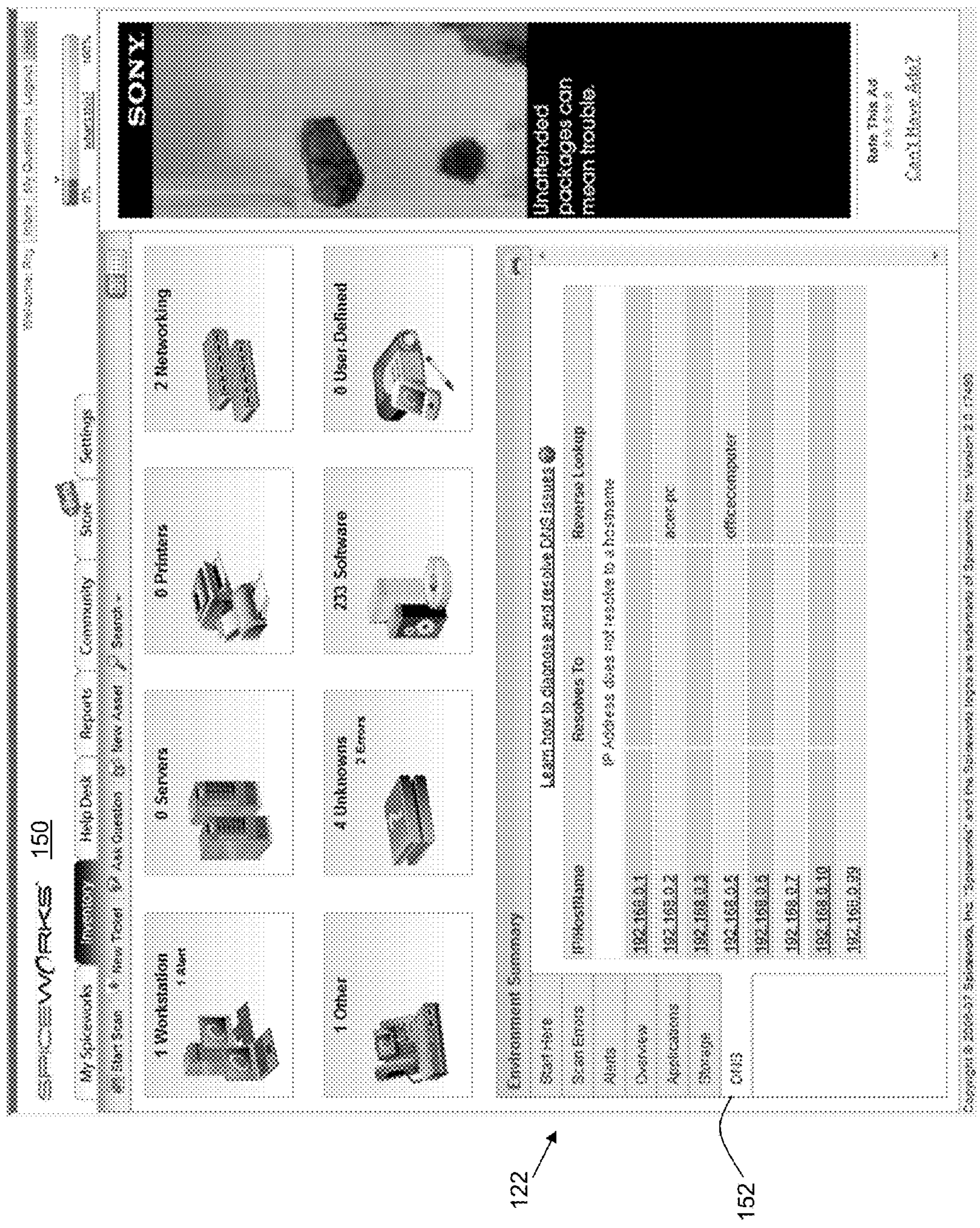

FIG. 4 shows a view 150 of DNS tab 152 on the bottom half 122 of the screen. The software will attempt to query a DNS server and make sure that it is configured correctly.

Figure 5:
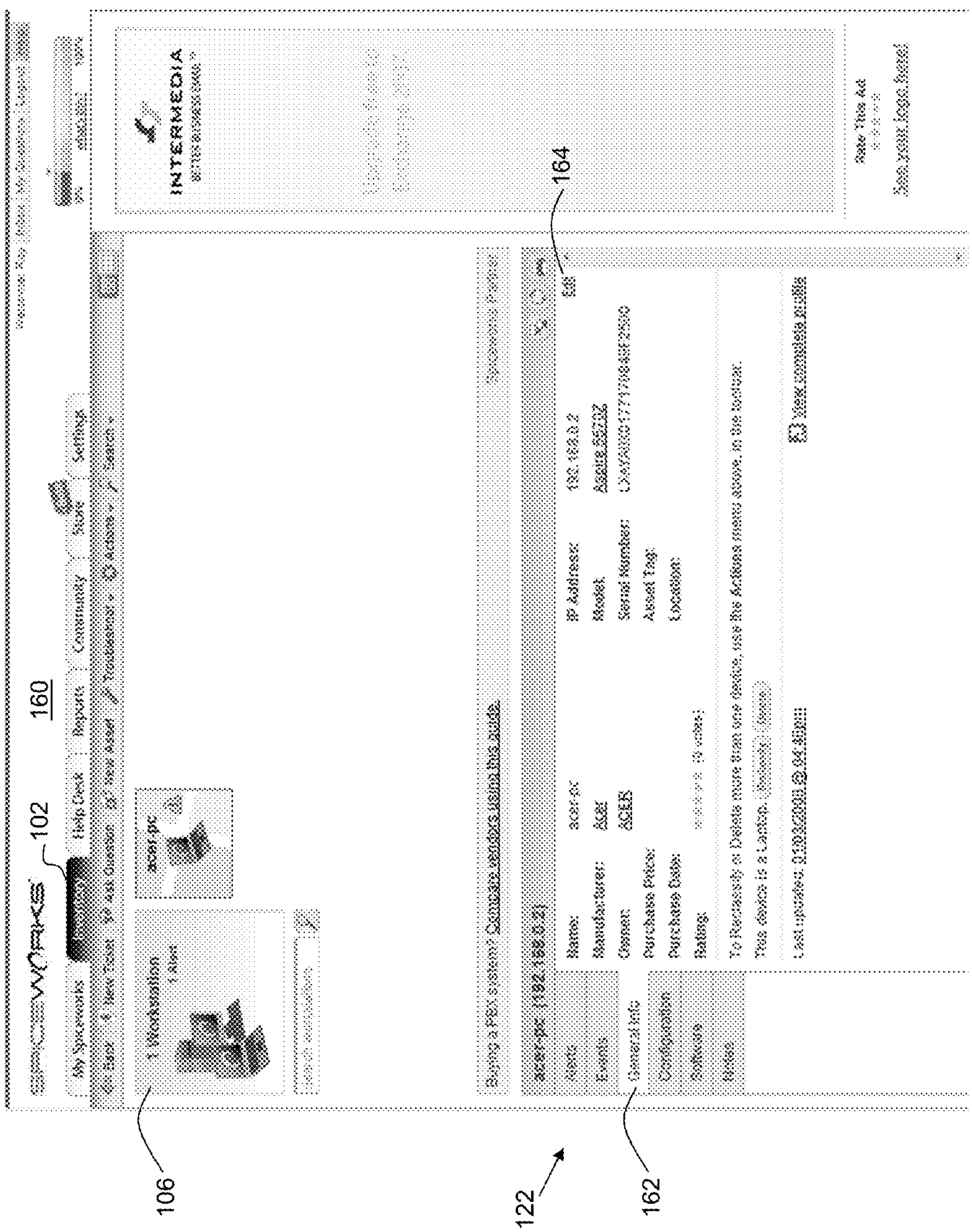

FIG. 5 shows a view 160 of one embodiment of the data a user may view related to a workstation upon clicking the Workstations 106 category under the inventory tab 102. In the embodiment shown, the General Info tab 162 at the bottom half 122 of the screen shows information collected by the software related to a workstation. Such information may include manufacturer, model, serial number and other information about the workstation. A user may manually enter information about the workstation by clicking the Edit tab 164. In the embodiment shown, such information may include purchase price, purchase date, asset tag and location.

Figure 6:
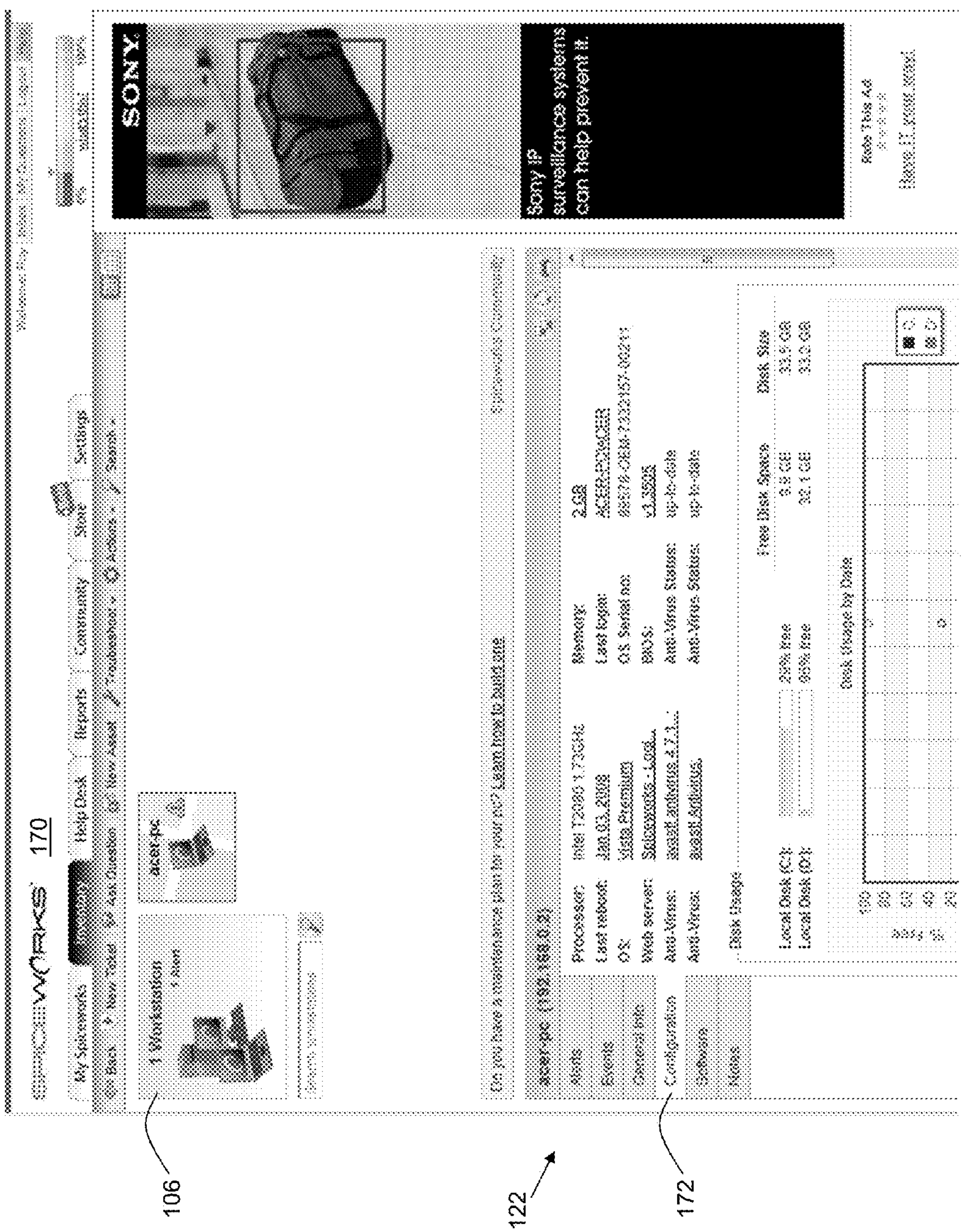

FIG. 6 shows a view 170 of Configuration tab 172 at the bottom half 122 of the screen. In the embodiment shown, reboot information, amount of memory, last login, BIOS among other information.

Figure 7:
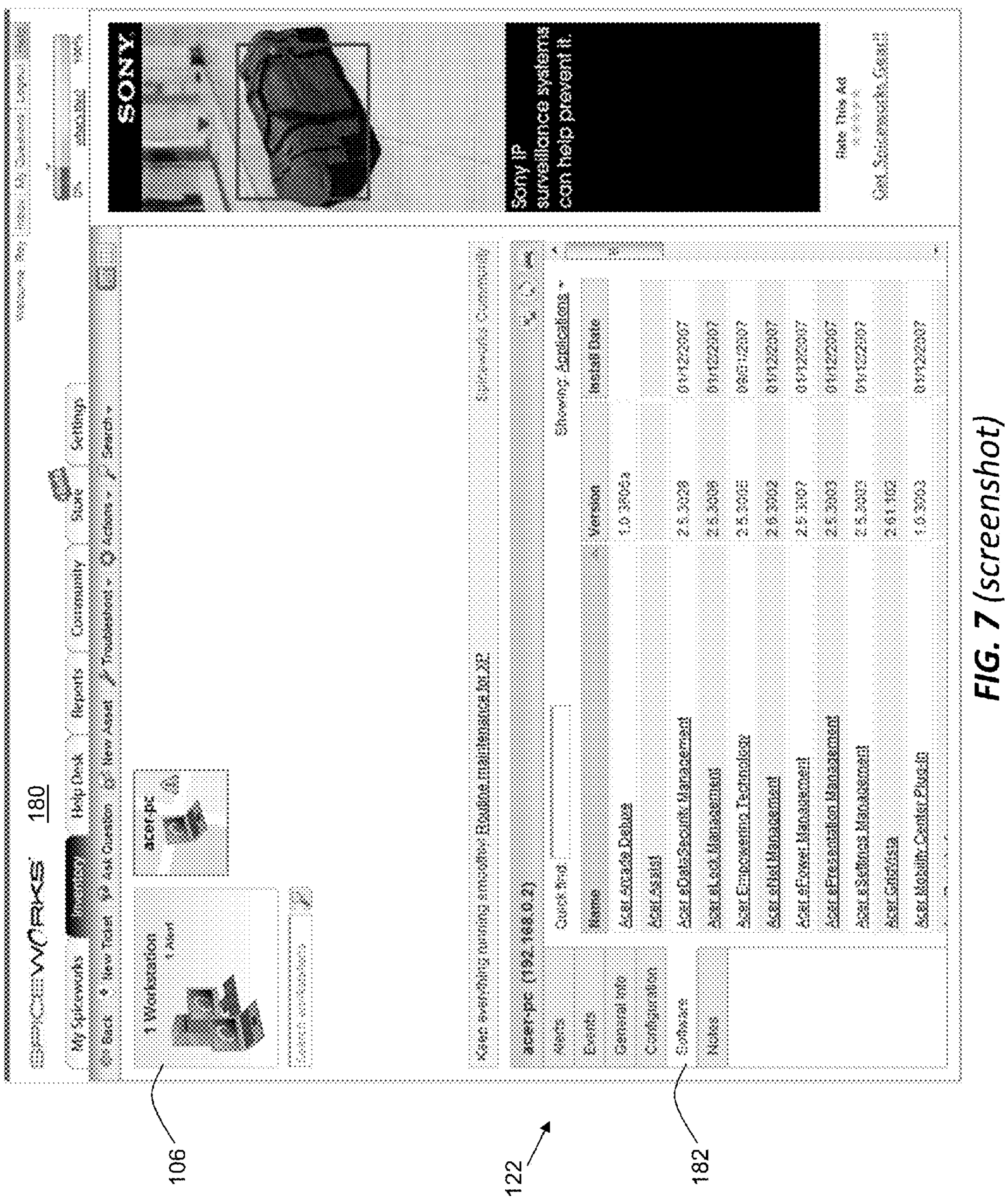

FIG. 7 shows a view 180 of Software tab 182 at the bottom half 122 of the screen. In the embodiment shown, all of the software installed on the device, what the version number, and when it was installed.

Figure 8:
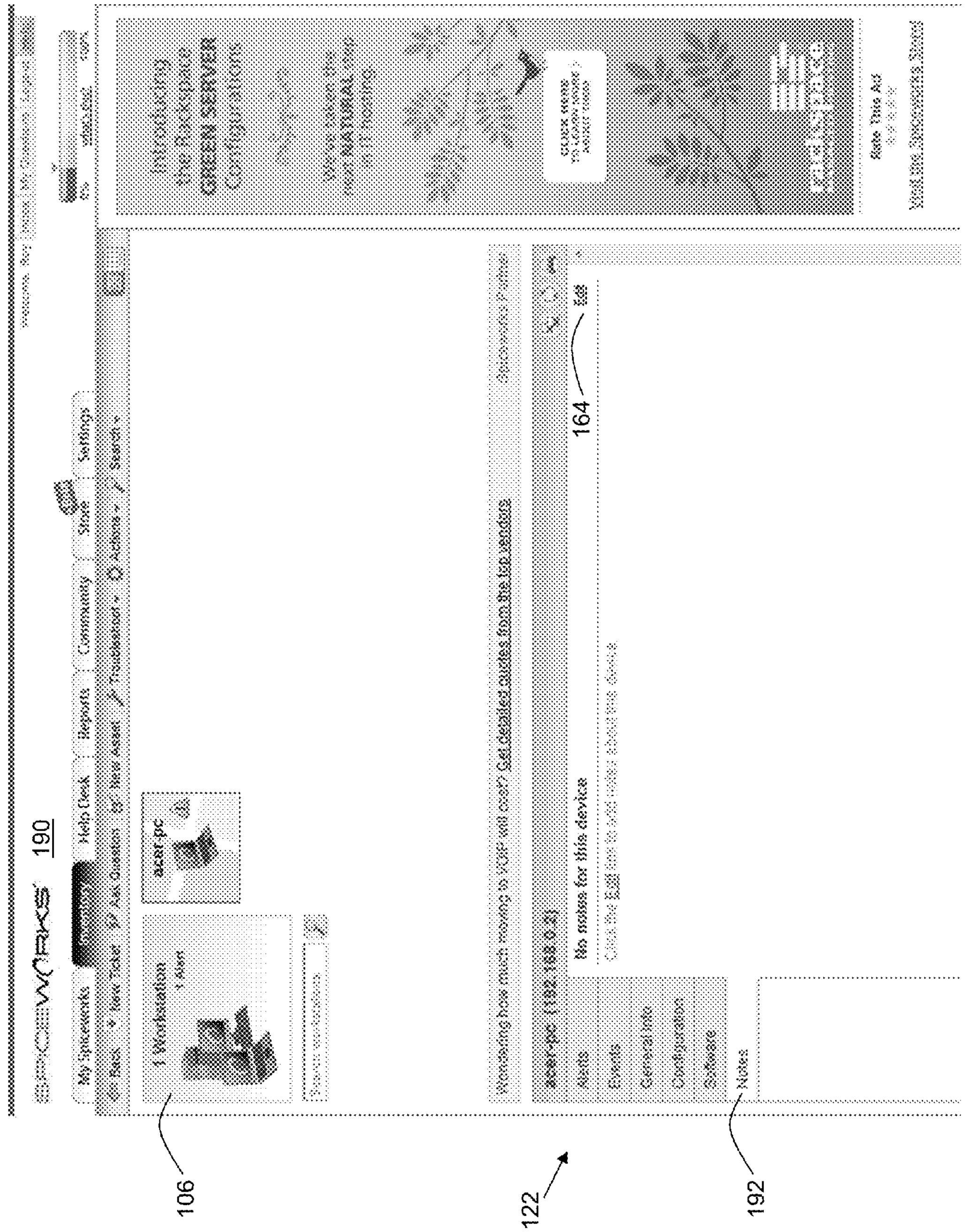

FIG. 8 shows a view 190 of Notes tab 192 at the bottom half 122 of the screen. In the embodiment shown, a user may enter notes about a workstation using Edit tab 164. For example, a user may want to make a note of problem issues associated with that workstation.

Figure 9:

FIG. 9 shows a view 200 of one embodiment of the data a user may view related to a workstation upon clicking the Software 118 category under the inventory tab 102. In the embodiment shown, the name 202 of the software, the oldest version 204 of the software on the network, the latest version 206 of the software on the network, the licenses 208 and number of installs 210 are displayed.

On the bottom half 122 of the screen, the General tab 212, Installed On tab 214, Not Installed tab 216, and Notes tab 218 are useful in managing licenses. For license compliance, a user may input the number of licenses available for a given software package. In the event that the number of installed versions of software exceeds the number of available licenses, an alert may be issued, indicating that the threshold for license compliance has been crossed. This may be a very powerful tool for a user to take to management to request purchases of additional required licenses. In addition, it may be useful for a user to be able to ensure that for a volume license, the same key is being used for each instance of installed software.

Figure 10:
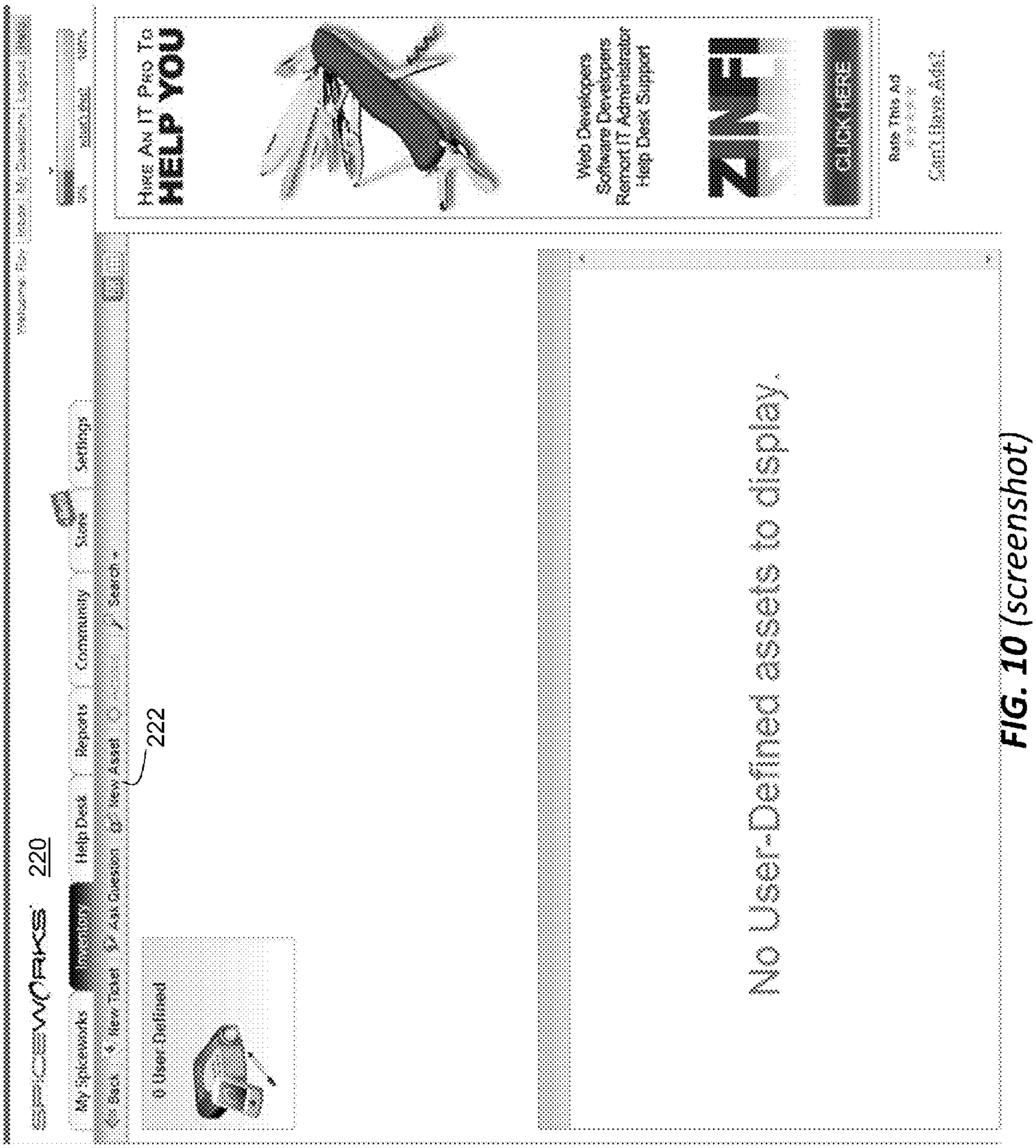
Figure 11:
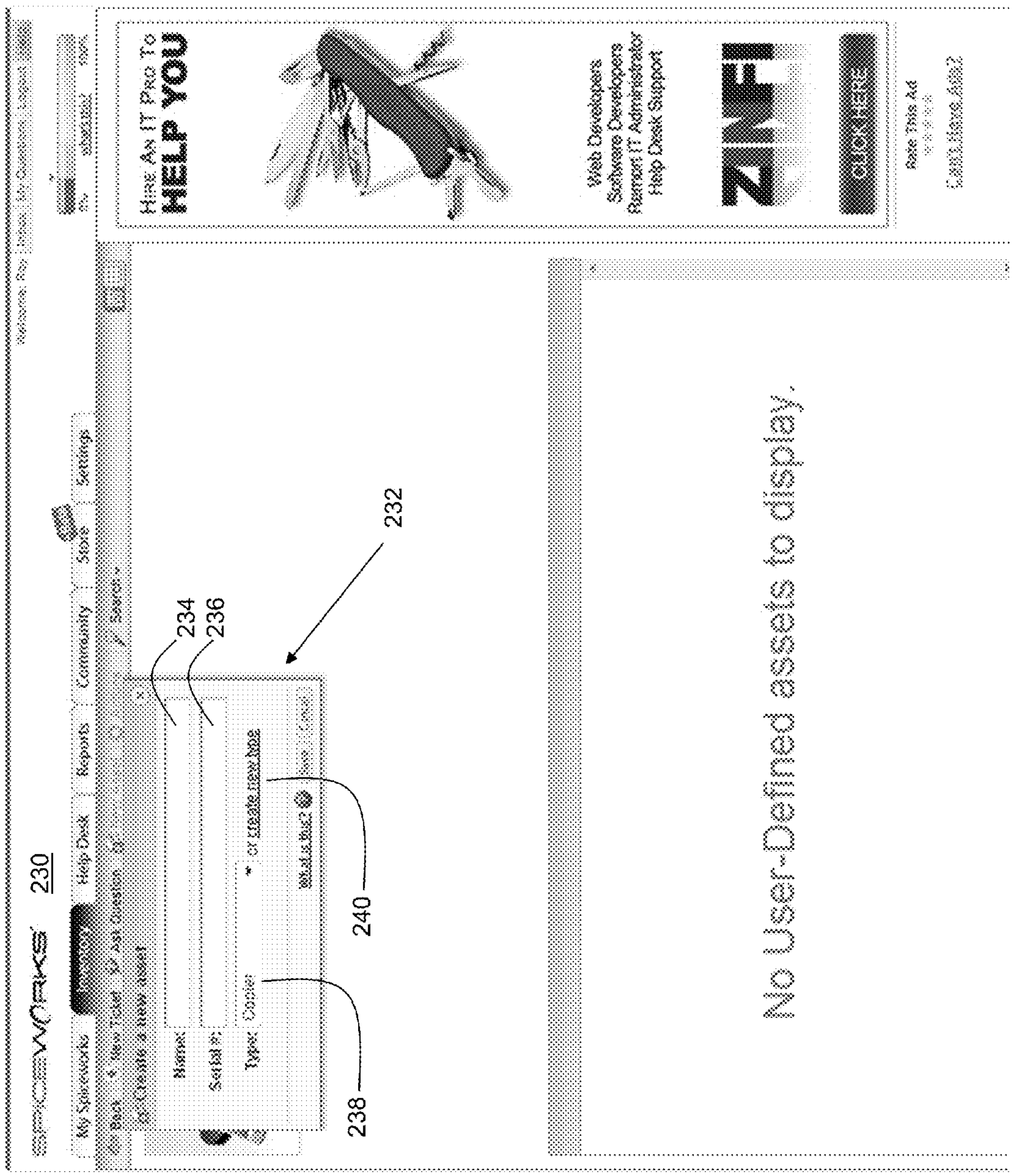

An IT administrator may also need to manage things that are not easily detectable on a network. In that case, there is a 'User Defined' category. FIG. 10 shows a view 220 of one embodiment of the data a user may view related to a workstation upon clicking the User-Defined tab 120 category under the inventory tab 102. For example, in order to track a new projector (not easily detectable on a network), a user may click the 'New Asset' tab 222. FIG. 11 shows a view 230 of one embodiment of a user pop-up 232 for entering information related to a new asset. For example, a user may enter Name 234 and Serial Number 236 as well as select a Type 238 from pre-defined categories. In one embodiment, the pre-defined categories in the Type 238 pulldown include Copier, desktop, Fax, Hub, Laptop, Printer, Router, Server, SnmpDevice, Switch, VoIPDevice and Wireless Access Point. Alternatively, a user may create a new type 240 by manually defining a category.

The disclosed subject matter also provides for an information technology (IT) help desk. Daily projects and user requests may be managed from one interface. A ticket may be created upon discovery of a network asset that requires attention while browsing a network. Clients may submit tickets with attachments via email or the Web and may then view the status of those tickets online. Tickets may be assigned across an IT team or attached to hardware on the network. Reports may be run on the tickets to easily view due dates and which assets (or even departments) cause the most issues.

An internal help desk may greatly reduce the amount of time spent tracking work and responding to users and also makes it easy to report on the amount of time spent doing IT related activities. In one embodiment, the presently disclosed software is pre-configured with several of the most commonly used help desk options.

Figure 12:
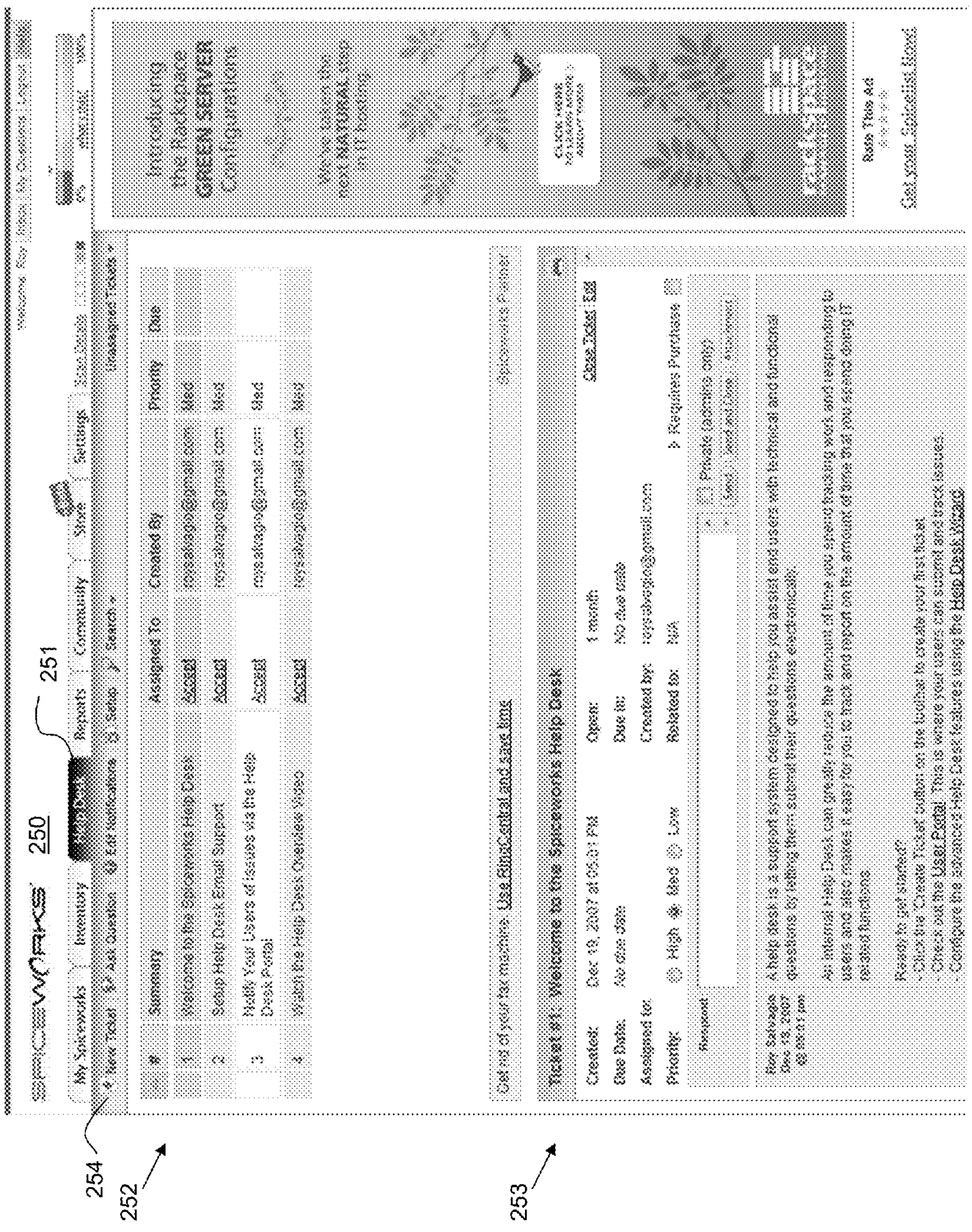
FIGS. 12 and 13 show views of the help desk tab of one embodiment of the disclosed subject matter.

FIG. 12 shows a view 250 of an embodiment of a help desk tab 251 of the present disclosure. As shown, the help desk is divided into two regions. The top half of the screen 252 shows current help requests while the bottom half of the screen 253 shows the details of a particular help request. In one embodiment, there are several ways to create a help request.

Figure 13:
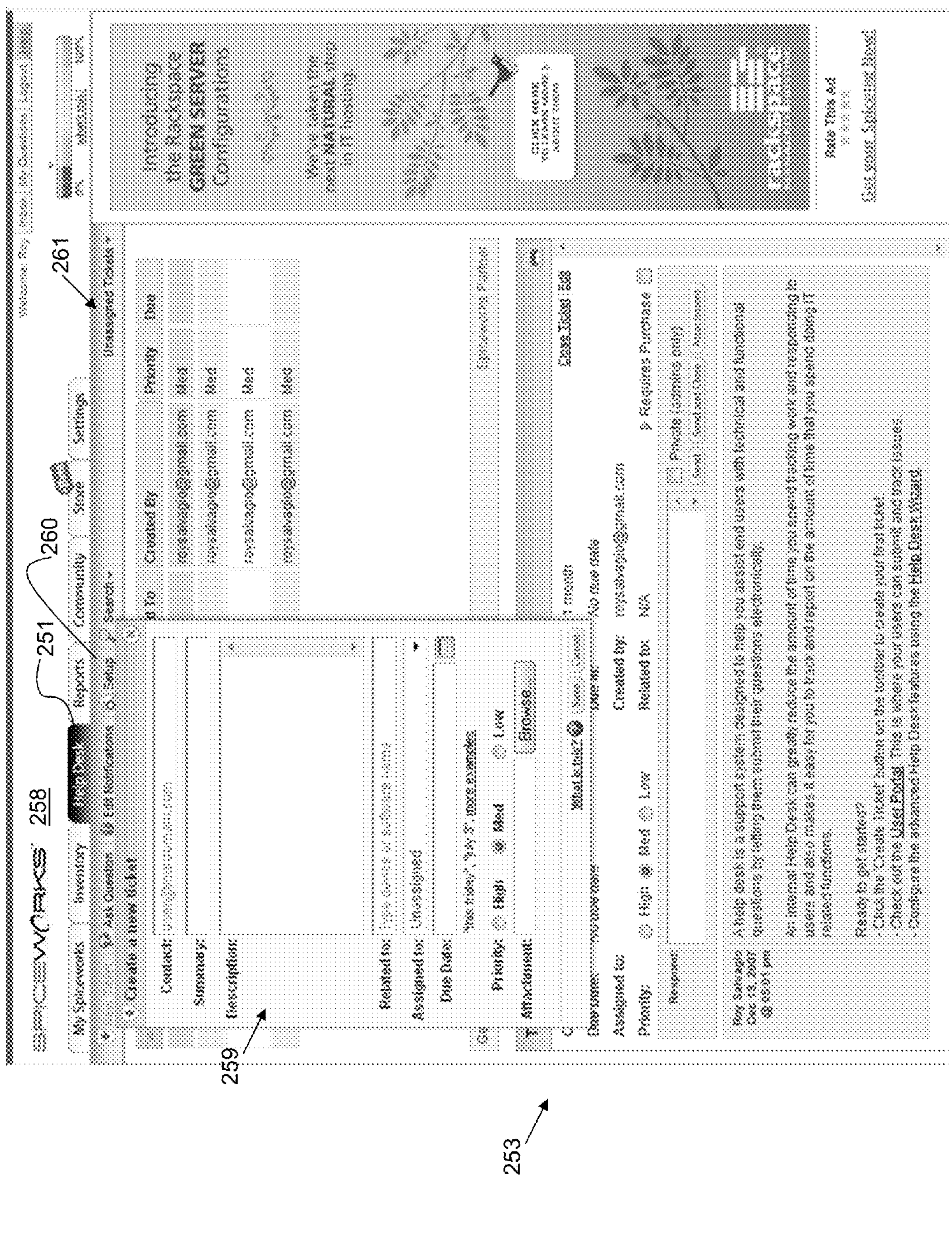

An administrator may create a help request within the presently disclosed software using the New Ticket tab 254. FIG. 13 shows a view 258 of a form for creating a new ticket 259 that appears when an administrator clicks on the New Ticket tab 254. In the embodiment shown, form 259 includes Contact, Summary, Description, Related To, Assigned To, Due Date and Priority input fields. Form 259 also allows for the attachment of files using the Browse button. Alternatively, users may submit help desk requests by directly using the web interface (not shown) of the presently disclosed subject matter. This is available to anyone with a web browser, making it easy to submit a request, check on the status of a request, as well as reply. Alternatively, the help desk may automatically create help desk requests by allowing a user to send an email. This may be done by clicking the Setup tab 260.

In one embodiment, help desk tab 251 allows an administrator to select the tickets to be viewed 261 as unassigned tickets, open tickets, closed tickets, past due tickets, all tickets, tickets assigned to that administrator, and tickets where a purchase is required. Further, an administrator may make changes to a help desk request and correspond with a user using the features available on the bottom half of the screen 253.

The disclosed subject matter provides for reports for sharing IT information. Reports may include software installed on machines, disk usage across the network, trouble tickets recently created, among others. Further, custom reports may be created using a simple interface. Reports may be published or exported to PDF or Excel. Useful custom reports may be shared with other users.

Figure 14:
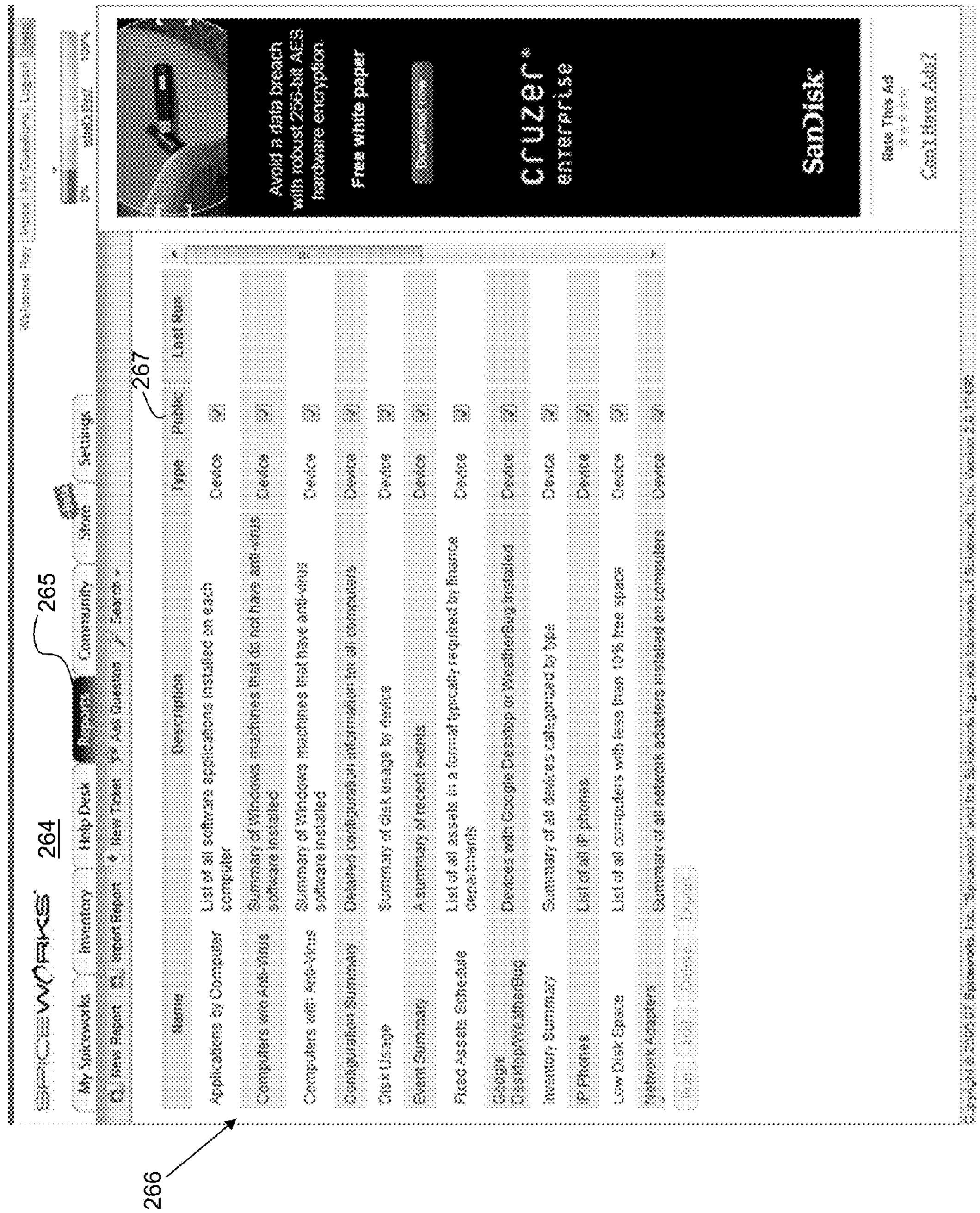
FIG. 14 through 16 show views of the reports tab of one embodiment of the disclosed subject matter.

FIG. 14 shows a view 264 of an embodiment of a reports tab 265 of the present disclosure. In one embodiment, default reports 266 include Applications by Computer, Computers without Anti-Virus, Computers with Anti-Virus, Configuration Summary, Disk Usage, Event Summary, Fixed Assets Schedule, Google desktop/WeatherBug, inventory Summary, IP Phones, Low Disk Space, Network Adapters Summary, Printers and Copiers, Server Event Summary, Services on Computers, Tickets by Device, Installed Applications, Software Compliance, Tickets by Software, All Tickets, Closed Tickets, Open Tickets, Reopened Tickets and Tickets Pending Purchase.

Note that the Public column 267 may be used to mark a report as available to other users. For example, a supervisor or accounting personnel may need to view reports regularly. Making a report public allows such a user to view the report from within the software of the disclosed subject matter.

Figure 15:
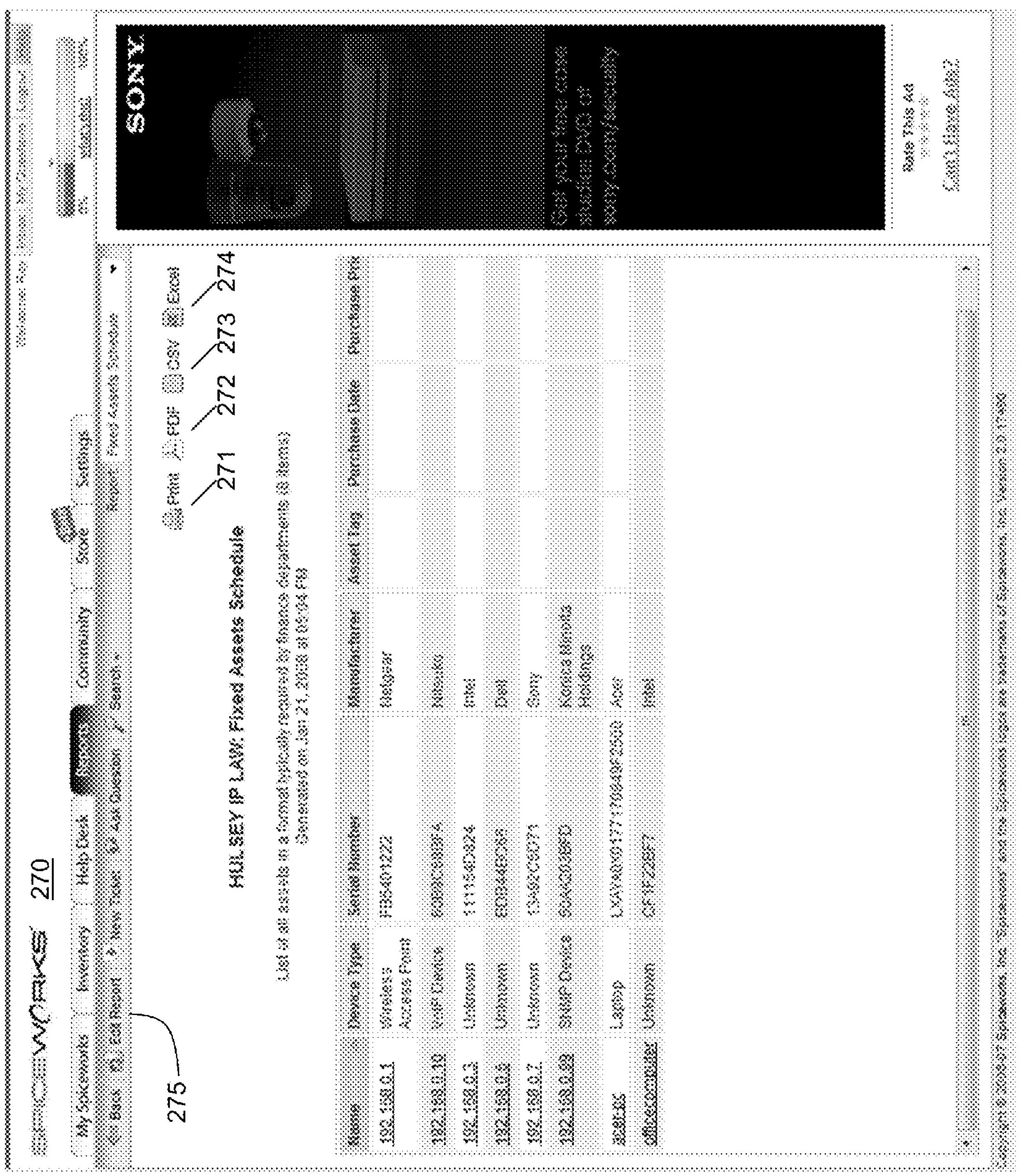

FIG. 15 shows a view 270 of one embodiment of a default report, a Fixed Assets Schedule. A user has the options to Print 271, export to PDF 272, Export as CSV file 273, or export to Excel 274. Further, a user may edit a report by clicking the Edit Report tab 275.

Figure 16:
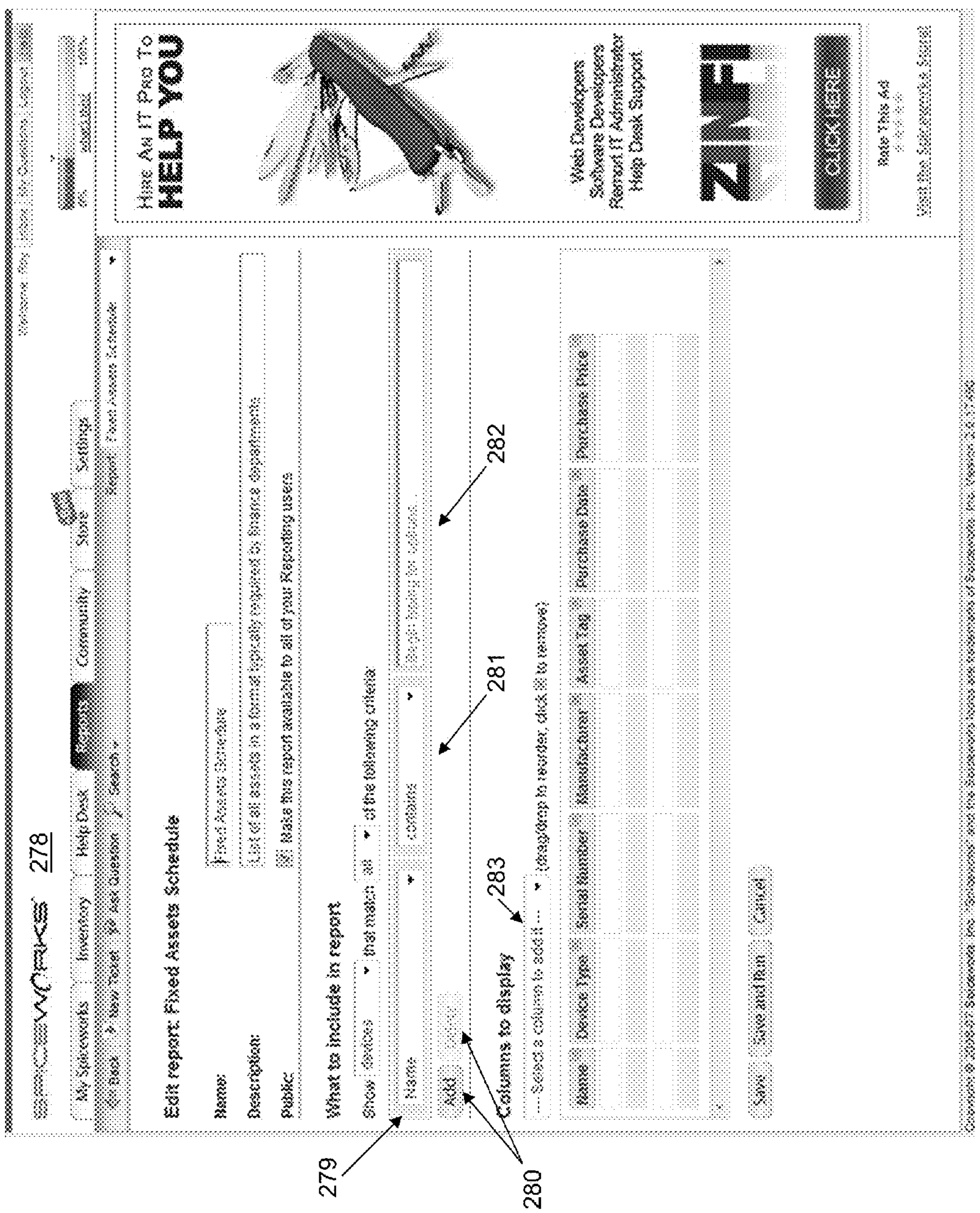

FIG. 16 shows a view 278 of one embodiment of the options available for editing a report. The Name dropdown 279 displays a list of available items to be included in the report. Add and Delete buttons 280 enable a user to add or delete items in the report. In one embodiment, criteria dropdown 281 may include such operators as is, is not, contains, does not contain, begins with, and ends with. Text input field 282 allows a user to manually input data. A user may select the columns for display in the report using the Columns to display dropdown 283.

The disclosed subject matter may also be used to monitor a network for trouble. A user may view, and set up alerts for, Windows events that occur across the environment for easily detecting, diagnosing and troubleshooting issues that disrupt a network. Further, the disclosed subject matter allows for automatic identification of PCs and servers with low disk space, the presence of unwanted software on the network, the status of anti-virus updates, printers with low toner and ink levels, and offline servers. Email alerts may be used for notification of potential issues. Further, valuable monitors are all consolidated in one centralized location.

Figure 17:
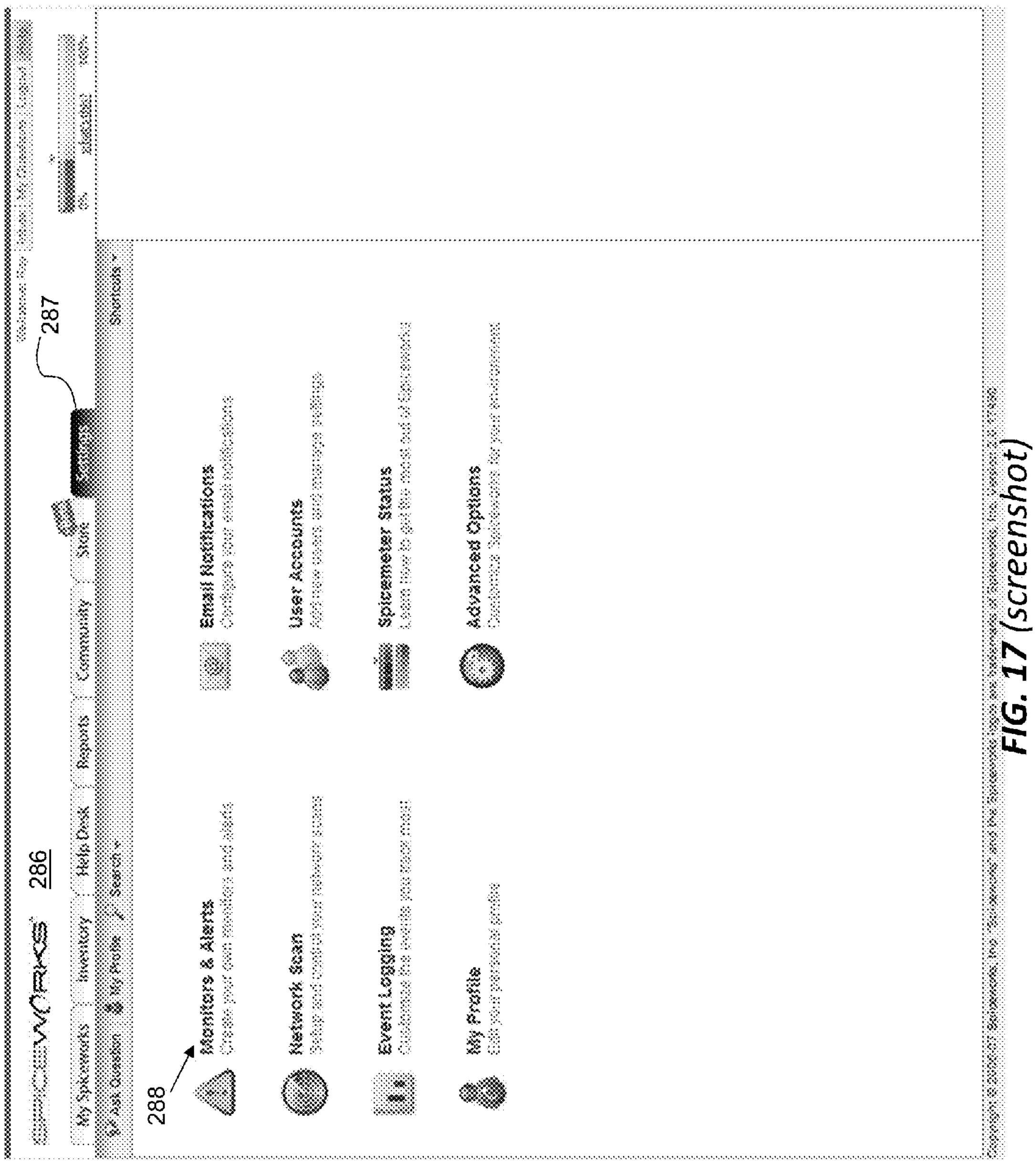
FIGS. 17 and 18 show views of the settings tab of one embodiment of the disclosed subject matter.
Figure 18:
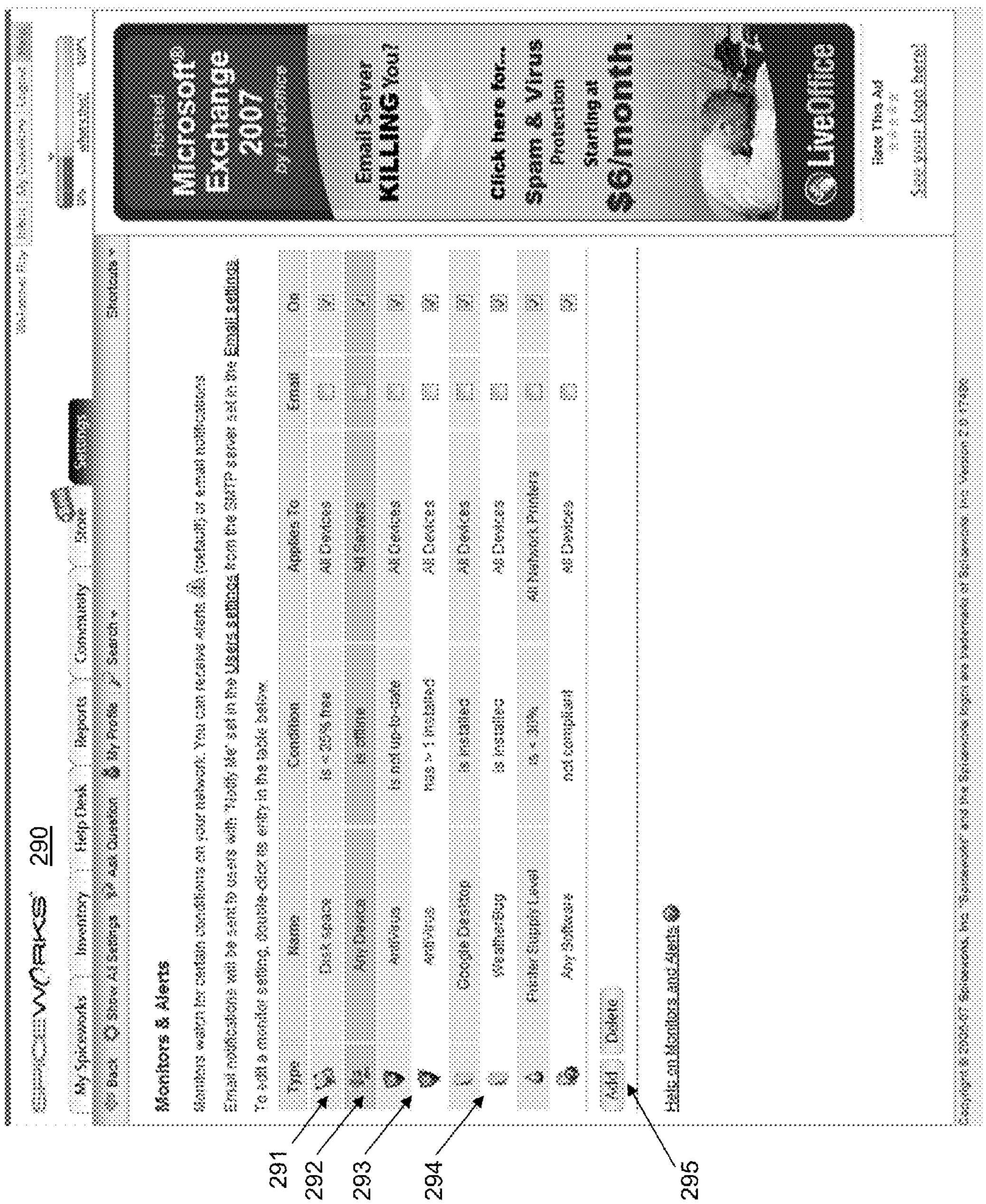

FIG. 17 shows a view 286 of an embodiment of settings tab 287 of the present disclosure, including a link to Monitors and Alerts 288, shown in view 290 of FIG. 18.

A monitor is any condition which can be automatically evaluated by the software of the present disclosure. In one embodiment, the default monitors include Disk Space 291 (amount of free disk space), Online/Offline Status 292 (online/offline status for a device or group of devices), Anti-Virus 293 (when anti-virus software is present and up to date), and Troublesome Software 294 (when specified software is removed or installed, including Google desktop and WeatherBug).

To add a new monitor, a user may click 'Add' 295. For example, an administrator may want to monitor when a new version of Microsoft Office Outlook is installed or uninstalled. This will result in an alert being fired in the event that Microsoft Outlook is installed or uninstalled. This is a powerful way of monitoring an environment without the need for manually checking each system in the environment.

The disclosed subject matter allows the user to report on the network. The software allows the user to see software installed on machines, disk usage, and trouble tickets. Custom reports can be created and published so that others in the network can be informed of network updates, and issues. Reports may then be exported in file formats such as PDF and Excel. Finally, the user can share and receive report templates from other users of the software.

The disclosed subject matter allows a user to troubleshoot issues on the network. When problems arise, the software allows for identification of cause and resolution of the problem. For example, a user may see what software is running on a machine causing it to run slowly. A remote control tool may be launched from within the software. Two machines may be compared to determine what settings are different. The software allows for pinging a machine to see if it is online, waking up a computer with a wake on LAN request, or running a traceroute to identify the flow of data. Further, the software allows a user to identify when a server is running out of capacity.

A user may troubleshoot a workstation with an issue by comparing that workstation with another workstation that is working correctly. The Compare tab allows a side by side comparison of a first machine versus a second machine. The software highlights in red any difference found in hardware, configuration, software, services or hotfixes. A user may also perform remote administration of machines via the Remote Control tab. The software uses two methods of remote control including Microsoft's Remote desktop protocol and VNC screen-sharing protocol, but other remote control methods are configurable.

Figure 19:
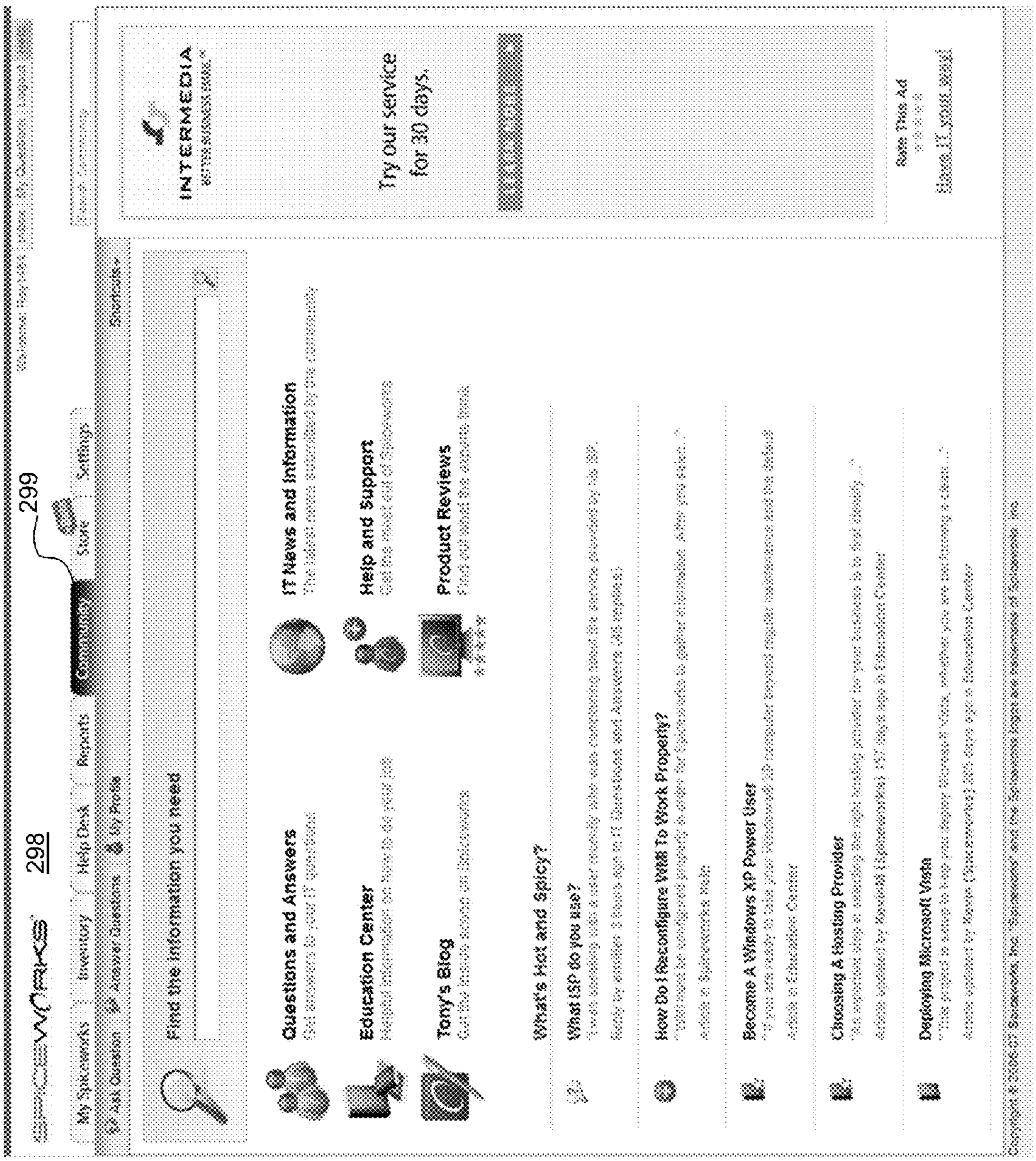
FIG. 19 shows a view of the community tab of one embodiment of the disclosed subject matter.

FIG. 19 shows a view 298 of an embodiment of community tab 299 of the present disclosure. The disclosed subject matter allows a user to collaborate with other IT professionals. For example, a user may receive ratings and recommendations, ask questions, get tips and support, or join discussions. The collaboration may allow a user to help author IT Wikipedia articles, all with an audience that is familiar with small and medium sized business IT issues. Further, a user may submit useful online IT news and information.

The disclosed subject matter allows a user to become a virtual extension of the software development team. A user may request and vote on new features, view other users' ratings of features, submit feedback on existing features, and preview upcoming releases.

A particularly advantageous aspect of the disclosed subject matter is the vast simplification of obtaining and analyzing data from current IT professionals through a set of easy-to-use functions and a readily understandable interface. Thus providing very detailed information to product developers and marketers regarding potential markets, product placement, potential revenue, etc. This substantially lowers time to market delays caused by traditional market analysis and frees product developers and marketers from the complexity of obtaining and analyzing data.

The following features of the network management system insure a substantial number of users will utilize the network management system. In turn, this insures an ever-expanding database of constantly updated and accurate data regarding IT assets, IT administrators and other users, and company information that is critical to technical product and service providers. More specifically, the network management system provides the ability to inventory and monitor an entire network, operate an IT help desk for the enterprise, troubleshoot the local network, report on network assets and performance, as well as provide the ability to obtain desired products for the network and its components (e.g., computer software, printing supplies), all through a simple one-click management interface.

Inventory functions include the ability to determine what hardware and software are connected to a network. This includes inventorying all the Windows, Mac, and Linux PCs and servers, routers, printers and any other IP-based devices on a network. The network management system supports discovering what software packages, services, hot fixes, and patches are installed on the computers on a network. This includes the function of readily accessing service tags, which may be especially helpful when a need exists to contact a personal computer or other product manufacturer for support.

There is the ability to acquire the MAC (media access control) addresses for the computers on a network in order to easily sort out all network cables and ports. Moreover, the user interface helps define and track custom attributes such as warranty, expiry date, purchase price, and more.

The network management system further enables tracking manual assets such as monitors, projectors, cell phones, or other assets, as desired, as well as to "tag" assets by entering searchable, free-form notes directly into the present system on any asset in the system. Automatically running and updating an inventory multiple times a day, while staying on top of software compliance by knowing how many software licenses you're using relative to how many you've purchased all key benefits of the present disclosure.

Further, the network management system facilitates monitoring a network to determine what is working, not working, and what needs attention. Using the present system permits proactive alerts to low hard drive capacity, low printer ink and toner, or servers that are offline. These alerts can be altered to whatever capacity limits the IT administrator desires, such as when a hard drive reaches 80% capacity or if the antivirus software subscription will expire within 2 weeks. Moreover, the IT administrator may be notified when users install unauthorized software or uninstall critical software. The network management system allows for entering the number of licenses a network should have for a software package and will notify the IT administrator when the network exceeds the license allotment. Doing so ensures that the network stays compliant with the allowed licenses. The IT administrator will know when someone creates a Windows user account, thus avoiding the use of phantom network accounts.

Using a Web browser desktop-like interface/model, the network management system provides integrated asset discovery for hardware and software, as well as manual asset entry. Asset monitoring for hardware and software, including user-definable custom Information and notes may the system interactive with the user. Scheduling, automatic updates, and user-definable rules for asset discovery/identification and monitors are also provided. The method and system aid in establishing a community of similarly situated users, including direct feedback functions, the ability to invite a friend, and administration of a console Web-application. Notifications, integrated Help desk and report, and hosted vs. local deployments are also included.

The network management system may be loaded fully or partially by adding only the functionality required on the IT administrator's desktop or parts of it may be hosted. In the hosted configuration, the onsite collection container is "local," but the server and DB are hosted off premise. The onsite collection container is pluggable and provides a bridge to the assets under management. Multiple collection containers are supported for one installation to handle scalability and connectivity constraints due to number of managed assets and their location.

A Web browser desktop interface is provided to make the information or analysis needed for a given management or IT related task be a single action or click away from any previous action. This is done through multiple methods and includes up-front analysis of possible items of interest and clean views of the minimum amount of useful information. The application runs outside of the browser, so if the browser is closed, the system will effectively be turned "off" from a user interface perspective, but still actively collect, monitor and analyze computer and network data in the background. While the browser user interface is open/active, it provides current feedback and allows any element to be "clickable" for more detailed data.

The user interface main page continually provides relevant summary data of the computer network or enterprise system. The main page may provide notifications for completed operations (scheduled), alerts that have triggered from a monitor, and basic summary stats of inventory for hardware. New machines may be found as part of scheduled discovery routines. Total machines of various "types" may be grouped or ungrouped and basic summary stats of inventory for software may be collected and generated.

Top installed packages, licenses overused, and recently Installed Software may be recorded and displayed. Also, pending operations, updates waiting for various software systems, as well as inventory criteria (rules) for hardware and software may be presented. Community breaking news and information may be provided. DNS status flagging possible issues with DNS and active directory status flagging possible issues with Active Directory may be displayed, as well as assets discovered or under management. The interface may also show hot fixes deployed to assets, services installed/running/stopped on assets, and trouble tickets open/closed/past due/awaiting response. Furthermore, software packages under management may be reported.

In operation, a user, (e.g. an IT administrator) will install software on a desktop or server machine (e.g. windows box). The user launches the present system software application or it may be automatically initiated via an installation Wizard, prompting the user for their name to register. From there, the application automatically scans the networks attached to desktop machine and locates and collects information about the networks connected devices that they typically manage on an ongoing basis. An aspect of the present disclosure then schedules a job (thread or executable) that begins probing the network across their network for machines/services, etc. In an alternate embodiment of the present disclosure the probing of the system may be done as a single or multi-pass procedure.

An IT administrator may change and configure options that control the behavior of the network management system, but none of this is required for initial operation. These options include manager account passwords (if there are any), adding additional network ranges or names to scan, adding assets manually, and manually added additional information such as building location, asset tag or any other related information that they want to track.

Assets may be automatically grouped by common relevant aspects, including software installed, type of hardware (CPU type/speed, OS, IP/subnet, manufacturer, type (laptop, desktop, server, etc.), memory size, disk space, service, and any hot fixes that may have been installed. Also, location, purchase price, purchase date, asset tag or any other attribute may be manually entered by the IT administrator.

The network management system discovers hardware using an integrated collection container that employs standard remote management access techniques (such as WMI and SNMP) to obtain information from network assets. This collection container is extendable such that future version of the product may add support for additional discovery techniques without changing the application user interface.

A key aspect of the network management system's discovery approach is the ability to discover distinct and disparate types of assets. After considering the information truly needed from these disparate asset types for the IT administrator to do their job, the electronically available asset information from these devices and other sources is normalized to be in a consistently useful form. In this way, assets such as Windows computers, Linux computers, Mac OS X computers, printers, routers, switches, VoIP devices, etc are discovered and processed by the network management system Application.

During the hardware discovery process, a network prospect is probed to see if it supports standard remote access protocols such as WMI, SNMP, SSH, HTTP, etc. If a viable protocol is supported, it is used to collect information about the asset. This asset information may include, but is not limited to manufacturer, model, network identifier, machine name, asset operating system and kernel versions, CPU, memory, networking (IP and MAC address), BIOS version, serial number, disk usage, management web interface, and remote control interface, for instance. After an asset is discovered, manual fields may optionally be filled in on an ad hoc basis by user and include but are not limited to department, cost, dates, etc. along with basic tracking info that will be customer specific.

The network management system integrates automated software discovery, which includes automated discovery of assets that are installable on a computer such as software, services and hot fixes. During the hardware discovery process, if the class of asset supports interrogation of installed assets such as software/hot fixes and/or services, they are automatically collected and automatically associated with this asset and other assets that use similar software/hot fixes/services.

The software discovery process includes making visible certain aspects of whether the software is running, installed, the version number and patch level of the software and any other relevant information about the software.

The network management system includes many useful initial reports that work with zero additional configuration needed by the IT administrator. These reports may be augmented or adjusted if the IT administrator desires. For a given report, the IT administrator may view, print, or export the report date for use outside of the present system (e.g. .pdf, .csv, and .xcl).

The initial reports may include (a) inventory summary; (b) detailed inventory; (c) fixed assets schedule; (d) computers without anti-virus software; (e) computers with anti-virus software; (f) assets that have software running that is not allowed (g) inventory of IP phones; (h) inventory and usage of printers; (h) open Helpdesk tickets; (i) network adapters connected to devices; (j) services on computers; (k) hot fixes on computers; (l) DNS issues (m) recently installed software (n) recently discovered hardware; (o) assets with low disk space, and (p) other items of interest. Reports marked as public may be run by users who are not IT administrators (such as the accounting group, etc) and are accessed through the integrated Helpdesk discussed below.

The network management system supports hosting at a server site and allows complete or partial implementation on the user system. Additionally, various functions may be implemented at various levels of the users hierarchy and only provide information and functionality for those systems down-stream of the particular aspect implemented.

All of the above features of the network management system ensure a wide install base and therefore an immense amount of information to populate the database on which IT product developers may query during the product life cycle.

Figure 20:
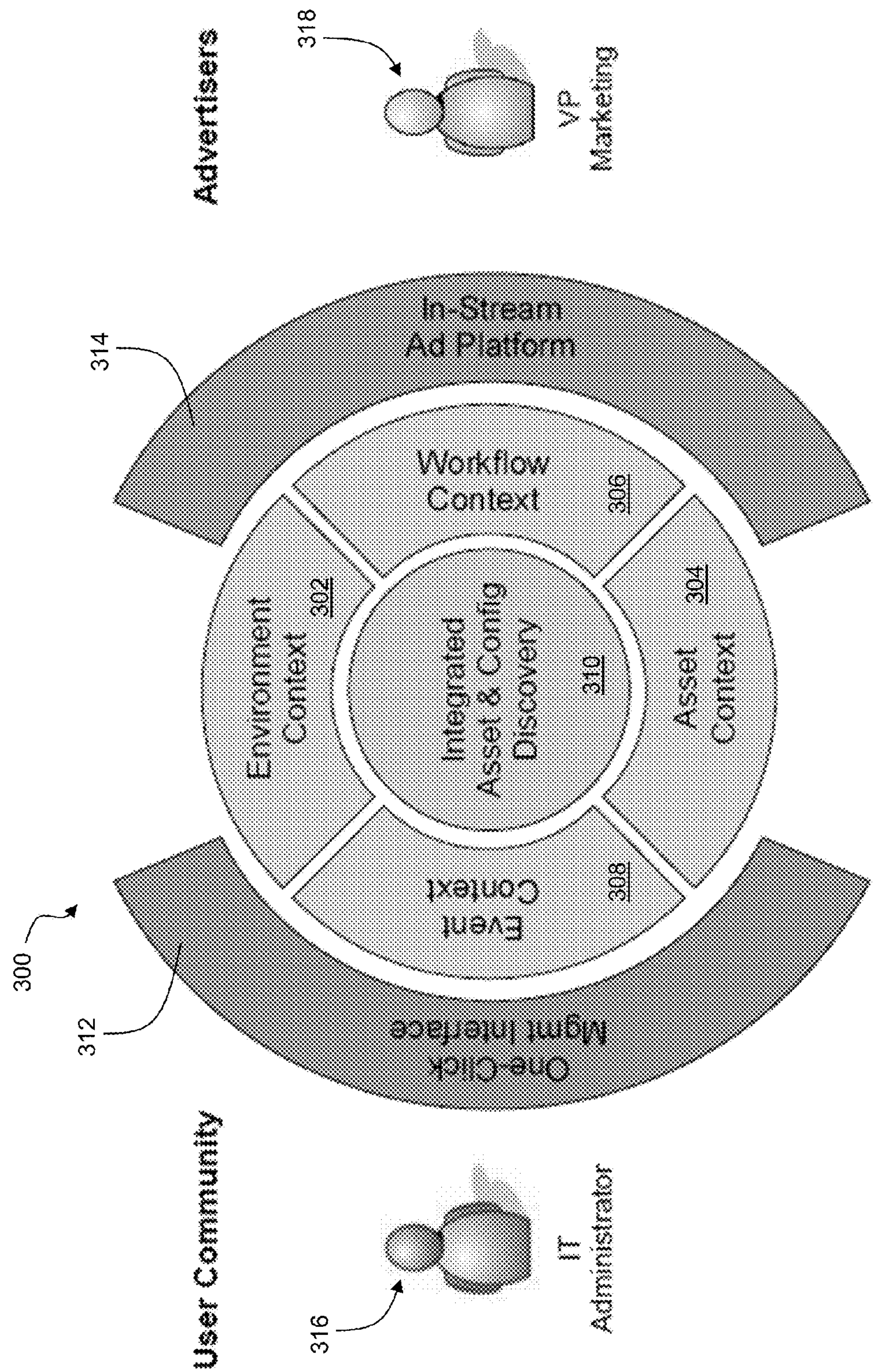
FIG. 20 shows a high level schematic architecture of the disclosed subject matter.

FIG. 20 shows a high-level architectural view of the network management system 300. IT network management system 300 provides enhanced and efficient management capabilities to IT administrators 316, while also providing in-stream targeting advertising opportunities to advertisers 318. IT management system 300 includes environment context 302, workflow context 306, asset context 304, and event context 308. Integrated asset and configuration discovery system 310 discovers assets on the network and provides this information to various contexts 302, 304, 306, and 308. IT administrators 316 may view and manage their networks through one-click management interface 312. Advertisers 318 may produce targeting advertising opportunities through in-stream ad platform 314.

Environment context 302 engine provides the host server the ability to review meta-data with respect to all members of the community, such as what type of business, how many computer, servers or users at the target site. Additionally, the IT network management system is capable of also providing meta-data on all the users, but without any proprietary or confidential data being accessible.

Asset context 304 engine provides the user with the ability to view the network assets on an individual, group or global basis and generate reports, flags and alerts regarding aspects of the system monitored by almost any tracked aspect.

Event context 308 engine provides the user with insight into the system, such as access to critical or proprietary information, monitoring web-server activity as a security measure or general activity of personnel after business hours. Other information relating to the history of events related to the system, such as recent issues flagged by the operating system or IT staff, actions taken by the IT staff on the system and similar operations applied to like systems in the environment may also be provided to the user.

Workflow context 306 engine is a smart engine providing the user with information based on the processes that the user is currently running. Workflow context 306 engine facilitates the acquisition of resources by presenting relevant information and advertising links to the user during the use of the management program. For instance, if an end of year inventory program is running workflow context 306 engine may direct the user to websites where identified or needed computer or network hardware, software or peripherals may be researched and purchased. Additionally, the workflow context 306 engine may simply drive advertisements to the user relating to the user's perceived needs.

The disclosed network management system allows an IT administrator to browse a network for network content, while IT equipment and software vendors obtain targeting opportunities for potential purchasers. Integrated asset and configuration discovery system 310, in the form of software, subroutine, or engine, scans the network and provides information relating to the system and its constituent components, such as type of computer, operating system, etc. Additionally, the present system provides the user with system status (such as low ink), alerts, reports (such as a number of licenses), and work order or purchase order tickets. Advertisers may be integrated into the system through advertisements to provide the user with an option to purchase necessary components, such as software, memory or disk drives.

Further, the disclosed network management system promotes purchase opportunities for buyers and sellers in an IT network environment. For the advertiser/vendor community, this provides an in-stream advertising platform that tailors advertisements and product information to the particular needs of an enterprise network through survey, brand, product education, and switch promotion steps. The disclosed subject matter allows for confidentiality and security within any network. Advertisements provide the user with options to purchase necessary components, such as software, memory or disk drives, represented by the brands and purchase or lead steps. Advertisement revenue allows the network management system to be distributed for free or at a reduced cost to the end user.

Figure 21:
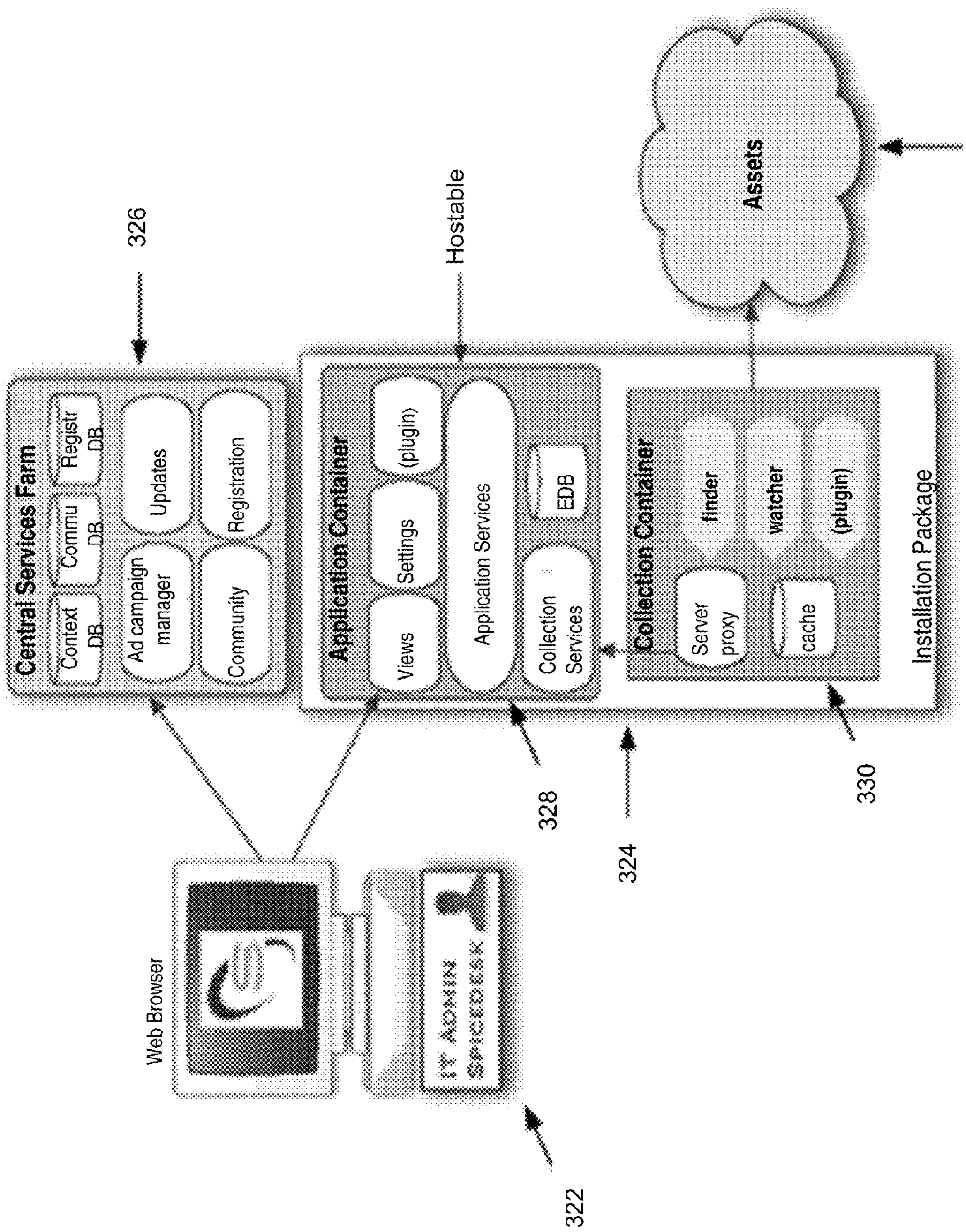
FIG. 21 shows how the presently disclosed system supports the activities of an IT network administrator.

FIG. 21 shows how the network management system supports the activities of an IT network administrator. FIG. 21 depicts a user interface 322, typically manned by the IT administrator of the network. Software module 324 is typically installed on a network to provide the functionality offered by the network management system. Software engine 326 is typically hosted off-site from the user and gathers information from multiple users. Although in a far-flung world-wide organization, engine 326 may be implemented by a third-party for the benefit of the organization or by the IT department of the organization. Application engine 328 contains subroutines that provide the user with such functionality as views, setting, application services, collection of services and a host of other services. This list is meant to be exemplary and not limiting in any manner.

Collection engine 330 provides the user with server proxy, finder, watcher and third party functionality. Engines 328 and 330 may be employed jointly in a network or separately. In a typical installation, engine 330 will be installed at multiple sites in a distributed network 332 or in a network that has several firewalls or security measures, downstream of them and then to provide retrieved information to the application engine 328. Although an IT administrator may change these settings, typically the application automatically determines the appropriate IP addresses, domain names or other information required to gather the information.

The network management system provides a set of easy-to-use functions and information relating to their use through a readily-understandable interface. The network management system substantially frees an IT administrator from the day-to-day complexity of network use. The network management system provides the ability to inventory and monitor an entire network, operate an IT helpdesk for the enterprise, troubleshoot the local network, report on network assets and performance, as well as provide the user with the ability to obtain desired products for the network and its components (e.g., computer software, printing supplies), all through a simple one-click management interface.

Again, FIG. 1 shows an initial graphical user interface screen shot showing information on how a network administrator may utilize the network management system using a web browser. Specifically, FIG. 1 shows an inventory tab 102 which allows a user to determine the hardware and software installed in an environment and to take action on that data. The top half of the screen (reference numeral 104) shows the major categories that assets are automatically sorted into upon discovery. The categories could include Workstations 106, Servers 108, Printers 110, Networking 112, Other 114, Unknowns 116, Software 118 and any categories defined by the user 120. The bottom half of the screen (reference numeral 122) shows Overview tab 124, displaying the assets discovered in the environment and allowing a user to quickly see any issues. In the embodiment shown, Overview tab 124 shows the top manufacturers, operating systems, anti-virus vendors and status information along with the number of assets discovered in each category. In one embodiment, underlined data indicates that a user may perform some kind of action on that data. For example, under the Manufacturers (Top 4) tab (reference numeral 126), if a user wishes to see assets manufactured by Dell, a user may click the Dell link to receive a filtered view of environment data. Similarly, to see all assets not manufactured by Dell, a user may hover over the Dell link and see 'Others not like this' (not shown).

Figure 22:
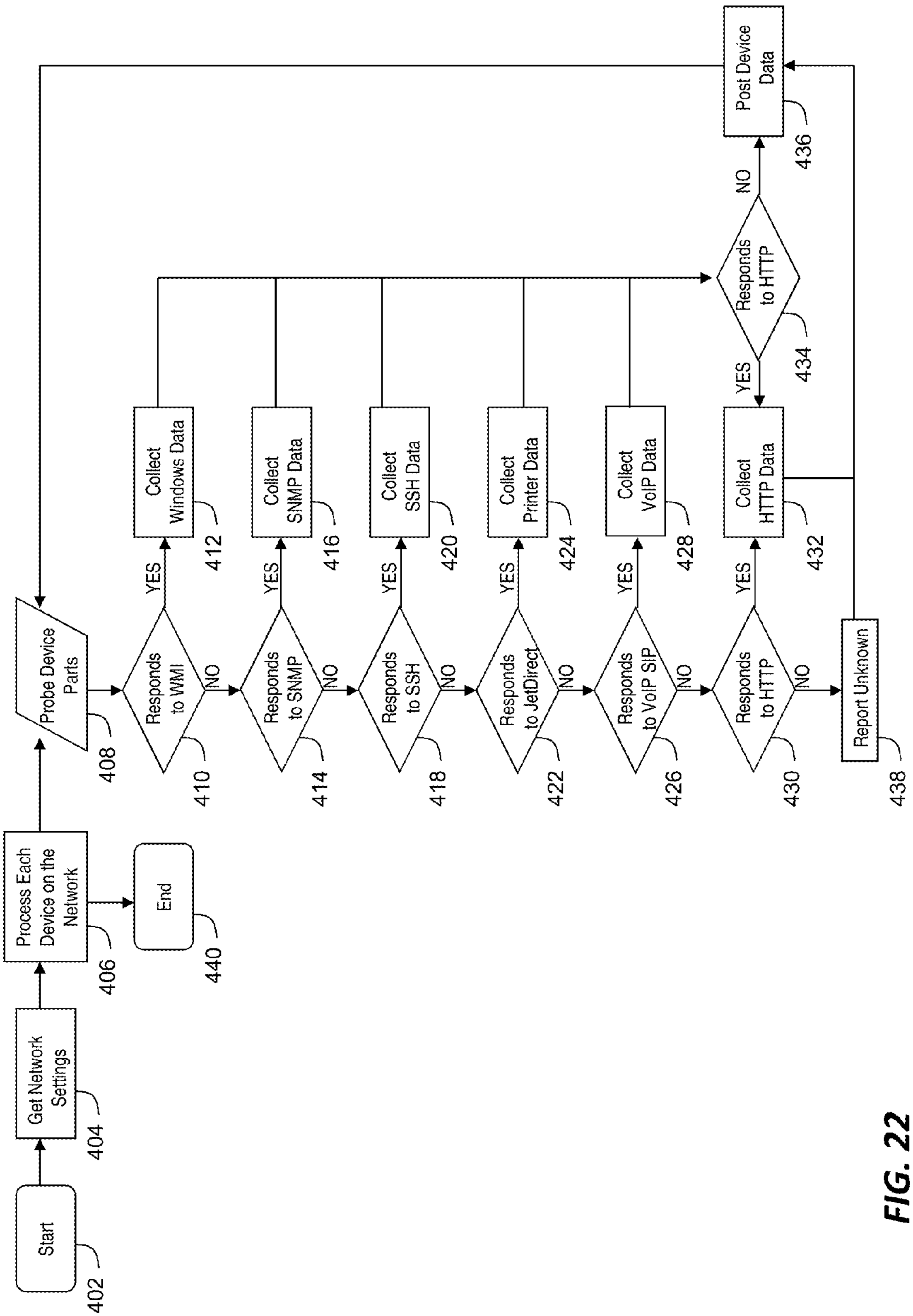
FIG. 22 presents a flow diagram for the asset and configuration discovery features of the disclosed subject matter.

FIG. 22 depicts a schematic flow diagram of integrated asset and configuration discovery system 310 of FIG. 20. In the scanning and discovery process, method steps and parameters are initiated and launched by start 402. Control then passes to obtain network settings step 404. At step 404, integrated asset and configuration and discovery system 310 (FIG. 20) automatically determines network settings, but information may also be manually provided by an IT administrator. For example, an IT administrator could supply information, such as off-site IP addresses, domain names, etc., that is part of the system and needs to be aggregated by central services engine 326 (FIG. 21). Application engine 328 makes this information accessible. This initial information may also include any required security passwords or logins required to access some or all of the systems on the network.

Returning to FIG. 22, at step 404 the network settings are obtained as well as checking of the domain name and the DNS lookup in both directions. Any DNS errors found are aggregated into a top level view so that they later may be corrected by the IT administrator if desired.

An identifier for a computer or device on a TCP/IP network, networks using the TCP/IP protocol route messages based on the IP address of the destination. The format of an IP address is a 32-bit numeric address written as four numbers separated by periods. Each number may be zero to 255. For example, 2.160.10.240 could be an IP address.

Within an isolated network, IP addresses may be assigned at random as long as each one is unique. However, connecting a private network to the Internet requires using registered IP addresses (called Internet addresses) as specified by networking standards. The four numbers in an IP address are used in different ways to identify a particular network and a host on that network. Four regional Internet registries—ARIN, RIPE NCC, LACNIC and APNIC—assign Internet addresses from the following three classes. Class A—supports 16 million hosts on each of 126 networks; Class B—supports 65,000 hosts on each of 16,000 networks; and Class C—supports 254 hosts on each of 2 million networks.

In a 32-bit IP address, the number of bits used to identify the network and the host vary according to the network class of the address. In a Class C network, the first 3 bits, or the high-order bits, are always "110." The next 21 bits are used to define the Class C network, and the final eight bits are used to identify the host. The IP address is represented in dotted decimal notation of four 8-bit fields, or octets, that have been converted from binary to decimal numbers.

The number of valid networks and hosts available is always $2^N$ (where N equals the number of bits used) minus 2 (one for the all zeros address and one for the all ones address). Thus, for a class C address wherein 8 bits are available for hosts, the number of hosts is $2^8$-2, or 256-2, which is 254.

Support for Ipv6 which allows for a much greater range of IP addresses could also be supported. At step 404, the network management system determines how wide the network is and allocates search protocols based on this measure. For instance, in a Class C network there are 254 potential hosts. Each device on the network has or should have a unique IP address or sub-mask address. If an IP address or DNS name is provided by the IT administrator, a DNS lookup takes place. The network management system confirms the DNS name and IP address associated with it and assures that the IP address defaults to the DNS name and vice-versa. If an IP address or DNS name is not provided, during step 406 the search engine will set the range based on how wide the network is (obtained at step 404) and ping each element to see if it responds. If an element does respond, it is probed to see if it is listed on one of the ports or is a unique name or IP address device. Having "ping"-ed an element received its response, control then passes to step 408 where the element is probed.

Although the following steps are listed in a logical and efficient manner for probing elements on a network, other groupings or searching hierarchies may be employed or plugged in later and not depart from the scope of the present disclosure.

At step 410, the device is probed to see if it responds to WMI. Windows Management Instrumentation (WMI) is a set of extensions to the Windows Management Instrumentation that provides an operating system interface through which instrumented components may provide information and notification. If the device is identified as a WMI device, data is collected at step 412 and control passes to step 434 where a determination as to whether the device responds to HTTP (and/or HTTPS) is made (i.e., has a web server interface). Hypertext Transfer Protocol (HTTP) is a method used to transfer or convey information on the World Wide Web. If the device is found to be a WMI at step 410, the remaining steps 414 through 430 are skipped, since by default the device will not respond to any of the other protocols.

At step 414, the device is probed to see if it responds to SNMP. The simple network management protocol (SNMP) forms part of the internet protocol suite as defined by the Internet Engineering Task Force (IETF). SNMP is used by network management systems to monitor network-attached devices for conditions that warrant administrative attention. It consists of a set of standards for network management, including an application layer protocol, a database schema, and a set of data objects. If at step 414 the device responds, it is identified as a SNMP device and data is collected at step 416. Control passes to step 434 where a determination as to whether the device responds to HTTP is made. The remaining steps 418-430 are skipped.

At step 418 if the device responds, it is identified as a SSH device, data is collected at step 420 and control passes to step 434 where a determination as to whether the device responds to HTTP is made. Steps 422-430 are skipped. Secure Shell or SSH is a set of standards and an associated network protocol that allows establishing a secure channel between a local and a remote computer. It uses public-key cryptography to authenticate the remote computer and (optionally) to allow the remote computer to authenticate the user. Shell commands are then used to obtain the needed information from the asset.

At step 422 if the device responds, it is identified as a JetDirect device, data is collected at step 424 and control passes to step 434 where a determination as to whether the device responds to HTTP is made. Steps 426-430 are skipped. JetDirect is the name of a technology sold by Hewlett-Packard that allows computer printers to be directly attached to a Local Area Network. The most common communication uses TCP/IP port 9100.

At step 426 if the device responds, it is identified as a VoIP SIP, data is collected at step 428 and control passes to step 434 where a determination as to whether the device responds to HTTP is made. Voice over Internet Protocol, also called VoIP, IP Telephony, Internet telephony, Broadband telephony, Broadband Phone and Voice over Broadband is the routing of voice conversations over the Internet or through any other IP-based network.

At step 430 if the device responds, it is identified as an HTTP device and data is collected at step 432. If no response is received, control then passes to step 438 wherein an exception report or alert is generated and forwarded to the IT administrator providing the directions as to how to handle these occurrences.

The reason the device failed to respond or did not respond fully, after being identified as being on the system could be numerous. In this instance the port is identified as being open but is identified as not showing anything on it. This could occur for various reasons, such as the user may not have the security clearance to access the system/device in question or a separate login is required that was not provided. The device may be behind a firewall or other device such as a hub that will not respond.

Once the data is collected control then passes to step 436 wherein the data collect is posted with each device found on the network. Process steps 406 through 438 may be repeated again at a later time to discover new network devices, but a report will only be generated for devices previously identified if the device configuration has changed. This information is stored so that a history of the device may be created and used to compare with itself or other devices similarly configured and equipped.

Trouble shooting devices on the network may be made easier through a snapshot of the device history created through flow diagram of FIG. 22. This process flow also provides the IT administrator the functionality and ability to ensure that each user on the system is appropriately configured with the software, hardware, peripheral access and etc. that their security level or access level requires or allows. Therefore, if a system BIOS or other parameters are changed and a problem occurs, the IT administrator may utilize this tool to identify the change in the systems configuration and take appropriate measures to resolve it.

Figure 23:
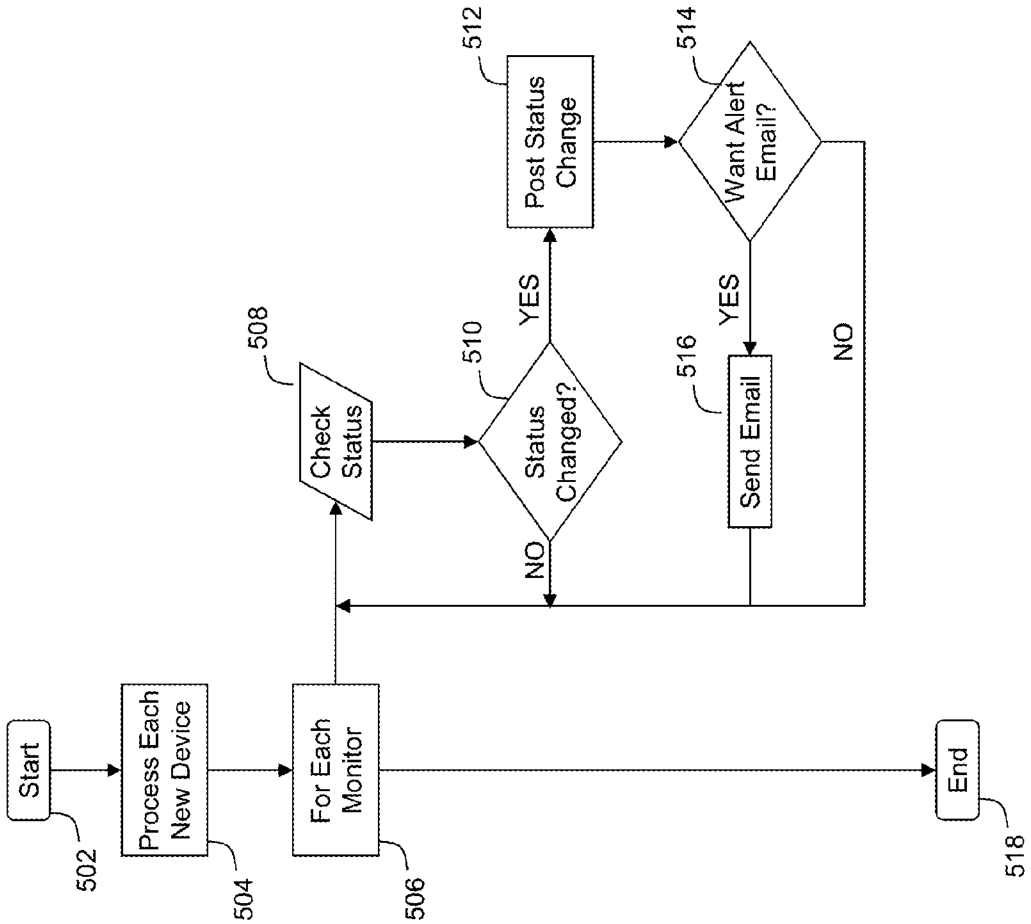
FIG. 23 presents a flow diagram for a watcher flow functions of the disclosed subject matter.

FIG. 23 depicts a schematic diagram of a watcher or monitoring engine. This aspect of the network management system monitors identified devices at periodic times. It mainly looks for devices that switch states between online and offline and sends flags of these events for the IT administrator as discussed below. For large organizations, the monitoring engine may segment the total number of devices and monitor each segment in a rotating fashion as not to over tax the operating systems. Although, this should not be a concern, since the data gathered and transmitted is on the order of 10s of K and requires very little system resources to run. Therefore, in most instances, the user will not even be aware of the programming scanning operation. Alternately, the monitoring engine may be directed to only run when system resources are below a certain level (i.e. below 60% or below 80%) to ensure that productivity is not hampered by the scanning and transmitting of data process.

With reference to FIG. 23, the monitoring or watcher flow engine is initiated with the parameters set by the IT administrator at step 502. Control then passes to step 504 where each known device is processed. Control then passes to step 506 for each monitor where a check status request is initiated at step 508. Whether the status has changed is checked 510 and if the result of the check status is a positive, i.e., the status has changed, the status change is posted at step 512. If the check status request is a negative, i.e., a no result, the process terminates.

Once the change is posted at step 512, control then passes to step 514, where a determination is made, in compliance with the IT administrator set up instructions, to send an email or other type alert, such as creating an exception report, or log. If the determination at step 514 is a no, then the process terminates, although the data is still stored with the device showing the time of the last scan and its results. This data may remain indefinitely or be periodically culled using a FIFO method over a set time period. If the instructions are affirmative at step 514 to send an email, control passes to step 516 where an email or some other type alert is directed to the party or parties designated by the IT administrator.

The watcher flow or monitoring engine continually performs the various described functions at the period intervals set up for the monitoring process until the process is terminated or altered by the IT administrator.

The disclosed network monitoring system/platform may also comprise an online purchasing marketplace allowing an IT/network administrator to purchase IT assets (for example hardware or software) from third party vendors.

The disclosed subject matter described a comprehensive network management system and online marketplace providing a comprehensive tool for an IT administrator to monitor and manage network devices, identify purchase needs, receive purchase recommendations, research products for purchase, price products across third party providers, purchase products, and track purchases. The online market place may incorporate elements such as, but not limited to, an online network management system, an IT inventory management tool, a community of network users, an online marketplace for purchasing IT products, and a merchant request for quote tool—all provided to a user in a comprehensive user interface.

Disclosed in the descriptive text below and in the corresponding figures are exemplary aspects, features, and functionalities that may comprise the integrated online market place; however, one skilled in the art may apply any combination of the disclosed features and/or additional features to the innovations disclosed herein. Screenshots are utilized to help describe the features and functionality as well as underlying architecture of the system.

Disclosed components include an network management reporting component, a purchase list component, a user community component, an online product catalog, a request for quote component, a business case generator component, a commerce dashboard component, a price comparison component, a product review component, and an online network management system such as that described herein. All of these components may be fully integrated and synced together to provide a user with a complete network management system with network device monitoring, device recommendations, purchasing ability, and purchasing inventory management.

FIGS. 24 through 45 shown aspects and functionalities of an online market place platform request for quote component in accordance with the disclosed subject matter. A user, typically an IT administrator monitoring and managing a network using an online network management system, may request a quote for an IT device from online merchants. The request for the IT device may be identified or suggested by the online network management system based on a need, problem (such as a tied to a generated trouble ticket), or as a recommendation based on user data (such as context, event, and network device data). The product may be a product requested from the inventory tool disclosed herein or alternatively, the user may create and customize a request for any item. Further, the item purchased may be software, services, an IT device, or non-technology items.

FIG. 24 is a screenshot displaying a user's network purchases, which may be viewed in Purchase List 550 and Active Quotes 552 and both found in Purchasing tab 553. Active Quotes 552 is shown selected and provides a listing of a user's quotes—both outstanding and historical. From this general quote list a user may select a specific quote, such as quote 126, to see more information concerning the selected quote including the status of the quote, the number of third party respondents to the quote, as well as the best price submitted by a third party. The overall purchase money spent and the amount saved are displayed. The amount saved may be calculated as the difference between the highest and lowest submitted quote or as the difference between the bid amount accepted and the catalog price for the item(s). This list may also be synced with an IT device inventory tool, updating the inventory tool after a quote has been fulfilled, shown in FIG. 24 as Inventory tab 554. The inventory tool comprises information relating to all devices on the network. Further as seen in FIG. 24, data relating to a quotes best price, status update of quotes submitted, and number of respondents replied may also be presented. Advertisements, which may be related to the IT devices listed in the quote list, are also presented to the user.

By selecting a button next to a specific quote, such as button 556 for quote 126, a user may take an action on a particular quote such as canceling a quote and also including a duplicating function. Duplicating a quote may allow a user to treat a quote bundle as a template of items, and optionally vendors, for quick submission—useful in cases where certain items or bundles of items are purchased regularly, such as when a new employee is hired. After a quote has been duplicated, the user may then customize the quote by adding/editing new items, vendors, etc. and then submit the quote to generate a new auction on the quote bundle.

FIG. 25 shows a network device management screen, similar in functionality to FIG. 6, allowing the user to purchase a needed item directly. As shown, the big-dell device 560 has been selected and window 562 displays information corresponding to "big-dell"—in this example "big-dell" has 0% Yellow printer ink remaining so the user is directed to purchase more ink. By clicking Buy Replacement button 564 the user is directed to purchase the needed yellow ink directly from a third party provider in which product information relating to the needed item (yellow ink and corresponded accessory cartridges/toners) is pre-populated for the user, as shown in FIG. 26. In some cases, a needed item may comprise multiple components such as a printer toner cartridge comprising various ink color cartridges, in which case the user may be alerted that a particular color cartridge is low and is directed to purchase a corresponding replacement printer toner cartridge with all color options. Alternatively, the user may choose to submit the needed yellow ink for a quote using the request for quote component (not shown). The tools shown in screen portion 563 allow a user to edit the description of a particular network device (pencil), add items for purchase for a particular device (plus sign) which may also be automatically synced with the inventory management tool, and a trouble shooting menu automatically providing common diagnostic tool based on the network device (wrench).

Alternatively, pre-determined criteria or threshold may automatically trigger a purchase for a network device. In this case, the user has established pre-determined criteria—such as a percentage or actual capacity of storage available on a hard drive—which the system may identify and automatically purchase the needed items without user approval/interaction (in other words, just-in-time purchasing). Vendors may be chosen based on item pricing, pre-selection (preferred by the user), or any other criteria pre-determined by the user. Further, a user may set-up a recurring purchase on a predetermined time interval—for example a backup hard drive purchased on a monthly basis.

FIG. 26 is a screenshot of a pop-up screen provided if the user selects the Buy Replacement button 564 of FIG. 25. Here, the user is provided with the Original Equipment Manufacturer (OEM) replacement part as well as a selection of alternative compatible parts (Compatible). Additionally, accessory items related to the needed item—such as a software bundle in the case of a needed software solution or a waste toner cartridge in the case of needed ink—may be provided. As shown, this is an online catalog of a third party provider—thus when the user wishes to purchase an item and selects Add to Cart button 568 the item is added to the system cart for purchase from the third party provider. When the user is ready to checkout and selects "Checkout" they may then be directed to the system cart (displaying information relating to the item selected, cost, and the provider) for checkout and purchase.

The online catalog provides information pulled from the merchant server (or which may be provided by the merchant directly as a remote upload—a push initiated by the vendor) to help a user identify specific product and product details (such as a part name and number, detailed price information, list of vendors who supply that product, and product reviews based on community pulled from the system community component). The vendors may provide the catalog information or the system may download catalog information from the vendor server, as much as hourly, with updates for all the products (including prices) available for purchase. Optionally, a user may select a preferred vendor, or the system may provide a preferred vendor, to limit the catalog to only the preferred vendor's products. A provided preferred vendor may be chosen based on pre-established agreement with the third party vendor and the system owner, based on availability of the product (for example if certain vendors have a delay in providing/stocking the product), based on pricing, based on user reviews or ratings in the system community component, or based on the user's industry, geographical location, or network size. In operation, providing a preferred vendor allows the system to identify a network need and provide both a purchasing solution for that network need as well as direct the user to a particular third party vendor for that purchase, or any combination thereof.

In one example, the purchase is made through the system using a user credit card on file whereby the user is billed and the third party provider is paid after payment has been collected; however, direct payment to the third party provider is also available.

FIG. 27 is a screenshot showing user checkout. A user may provide billing and shipping information (which may already be stored for that user) and payment information for a selected item. Payment information is securely collected, or may already be stored, and used to collect payment from the user and that payment is then securely transferred to the vendor. Alternatively, the user may use a purchase order which is transferred to the vendor for invoicing—such as when confirming a Request for Quote purchase.

FIG. 28 is a screenshot showing a purchase recommendation based on device requirements—here a memory recommendation based on the available memory for a particular network device, device 570. The user may use this purchase recommendation to select an item for purchase and add that item to the user's purchase list (by selecting Add to Purchase List button 571) or create a third party quote request (by selecting Create RFQ button 572) which may also auto-populate the user's purchase list. Additionally, a third party vendor may be provided to the user to provide the item. A provided vendor may be chosen based on pre-established agreement with the third party vendor and the system owner, based on availability of the product (for example if certain vendors have a delay in providing/stocking the product), based on pricing, based on user reviews or ratings in the system community component, or based on the user's industry, geographical location, or network size, or any combination thereof. Further, this third party recommendation may incorporate item manufacturer approval to ensure part compatibility (whether an OEM or generic/compatible part).

FIGS. 29A through 29C are screenshots showing options for a user to request a quote for a particular network asset. A user may generate a quote for an item by a number of methods including from the user's purchase list shown in FIG. 29A ("Request A Quote" button 574) whereby the quote is automatically populated with items from the purchase list and the quote sent to previously selected vendors. Alternatively, items may also be selected from an online catalog or based on a recommendation. A user may be presented with a purchase item recommendation based on network needs or other user data such as user context (for example if a particular user is reviewing system community message boards for help about a device) and event data. Further, a user may research an item, for example by selecting Research button 573 or compare pricing for a particular item from third party vendors, for example by selecting Shop button 575. The presentation of Research, Shop, or Track based on the status of a particular item—for example if an item is needed but has not yet been approved for purchase the user may be provided researching functionality to decide on the item needed, if an item has been approved for purchase the user may be providing with a shop functionality to decide on a vendor to provide the item, and if an item has been purchased the user may be providing tracking functionality allowing the user to see the status and/or shipping location of the purchased item.

FIG. 29B shows a trouble ticket generated for a particular network device/user and from this ticket a solution device is recommended and the user may generate a quote for this recommended solution (Request a Quote button 576). Further, the user may be directed to research solutions based on the trouble ticket, for example by selecting Research button 577. Pricing information relating to a particular ticket, including item costs and labor costs relating to the recommended solution for the trouble ticket is also provided, see pricing information 579.

FIG. 29C shows a Request A Quote option allowing a user to create a quote from scratch (Request a Quote button 578). A user may input information relating to an item name or description and the quote may prepopulate with specific part names and numbers relating to the item (as seen in FIG. 31). Other options for generating a quote for an item may include, for example: selecting an advertisement for an item and creating a quote for that item; generating a quote for an item based on community forums in which an item is discussed; requesting a quote from a special Vendor page (which may include a special discount rate/percentage to apply to the quote); and, requesting a quote from a third party manufacturer's page in which case the item would be prepopulated and certain third party vendors contacted.

FIG. 29D through 29H are screenshots showing various product researching and pricing capabilities provided to the user. FIG. 29D is an example of a product selector research page, as shown in FIG. 29D the product selector research page for hard ware. From this screen, the user may navigate to related product selectors (in other words specific hard ware/software solutions listed in product list A or hard ware list B), detailed product information such as a buying guide which includes general product category articles and set-up information which may help a user decide on a purchase. The product selector research page also incorporates data from the community component and allows a user to read user reviews from the community component, view popular products in that product category based on purchase populated, ratings in the community component, or quantity of use detected in system networks. Other information provided may include active vendors within that product category—these may be vendors which post in the community component often or have high sales in that product category. Other provided information may include topic threads, articles, and troubleshooting information from the community component which are related to the product. The user may be directed to this research page to make a purchasing decision by selecting Research button 573 or 577 or by searching for a particular product in the community component. Product advertisement 579 may be presented to the user based on contextual data/navigation history such as the user's activity in the community component, based on the user's network assets, the user's purchasing history, or an advertiser's product placement.

FIG. 29E is an example of a product selector or search page, shown as a search page for email hosting solutions. In additional to general searching functionality, the product selector page allows a user to search, sort, and filter particular product attributes/features based on product category (for example shown as email hosting features, contract length, and ratings), view product providers and popular product providers based on community component activity and/or quantity of assets on local networks identified by the system, read product reviews and vendor reviews from the community component, and view detailed product and vendor information.

FIG. 29F is an example of product selector or search page allowing a user to search for products according product attributes as well as vendor attributes, pricing, and product availability. Attribute filters are provided based on the product category—for example a monitor search may include filters relating to monitor size, refresh rate, display technology, etc.

FIG. 29G is an example of a price comparison page allowing a user to compare prices of particular products across vendors (product pricing pulled from vendor side server or provided directly by vendor) as well as compare a number of products. In other words, a user may view total pricing (total purchase price for a number of items) for multiple items across a number of vendors. Further, the user may save particular items or a bundle of items for later purchase. Importantly, the user may also Request a Quote for a particular product despite a price listed by a vendor.

FIG. 29H is an example of a product page providing an aggregate of information from the community component, the product's use as a network asset on local networks as identified by the system, and reviewers for a particular product. The user may be directed to this page based on a search, from the community component, or during the purchasing process. Product review and rating information from the community component is provided as well as "Community Mentions" indicating the product's level of activity in the community component. Product details, pricing information allowing a user to purchase the item from a third party within the system, and similar products are provided. Third party advertisements relating to the product may also be displayed. Optionally, a third party may purchase an upgraded product page which may have, for example, an enhanced interface, additional third party provided product information, or specific third party advertisements. As shown in FIG. 30, after an item has been selected for a quote request, the user has the option to edit and customize the request, such as by editing items or vendors, before submission. Item information such as manufacturer part number may be prepopulated (such as that shown for item 582) or requested under the part name generally (such as that shown for item 580). The item and vendors may be pre-populated as discussed above.

Additional quote features such as a messaging component allowing user to direct comments to the selected vendors and vice versa may also be included. The request may also include a private note component that allows a user to stick a note to the quote for the user's view only.

FIG. 31 shows a user populating a quote request using a catalog of products relating to IT devices, IT accessories, and office products available across a number of vendors. The part and part number are provided in the quote allowing the vendor to identify the requested part and/or provide alternatives. A quote may be populated with part numbers (item 582 in FIG. 30); however, a quote may be submitted with only a device description (such as "monitor"). Optionally, a user may request a certain IT device and the system will suggest compatible parts based on the user's network device—in other words a parts finder determines an appropriate and compatible "monitor" for the user.

FIG. 32 shows the vendor selection function whereby vendors are presented to the user to which submit a quote request to (such as Vendor 580) based on, for example, location, user's industry and company size, vendor rating, past vendors used by that particular user, predetermined preferred vendors, and an option to add a new vendor. The user may also search for a vendor in a vendor directory (not shown). Vendor's may be presented based on a number of factors including the user's industry, company size, items to be bought, size of the order, responsiveness of the vendor, popularity of the vendor, or community rating of the vendor. A user may rate and review a vendor and that information is stored and presented to all users to help decide which vendor to select.

When all the quote information has been collected, the quote is securely sent to the selected vendors. Vendor's may be notified of a quote request in a number of ways including a notification on the vendor page of the vendor (or vendor commerce dashboard), a direct link and notification to the vendor's order tracking system, and/or a direct notification. This may be in the form of an email containing a secure URL link, each vendor's URL comprised of a random set of numbers, which takes the vendor to a vendor page allowing that vendor to manage and respond to the quote request. The vendor may provide prices, alternative products, or messages that are auto-populated for the user and the user will see on the user's quote interface—in other words an automated quote submission for the vendor is provided to the user using predetermined pricing metrics. Further, a quote may be automatically rejected for the vendor if the quote does not meet certain criteria such as order quantity or value and user location.

FIG. 33 is an example of a vendor page allowing a vendor to edit the quote to provide pricing info for the product or suggest an alternative product (Edit Quote button 582) as well as decline the quote (Decline Bid button 584). The vendor may also send messages directly to the user (Questions/Comments window 586). As shown, the vendor page provides information relating to how many other selected vendors have replied to this particular quote ("Quote Stats") and information about the user such as company size and industry ("Customer Info") and shipping information ("Ship/Bill Info")—information provided is designed to allow the vendor to most appropriately respond to the quote and provide appropriate pricing for the needed items. Other information such as the lowest current bid and how the user generated the quote (such as through an advertisement or based on need) may also be provided. The vendor page may also provide reminders about discounts offered for that product which may be based on contextual user information such as how the quote was generated (i.e. by selecting an advertisement). FIG. 34 shows the automated product catalog for that particular vendor along with the particular vendor's corresponding internal part numbers allowing a vendor to edit a quote request by selecting a part that vendor is able to provide based on the vendors previously submitted or imported item catalog.

Once the vendor completes the quote response, including particular items the vendor will provide and corresponding pricing information, the information is auto-populated for the user on the user page (shown in FIG. 35), and the user is notified/alerted a response was made and is provided with the quote details. The user is then able to purchase the items, send the vendor an additional message (including a request for a different part or different pricing), or wait for additional selected vendor's to respond to the quote request.

The user may also edit the quote by selecting Edit Quote 592 to alter the items for purchase (for example remove items or adjust quantity of items) or resubmit a quote. When the user has committed to purchasing the items from a vendor, by selecting Buy Items 590, purchase information is collected from the user to be forwarded to the vendor as a URL link (shown in FIG. 36). The message may also contain the user's reasons for purchasing from that particular vendor (such as for example lowest price, preferred vendor, vendor was the most responsive, products were the best fit).

FIG. 37 is a user screen showing that the user has accepted the vendor quote as listed and the vendor will now be notified for acceptance. FIG. 38 shows the corresponding vendor page requesting approval and processing of this purchase. Optionally it may be up to the vendor to finalize this transaction by accepting or declining the purchase and may send the user an explanatory message; however, it may be that the vendor only has the option to decline a purchase at this point under predetermined circumstances such as item out of stock. The vendor may also ask for more information from the user, such as shipping information. After the vendor has processed the purchase, the user is notified the purchase is complete on the user page (FIG. 39). The vendor may be prompted to provide shipment tracking numbers which will are auto-populated on the user page, shown as "Tracking Numbers" in FIG. 39.

The user then may sync request for quote purchase back into a purchase list component (shown in FIG. 29A) for total inventory tracking or configure the application to automatically sync everyday with quotes, approved quotes, and completed quotes—in other words the status of the quote is updated in the purchase list. The user may also rate the vendor after the transaction, provide reviews, and follow the vendor (or any vendor) for messages regarding specials/product recalls, etc.

Third party vendors are provided vendor pages in the request for quote component to manage their quote workflow, referred to herein as a commerce dashboard. The manner in which the request for quote component provides a third-party vendor with quote request may vary. As described above, in one embodiment the vendor is sent a secure URL link by email providing access to a vendor page displaying information for that user's quote request and allowing the vendor to respond to the user. Thus, a popular vendor receiving many quotes will have a need to manage and analyze the quote requests and responses—functions provided by the commerce dashboard.

FIG. 40 is a depiction of a commerce dashboard for a vendor allowing a vendor to manage quotes. FIG. 40 shows all quotes that have been requested of a particular vendor that have not yet been unassigned to a sales representative. The dashboard provides an overview of the quotes and the vendor may see additional quote information by selecting a quote or open and respond to the quote itself. This view allows the vendor to route quotes to appropriate vendor departments or sales representative based on factors such as the product, size of user's company and location, or the user's industry. The quote may be re-routed to a new representative email and the original quote is resent to the new email provided. Further, the vendor may select to be automatically notified concerning outstanding or unresponded to quotes via the commerce dashboard or other notification means.

The commerce dashboard also provides reporting metrics allowing the vendor to view or export quote data. FIG. 41 shows an example of the types of reports that are provided to the vendor. Shown, the quotes may be organized by time periods, status, quotes waiting to be re-routed to a salesman. Other reporting options for quotes include pendency time before the quote was responded to by the vendor, winning quotes, quotes by a particular sales representative, quotes requested from a particular user, and quotes by purchase price. Additional vendor reports include executive level summaries, most responsive sales rep, most effective sales rep, winning percentage, and sales rep metrics in comparison to other reps. Further, vendors may search for a particular quote by keyword in the item description or part number.

FIGS. 42 through 45 depict a business case generator component that analyzes the user and network environment combined with scripted product information to create a case for purchasing or upgrading to a product. The user may create an RFQ (Request For Quote) from the generator component. The business case generator may be accessed from a vendor page, a product manufacturer page, or directly from the user page. FIG. 42 shows an example of data inputs collected from the user concerning the products the user is interested in purchasing as well as information concerning the user's current system and devices—which may also be identified by the network management component. A business case for a product is created based on the user's input, information relating to the user's network identified by the network management component, information relating to the product based on the community of users in the system such as user reviews and statistics, as well as prepopulated information that may be provided by the vendor. FIGS. 43 through 45 show information created for the user when the case is generated (for example by selecting Generate Case button 600). As seen in FIGS. 43 and 44, the business case is a combination of product information and user specific analysis relating to the user's local network displayed to persuade a purchase decision maker to purchase a product. Certain aspects provide general product information while other aspects analyze information specific to the user and the user's local network. Further, rating and review information and analytics based on other users who have purchased the product from the community component may be provided. Information relating to the user's current system, such as information 602, user reviews from the user community, such as review 604, and community statistics, such as statistic 606, are provided to allow a particular user to decide on or make a case for purchasing product. As the business case may used as a tool for a user to present to a purchasing decision maker, much of text of the generated case is completely editable by the user as shown editable text portion 608 in FIG. 45.

FIG. 46A and FIG. 48B show aspects of an online market place component of the disclosed subject matter. The market place component allows users to purchase IT devices, IT accessories, or office supplies from third parties (for example by using Create a new purchase window 610) as well as manage their network device inventory using the purchase list component. In combination with the network system management component, devices for purchase may be recommended based on a number of factors including the status of the network devices, needs of the network, or contextual and event data concerning the user's activities on the system (such as searching the community component for IT solutions, browsing a vendor's page, or clicking an advertisement).

FIG. 46A shows the purchase list component, similar to the purchase list of FIG. 29A, allowing a user to manage network device purchases. The purchase list acts as an inventory system allowing a user to create items for purchase and input data such as product information, the selected vendor, the internal company department to charge or identify the purchase with, and additional notes concerning the purchase in Create a new purchase window 610. Once the purchased item has been created or imported from the user's external inventory management system or a third party vendor inventory management system from which the user has previously purchased, the user may then update the status of the item or the status may be automatically updated/synced if it is purchased using the request for quote component or is a direct third party purchase made through the system. The purchase list component may track the status of an item during the purchasing process such as after a purchase order has been created, an item that has been opened from the purchase list but not yet approved for purchase, and an item that has been purchased and received. FIG. 46B shows a user creating a new purchase item on the purchase list using an online catalog across system vendors to identify the correct item for purchase.

A user may also access the request for quote component from the purchase list or request a quote for an item from the purchase list—as both request a quote and purchase list inventory components may be synced together. The request for quote functionality provided is on the purchase list as Request A Quote button 612 and may also be accessed from the menu bar.

FIGS. 47 through 55 show various reports and purchasing status updates that are provided to the user relating to device purchases. An exemplary list of reports is highlighted in window 620 in FIG. 47. The user may use this list to create or customize purchasing and device inventory reports. An exemplary list of purchase details is highlighted in window 622 in FIG. 48. A key aspect of the disclosed subject matter is ability to effectively manage network devices, including device purchases—a large component of an IT administrator's responsibilities. The reports and purchase details shown are examples and used to describe the functional features available to a user.

FIG. 49 shows a detailed view of data available for a particular device, Tepin 624, on the network. Information relating to the device and the current device status is provided by the online network management component as well as alerts and a history of products purchased for that device. In this view, purchases may be recommended to the user for purchase directly from an online catalog or by using the request for quote component. This view also tracks purchases relating to a particular device, which may aid an IT administrator in monitoring and subsequently collecting equipment or tracking expenses relating to a particular machine or network. Purchase window 625 displays items purchased for device Tepin 624, shown as additional memory; however, items relating to the device may include hardware such as a hardrive or laptop bag, software, or any item an IT administrator wishes to associate with Tepin 624. FIG. 50 shows a detailed view of data available for a network user similar to the network device data shown in FIG. 49, devices and purchases associated with the user are provided to help an administrator manage a network and in particular view purchases for a particular network user.

FIG. 51A shows a detailed view of data available associated with a trouble ticket (highlighted trouble ticket 626 and corresponding detailed ticket date window 628). A trouble ticket may be created by the online network management system or by a user. Once created, items, which need to be purchased to resolve the trouble ticket, may be recommended or added by a user and purchased through the online marketplace or request for quote component. Data relating to the history of the trouble ticket, status of the trouble ticket, and cost spent to resolve the trouble ticket is available. FIG. 51B shows a trouble ticket summary page providing an online marketplace for a user to purchase an IT device in response to the trouble ticket from a third party vendor—in which case a particular product solution may be recommended to the user. In operation, a key aspect of the online market place and inventory/tracking tool may include associating a purchase with a trouble ticket, whereby the trouble ticket client (both the user and/or IT administrator) is automatically updated throughout the purchasing process (such as by email) when a ticket is generated and when a purchase solution is approved/purchased/received. Thus, from a host computer, the system may identify a network need or problem, generate a trouble ticket thereby notifying a host computer user, recommend a product solution for the network need/problem to the user, provide the user with options for purchasing the product solution (for example through a request for quote or direct third party purchase), and track the subsequent purchase of the product solution from order to fulfillment.

FIG. 52 is a report showing all purchases from a vender, shown as vendor PC Connection 630. Data relating to which network device, trouble ticket, or network user items have been purchased for and the status of past and current purchases is provided.

FIG. 53 is a report showing all purchases for a group of network devices, shown as "Environment Summary". Data relating to the item purchased, the device the item was purchased for, and the price is provided in the summary with additional information available upon selection of a purchase. The overall costs associated with purchases is also provided.

FIG. 54 is a report showing purchases values and depreciation for network devices and FIG. 55 is a report showing the cost of labor per network device. The reports shown in the figures and described are meant to be exemplary and illustrative of the type of purchasing reports which may be created and displayed based on network asset information and purchasing information.

FIGS. 56 through 67 depict various aspects and functionalities of an online network management (inventory) component. FIG. 56 shows a display providing an overview of all devices on a network. From this menu, a user is able to see data and alerts relating to every network device and its corresponding operational status. As shown, the user may organize devices by networking devices, printers, servers, etc. When a particular device is selected, detailed information relating to that device is presented.

FIG. 57 shows exemplary additional network device inventory management organization and management tools available to the user. FIG. 58 highlights the Help Desk features provided including creating and managing trouble tickets associated with network devices or users. The user may also access the community component from this menu. The community component provides an online media infrastructure and information system allowing users to post and respond to messages, research products, interact with community members, post and read articles, and download application extensions and whitepapers—generally a forum for system users to share and review information. FIG. 59 is a Manufacturer Summary of network devices. FIG. 60 shows a Scan Error report showing the latest scan errors for network devices—a scan error occurs when an error occurs when the system management component is unable to retrieve inventory information from the network device. FIG. 61 shows an Alert report showing Alert information concerning network devices—for example an alert may be based on a predetermined threshold for memory storage usage or software update. FIG. 62 is a Timeline (shown as activities associated with purchases or trouble tickets) report showing network management activity. FIG. 63 is an Overview report showing information relating to the network itself. FIG. 64 is an Applications report showing network application data. FIG. 65 is a Virtual Machine (VM) report showing data about network virtual machines. FIG. 66 a Storage report showing data relating to the storage capacity of network devices.

Functionalities relating to a community component are shown in FIG. 67. The community component leverages and aggregates users of the system and allows users to post messages, search for information, and follow other online network management system users.

The purchase recommendations described herein may be based on the user's local network and device needs, similar user needs and purchases, and/or user navigation within the system including the community component. Leveraging the user's navigation within community component allows for recommendations based on similar users (similarities may include product type/use, network size, network industry) as well as the capture of data for smart advertisement placement.

Further, the advertisements and community links generally found on the right hand side of the representative screen shots included herein—for example those on the right hand side of the screenshots showing user pages relating to network management and product purchase—may be based on the user's network assets, the particular page the user is viewing (contextual data), the user's historical navigation within the system (past contextual data), or generated by the system as paid advertisements or smart advertisements.

It will be apparent to those skilled in the art that various modifications and variations may be made in the above disclosure and aspects of the disclosure without departing from the scope or intent of the disclosure. Other embodiments of the disclosure will be apparent to those skilled in the art from consideration of the specification and practice of the disclosure disclosed herein. It is intended that the specification and examples be considered as exemplary only. Accordingly, the scope of the present disclosure should be limited only by the attached claims.

What is claimed is:

1. A method for managing operations of a local network by a network management system integrating work-flow monitoring and reporting of a host computer of said local network, with a community of network users of other networks, and with third party vendors, said method comprising the steps of:

providing said network management system comprising a network management system server remote from said local network, the server comprising a processor, memory, and a network connection;

providing to a host computer of said local network an inventory acquisition application, the inventory acquisition application installed on said host computer; initiating an inventory, including software, of a plurality of information technology devices associated with said local network of information technology devices from a said host computer;

determining, by said host computer, operational status of said plurality of said information technology devices associated with said local network;

monitoring, by said host computer, said operational status of said plurality of said information technology devices associated with said local network;

said inventory acquisition application causing said host computer to report to said network management system said operational status of said plurality of said information technology devices associated with said local network;

determining needs of said local network, by said network management system, said needs comprising network assets related to said plurality of said information technology devices associated with said local network;

providing by said network management system a purchasing platform for the user to purchase communicating to third party vendors purchase transactions for product solutions to fulfill said needs; and receiving input to said purchasing platform from a browser-based management interface of said network management system;

wherein said network management system automatically recurs said initiating an inventory and automatically recurs said determining needs, without said browser-based management interface being open.

2. The method of claim 1 and further comprising the steps of:

recommending a product solution in said browser-based management interface based on said needs of said local network.

3. The method of claim 2 and further comprising the steps of:

wherein said recommending comprises filtering via a processor of said network management system a database of product solutions of third party vendors to identify product solutions for fulfillment of said needs, said filtering comprising usage data from said community of network users.

4. The method of claim 1 and further comprising the steps of:

wherein said providing of a purchasing platform further comprises providing a request for quote module, said request for quote module generating a quote request for a product from a third party vendor.

5. The method of claim 4 and further comprising the steps of: automatically transmitting via a network interface status updates for said quote request to said browser-based management interface.

6. The method of claim 1 and further comprising the steps of: providing by said network management system an inventory management tool for tracking inventory of network assets and purchases of product solutions, and generating reports relating to the same.

7. The method of claim 1 and further comprising the steps of:

providing in said browser-based management interface an IT help desk console for troubleshooting said local network.

8. A network management system for remote management of operations of a local network, said network management system integrating work-flow monitoring and reporting of a host computer of said local network, with a community of network users of other networks, and with third party vendors, said system comprising:

a network management system server remote from said local network, said server comprising a processor, memory, and a network connection;

an inventory acquisition application provided from memory of said network management system server over a network connection to a host computer of said local network, the inventory acquisition application installed on said host computer, said inventory acquisition application initiating an inventory, including software, of a plurality of information technology devices associated with said local network from said host computer;

said host computer determining operational status of said plurality of said information technology devices associated with said local network;

said host computer monitoring said operational status of said plurality of said information technology devices associated with said local network;

said host computer receiving information relating to said operational status of said plurality of said information technology devices associated with said local network;

said network management system determining needs of said local network, said needs comprising network assets related to said plurality of said information technology devices associated with said local network;

said network management system comprising a purchasing platform communicating to third party vendors purchase transactions for product solutions to fulfill said needs; and said purchasing platform receiving input from a browser-based management interface of said network management system;

wherein said network management system automatically recurs said initiating an inventory and automatically recurs said determining needs, without said browser-based management interface being open.

9. The system of claim 8 and further comprising:

said browser-based management interface including a product solution recommended based on said needs of said local network.

10. The system of claim 9 and further comprising:

said network management system via a processor filtering a database of product solutions of third party vendors to identify product solutions for fulfillment of said needs, said filtering comprising usage data from said community of network users.

11. The system of claim 8 and further comprising:

said purchasing platform including a request for quote module, said request for quote module generating a quote request for a product from a third party vendor.

12. The system of claim 11 and further comprising:

said request for quote module automatically transmitting via a network interface status updates for said quote request to said browser-based management interface.

13. The system of claim 8 and further comprising:

said network management system including an inventory management tool for tracking inventory of network assets and purchases of product solutions, and generating reports relating to the same.

14. The system of claim 8 and further comprising:

said browser-based management interface including an IT help desk console for troubleshooting said local network.

* * * * *